(12) United States Patent
Nagashima et al.

(10) Patent No.: US 10,954,877 B2
(45) Date of Patent: Mar. 23, 2021

(54) ADAPTIVE TORQUE MITIGATION BY MICRO-HYBRID SYSTEM

(71) Applicant: Tula Technology, Inc., San Jose, CA (US)

(72) Inventors: Masaki Nagashima, Pacific Grove, CA (US); Mohammad R. Pirjaberi, San Jose, CA (US); Louis J. Serrano, Los Gatos, CA (US); Xin Yuan, Palo Alto, CA (US); John W. Parsels, San Jose, CA (US); Mark A. Wilcutts, Berkeley, CA (US)

(73) Assignee: Tula Technology, Inc., San Jose, CA (US)

( * ) Notice: Subject to any disclaimer, the term of this patent is extended or adjusted under 35 U.S.C. 154(b) by 0 days.

(21) Appl. No.: 16/749,607

(22) Filed: Jan. 22, 2020

(65) Prior Publication Data

US 2020/0158044 A1    May 21, 2020

Related U.S. Application Data

(63) Continuation-in-part of application No. 15/918,258, filed on Mar. 12, 2018, now Pat. No. 10,578,037.
(Continued)

(51) Int. Cl.
*F02D 41/30* (2006.01)
*F02D 13/04* (2006.01)
(Continued)

(52) U.S. Cl.
CPC .......... *F02D 41/307* (2013.01); *F02D 13/04* (2013.01); *F02D 41/0087* (2013.01); *F02D 41/1498* (2013.01)

(58) Field of Classification Search
CPC ...... F02D 13/04; F02D 13/0203; F02D 17/02; F02D 17/023; F02D 41/0082;
(Continued)

(56) References Cited

U.S. PATENT DOCUMENTS

| 4,434,767 A | 3/1984 | Kohama et al. |
| 4,489,695 A | 12/1984 | Kohama et al. |

(Continued)

FOREIGN PATENT DOCUMENTS

| DE | 19532164 | 3/1997 |
| DE | 11 2013 004 033 | 5/2015 |

(Continued)

OTHER PUBLICATIONS

International Search Report and Written Opinion dated Nov. 27, 2017 from International Application No. PCT/US2017/047650.
(Continued)

*Primary Examiner* — George C Jin
(74) *Attorney, Agent, or Firm* — Beyer Law Group LLP

(57) ABSTRACT

A variety of methods and arrangements for reducing noise, vibration and harshness (NVH) in a skip fire engine control system are described. In one aspect, a firing sequence is used to operate the engine in a dynamic firing level modulation manner. A smoothing torque is determined by adaptive control that is applied to a powertrain by an energy storage/release device. The smoothing torque is arranged to at least partially cancel out variation in torque generated by the firing sequence. Various methods, powertrain controllers, arrangements and computer software related to the above operations are also described.

18 Claims, 24 Drawing Sheets

Related U.S. Application Data

(60) Provisional application No. 62/470,487, filed on Mar. 13, 2017.

(51) Int. Cl.
  *F02D 41/14* (2006.01)
  *F02D 41/00* (2006.01)

(58) Field of Classification Search
  CPC ............ F02D 41/0087; F02D 41/0085; F02D 41/123; F02D 41/307; F02D 2041/2027; F02D 2041/0012; F02D 2250/21; F02D 2250/18
  See application file for complete search history.

(56) References Cited

U.S. PATENT DOCUMENTS

| | | |
|---|---|---|
| 4,509,488 A | 4/1985 | Forster et al. |
| 4,699,097 A | 10/1987 | Tanaka et al. |
| 5,020,491 A | 6/1991 | Mashino |
| 5,377,631 A | 1/1995 | Schechter |
| 5,461,289 A | 10/1995 | Adler et al. |
| 5,568,795 A | 10/1996 | Robichaux et al. |
| 5,806,617 A | 9/1998 | Yamaguchi |
| 6,085,723 A | 7/2000 | Pels et al. |
| 6,149,544 A | 11/2000 | Masberg et al. |
| 6,158,411 A | 12/2000 | Morikawa |
| 6,232,733 B1 | 5/2001 | Obayashi et al. |
| 6,307,276 B1 | 10/2001 | Bader |
| 6,364,807 B1 | 4/2002 | Koneda et al. |
| 6,405,701 B1 | 6/2002 | Masberg et al. |
| 6,408,625 B1 | 6/2002 | Woon et al. |
| 6,438,944 B1 | 8/2002 | Bidner et al. |
| 6,441,506 B2 | 8/2002 | Nakashima |
| 6,464,028 B1 | 10/2002 | Imani |
| 6,478,705 B1 | 11/2002 | Holmes et al. |
| 6,487,998 B1 | 12/2002 | Masberg et al. |
| 6,588,392 B2 | 7/2003 | Armstrong et al. |
| 6,591,200 B1 | 7/2003 | Cohen et al. |
| 6,619,258 B2 | 9/2003 | McKay et al. |
| 6,691,807 B1 | 2/2004 | Bhaysar et al. |
| 6,692,404 B2 | 2/2004 | Matsubara et al. |
| 6,740,002 B1 | 5/2004 | Stridsberg |
| 6,746,366 B2 | 6/2004 | Tamor |
| 6,886,524 B2 | 5/2005 | Hanada et al. |
| 6,943,460 B2 | 9/2005 | Wakashiro et al. |
| 6,986,399 B2 | 1/2006 | Bhaysar et al. |
| 7,021,409 B2 | 4/2006 | Tamor |
| 7,058,487 B2 | 6/2006 | Hara et al. |
| 7,063,062 B2 | 6/2006 | Lewis et al. |
| 7,066,136 B2 | 6/2006 | Ogiso |
| 7,086,386 B2 | 8/2006 | Doering |
| 7,104,244 B2 | 9/2006 | Nishi et al. |
| 7,154,236 B1 | 12/2006 | Heap |
| 7,198,029 B1 * | 4/2007 | Wong ............... F02D 13/06 123/350 |
| 7,225,782 B2 | 6/2007 | Pallett et al. |
| 7,232,401 B2 | 6/2007 | Albertson |
| 7,275,518 B1 | 10/2007 | Gartner et al. |
| 7,278,392 B2 | 10/2007 | Zillmer et al. |
| 7,350,499 B2 | 4/2008 | Takaoka et al. |
| 7,377,250 B1 | 5/2008 | Duffy |
| 7,456,509 B2 | 11/2008 | Gray |
| 7,503,312 B2 | 3/2009 | Surnilla et al. |
| 7,523,734 B2 | 4/2009 | Albertson et al. |
| 7,530,413 B2 | 5/2009 | Rayl |
| 7,577,511 B1 | 8/2009 | Tripathi et al. |
| 7,580,779 B2 | 8/2009 | Zillmer et al. |
| 7,930,087 B2 | 4/2011 | Gibson et al. |
| 8,015,960 B2 | 9/2011 | Watanabe |
| 8,099,224 B2 | 1/2012 | Tripathi et al. |
| 8,464,690 B2 | 6/2013 | Yuille et al. |
| 8,532,828 B2 | 9/2013 | Schramm et al. |
| 8,715,136 B1 | 5/2014 | Dai et al. |
| 8,847,426 B2 | 9/2014 | Heap et al. |
| 8,869,773 B2 | 10/2014 | Tripathi et al. |
| 8,880,258 B2 | 11/2014 | Breton et al. |
| 8,892,330 B2 | 11/2014 | Yuille et al. |
| 9,086,020 B2 | 7/2015 | Pirjaberi et al. |
| 9,267,454 B2 | 2/2016 | Wilcutts et al. |
| 9,399,963 B2 | 7/2016 | Loucks et al. |
| 9,399,964 B2 | 7/2016 | Younkins et al. |
| 9,512,794 B2 | 12/2016 | Serrano et al. |
| 9,562,470 B2 | 2/2017 | Younkins et al. |
| 9,581,097 B2 | 2/2017 | Younkins et al. |
| 9,664,130 B2 | 5/2017 | Wilcutts et al. |
| 9,689,327 B2 | 6/2017 | Younkins et al. |
| 9,745,905 B2 | 8/2017 | Pirjaberi et al. |
| 9,784,644 B2 | 10/2017 | Chen et al. |
| 9,803,543 B2 | 10/2017 | Christ et al. |
| 9,835,522 B2 | 12/2017 | Chen et al. |
| 9,981,652 B2 | 5/2018 | Kim et al. |
| 10,024,289 B2 | 7/2018 | Leamy et al. |
| 10,060,368 B2 | 8/2018 | Pirjaberi et al. |
| 10,196,995 B2 | 2/2019 | Pirjaberi et al. |
| 10,221,786 B2 | 3/2019 | Serrano et al. |
| 10,344,692 B2 | 7/2019 | Nagashima et al. |
| 10,436,133 B2 | 10/2019 | Pirjaberi et al. |
| 10,578,037 B2 | 3/2020 | Nagashima et al. |
| 10,830,166 B2 | 11/2020 | Serrano et al. |
| 2003/0213467 A1 | 11/2003 | Rayl et al. |
| 2004/0012206 A1 | 1/2004 | Wakashiro et al. |
| 2004/0140139 A1 | 7/2004 | Malik |
| 2004/0174124 A1 | 9/2004 | Lee |
| 2005/0038576 A1 | 2/2005 | Hara et al. |
| 2005/0051133 A1 | 3/2005 | Persson et al. |
| 2005/0055152 A1 | 3/2005 | Wakashiro et al. |
| 2005/0119805 A1 | 6/2005 | Bischoff |
| 2005/0161023 A1 | 7/2005 | Albertson et al. |
| 2005/0164826 A1 | 7/2005 | Albertson |
| 2005/0189894 A1 | 9/2005 | Komiyama et al. |
| 2006/0086546 A1 | 4/2006 | Hu et al. |
| 2006/0173590 A1 | 8/2006 | Zillmer et al. |
| 2006/0234829 A1 | 10/2006 | Berger et al. |
| 2007/0042861 A1 | 2/2007 | Takaoka et al. |
| 2007/0113541 A1 | 5/2007 | Jankovic |
| 2007/0219702 A1 | 9/2007 | Kishimoto |
| 2007/0261656 A1 | 11/2007 | Albertson et al. |
| 2008/0078593 A1 | 4/2008 | Ortmann et al. |
| 2008/0154468 A1 | 6/2008 | Berger et al. |
| 2008/0191492 A1 | 8/2008 | Savant et al. |
| 2009/0084618 A1 | 4/2009 | Thompson et al. |
| 2009/0105896 A1 | 4/2009 | Tamai et al. |
| 2009/0145381 A1 | 6/2009 | Watanabe |
| 2009/0205888 A1 | 8/2009 | Steuernagel et al. |
| 2009/0241911 A1 | 10/2009 | Fox et al. |
| 2010/0050993 A1 | 3/2010 | Zhao et al. |
| 2010/0305797 A1 | 12/2010 | Jiang |
| 2011/0088659 A1 | 4/2011 | Wang et al. |
| 2011/0130902 A1 | 6/2011 | Heisel et al. |
| 2011/0144838 A1 | 6/2011 | Matthews et al. |
| 2011/0153128 A1 | 6/2011 | Wright et al. |
| 2011/0284336 A1 | 11/2011 | Soller et al. |
| 2012/0031357 A1 | 2/2012 | Ervin et al. |
| 2012/0035793 A1 | 2/2012 | Kang et al. |
| 2012/0073929 A1 | 3/2012 | Grutter et al. |
| 2012/0078456 A1 | 3/2012 | Hakumura et al. |
| 2012/0191316 A1 | 7/2012 | Leone et al. |
| 2012/0221217 A1 | 8/2012 | Sujan et al. |
| 2013/0066502 A1 | 3/2013 | Yuille et al. |
| 2013/0225363 A1 | 8/2013 | Lehmen et al. |
| 2013/0333655 A1 | 12/2013 | Schwenke et al. |
| 2014/0041625 A1 | 2/2014 | Pirjaberi et al. |
| 2014/0046558 A1 | 2/2014 | Kim |
| 2014/0048023 A1 | 2/2014 | Ervin et al. |
| 2014/0100733 A1 | 4/2014 | Christ |
| 2014/0109720 A1 | 4/2014 | Werner et al. |
| 2014/0148304 A1 | 5/2014 | Pietron et al. |
| 2014/0172209 A1 | 6/2014 | Ide |
| 2014/0222261 A1 | 8/2014 | Kato |
| 2014/0251282 A1 | 9/2014 | Kotwicki et al. |
| 2014/0288755 A1 | 9/2014 | Murakami |
| 2015/0100221 A1 | 4/2015 | Routledge et al. |

(56) References Cited

U.S. PATENT DOCUMENTS

| | | |
|---|---|---|
| 2015/0260117 A1 | 9/2015 | Shost et al. |
| 2016/0032869 A1 | 2/2016 | Boyer et al. |
| 2016/0102620 A1 | 4/2016 | Ervin et al. |
| 2016/0107633 A1 | 4/2016 | Liang et al. |
| 2016/0108798 A1 | 4/2016 | VanDerWege |
| 2016/0201586 A1 | 7/2016 | Serrano et al. |
| 2016/0281618 A1 | 9/2016 | Younkins et al. |
| 2017/0089281 A1 | 3/2017 | Ujihara et al. |
| 2017/0101956 A1 | 4/2017 | Younkins et al. |
| 2017/0130630 A1 | 5/2017 | Younkins et al. |
| 2017/0234254 A1 | 8/2017 | Nagashima et al. |
| 2017/0291596 A1 | 10/2017 | Tsukada et al. |
| 2017/0306864 A1 | 10/2017 | Pirjaberi et al. |
| 2017/0342920 A1 | 11/2017 | Pirjaberi et al. |
| 2017/0342921 A1 | 11/2017 | Pirjaberi et al. |
| 2017/0342922 A1 | 11/2017 | Pirjaberi et al. |
| 2017/0350331 A1 | 12/2017 | Shost et al. |
| 2017/0370342 A1 | 12/2017 | Nagashima et al. |
| 2018/0202379 A1 | 7/2018 | Nagashima et al. |
| 2018/0251116 A1 | 9/2018 | Cho et al. |
| 2018/0257635 A1 | 9/2018 | Meyer et al. |
| 2019/0003443 A1 | 1/2019 | Ortiz-Soto et al. |
| 2019/0178180 A1 | 6/2019 | Pirjaberi et al. |
| 2019/0263382 A1 | 8/2019 | Parsels et al. |

FOREIGN PATENT DOCUMENTS

| | | |
|---|---|---|
| JP | 11-022504 | 1/1999 |
| WO | WO 2010/006311 | 1/2010 |
| WO | WO 2011/085383 | 7/2011 |
| WO | WO 2014/028344 | 2/2014 |

OTHER PUBLICATIONS

International Search Report and Written Opinion dated Jun. 11, 2018 from International Application No. PCT/US18/21995.

Chinese Office Action dated Jul. 31, 2018 from Chinese Application No. 201680005420.6.

German Office Action dated Sep. 18, 2018 from German Application No. 11 2016 000 318.8.

Japanese Office Action dated Dec. 12, 2018 from Japanese Application No. 2017-536544.

* cited by examiner

ADAPTIVE TORQUE MITIGATION BY MICRO-HYBRID SYSTEM

CROSS-REFERENCE TO RELATED APPLICATIONS

The present application is a Continuation-in-Part of U.S. application Ser. No. 15/918,258, filed on Mar. 12, 2018, which claims priority to U.S. Provisional Application No. 62/470,487, filed on Mar. 13, 2017, both of which are incorporated herein by reference in their entirety.

FIELD OF THE INVENTION

The present invention relates to a dynamic firing level control system for an internal combustion engine. More specifically, the present invention relates to arrangements and methods for reducing noise, vibration and harshness (NVH) using adaptive control to generate a smoothing torque that is applied to the powertrain.

BACKGROUND

Most vehicles in operation today are powered by internal combustion (IC) engines. Internal combustion engines typically have multiple cylinders or other working chambers where combustion occurs. The power generated by the engine depends on the amount of fuel and air that is delivered to each working chamber and the engine speed.

The combustion process and the firing of cylinders can introduce unwanted noise, vibration and harshness (NVH). For example, the engine can transfer vibration to the body of the vehicle, where it may be perceived by vehicle occupants. Sounds may also be transmitted through the chassis into the cabin of the vehicle. Under certain operating conditions, the firing of cylinders generates undesirable acoustic effects through the exhaust system and tailpipe. Vehicle occupants may thus experience undesirable NVH from structurally transmitted vibrations or sounds transmitted through the air. Thus, there are ongoing efforts to reduce the amount of NVH generated by internal combustion engines.

SUMMARY OF THE INVENTION

A variety of methods and arrangements for reducing noise, vibration and harshness (NVH) in a powertrain using matched basis function control are described.

In one aspect, an electric motor/generator controller for operating a motor/generator used as an auxiliary torque source/sink in a hybrid powertrain is described. The hybrid powertrain including an internal combustion engine that operates in a firing sequence. The motor/generator controller includes a matched basis function control module arranged to generate a control signal for the electric motor/generator and a secondary path dynamics module that determines a dynamic response of the torque delivered by the motor/generator in response to a control signal applied to the motor/generator. The control signal of the matched basis function control module is affected by the determined dynamic response of the secondary path.

In another aspect, a method for operating an electric motor/generator used as an auxiliary torque source/sink in a hybrid powertrain that includes an internal combustion engine that operates in a firing sequence is described. The method comprises determining a dynamic response of a secondary path using a secondary path dynamics estimation algorithm, wherein the dynamic response of the secondary path represents a correlation between a commanded torque smoothing signal and an output smoothing torque. The method further includes generating a control signal for the electric motor/generator using a matched basis function control algorithm to provide an acceptable NVH metric, wherein the control signal is adjusted based on the determined dynamic response of the secondary path.

In yet another aspect, a computer readable storage medium that includes executable computer code embodied in a tangible form and suitable for operating an internal combustion engine in a dynamic firing level modulation manner is described. The internal combustion engine operates at an operational effective firing fraction that is fuel efficient and has acceptable noise, vibration and harshness (NVH) characteristics. The computer readable medium includes executable computer code for generating an operational effective firing fraction to deliver a requested torque and executable computer code for generating a firing sequence used to operate the engine in a dynamic firing level modulation manner, the firing sequence being based on the operational effective firing fraction. The computer readable medium further includes executable computer code for determining matched basis function coefficients and executable computer code for determining secondary path coefficients.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

Figure 1:
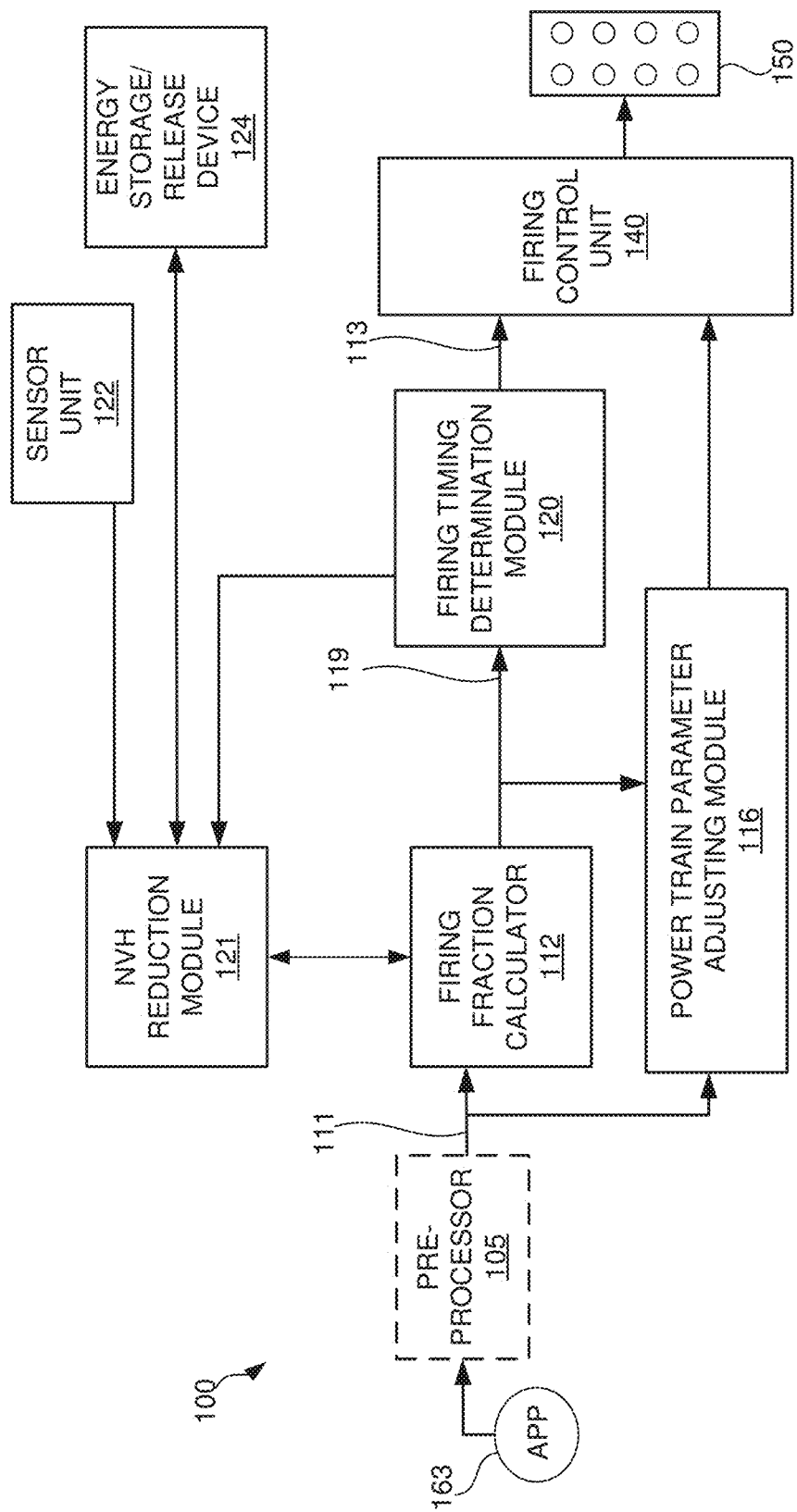
FIG. 1 is a block diagram of a powertrain controller in a skip fire engine control system according to one embodiment of the present invention.

The present invention relates to a skip fire engine control system. More specifically, the present invention involves methods and arrangements for using a smoothing torque to reduce noise, vibration and harshness (NVH) in a skip fire engine control system.

Skip fire engine control contemplates selectively skipping the firing of certain cylinders during selected firing opportunities. Thus, for example, a particular cylinder may be fired during one firing opportunity and then may be skipped during the next firing opportunity and then selectively skipped or fired during the next. This is contrasted with conventional variable displacement engine operation in which a fixed set of the cylinders are deactivated during certain low-load operating conditions.

Skip fire engine control can offer various advantages, including substantial improvements in fuel economy. One challenge, however, with skip fire engine control is noise, vibration and harshness. More specifically, there are particular firing sequences or firing fractions that generate substantial amounts of NVH. Such NVH is undesirable, since it can be felt by vehicle occupants.

One approach to dealing with such problems is to not use particular firing fractions or firing sequences that are known to produce unacceptable NVH levels. Instead, other firing fractions or firing sequences are used and the cylinder output is adjusted accordingly (e.g., by adjusting the manifold absolute pressure, spark advance, etc.) so that the desired engine output is delivered. Various approaches of this kind are described in co-assigned U.S. patent application Ser. No. 13/654,244, which is incorporated herein in its entirety for all purposes.

This application describes another approach for dealing with NVH. Various implementations involve generating a smoothing torque that is applied to a powertrain of a vehicle. The smoothing torque is any torque that is applied to help cancel out or reduce a variation in torque generated by an engine. The smoothing torque can be generated by any suitable energy storage/capture/release device. One example would be an electric motor/generator with a battery and/or capacitor to store and release energy. Alternatively any system or device that stores and captures/releases energy mechanically, pneumatically or hydraulically may be used. For example, a flywheel with a variable mechanical coupling, or a high pressure fluid reservoir with valves controlling fluid flow to and from a turbine or similar device may be used to capture/release energy from a powertrain. The smoothing torque is applied in a manner such that noise and vibration generated by the skip fire firing sequence are at least partially reduced or canceled out.

In various approaches, the above smoothing torque system is applied selectively. That is, many firing fractions and firing sequences that deliver a desired torque generate acceptable levels of NVH, and thus the smoothing torque need not be applied in those circumstances. In other circumstances, a suitable firing fraction or firing sequence may generate undesirable levels of NVH, but the energy expenditure, or equivalently energy costs, involved in mitigating the NVH may be too great. Thus, another firing fraction or firing sequence is used to deliver the desired engine output. In still other circumstances, the use of a smoothing torque may allow the use of firing fractions or firing sequence that were otherwise unacceptable due to their associated NVH levels, and result in energy savings rather than losses. In various embodiments, the smoothing torque system is arranged to analyze the energy costs of the available options and select the most fuel efficient approach that also brings NVH to acceptable levels.

Referring initially to FIG. 1, a powertrain controller 100 according to a particular embodiment of the present invention will be described. The powertrain controller 100 includes a firing fraction calculator 112, a firing timing determination module 120, a NVH reduction module 121, a power train parameter adjustment module 116, a sensor unit 122 and a firing control unit 140. The firing fraction calculator 112, the firing timing determination module 120 and the NVH reduction module 121 coordinate their operations to determine a suitable operational firing fraction and skip fire firing sequence for the engine. Depending on the operational firing fraction, they may also determine a suitable smoothing torque to reduce NVH generated by the firing sequence.

The firing fraction calculator 112 receives a torque request signal 111 based on the current accelerator pedal position (APP), engine speed and other inputs. The torque request signal may be directed from the APP 163 through an optional pre-processor 105 before reaching the firing fraction calculator 112. The torque request signal 111, which indicates a request for a desired engine output, may be received or derived from an accelerator pedal position sensor or other suitable sources, such as a cruise controller, a torque calculator, an ECU, etc. An optional pre-processor 105 may modify the accelerator pedal signal prior to delivery to the firing fraction calculator 112. However, it should be appreciated that in other implementations, the accelerator pedal position sensor may communicate directly with the firing fraction calculator 112.

Based on the torque request signal 111, the firing fraction calculator 112 determines a skip fire firing fraction that would be appropriate to deliver the desired torque under selected engine operations and that has acceptable NVH characteristics (with or without use of a smoothing torque). Each firing fraction 112 is indicative of the fraction or percentage of firings under the current (or directed) operating conditions that are required to deliver the desired output. In some preferred embodiments, the firing fraction may be determined based on the percentage of optimized firings that are required to deliver the driver requested engine torque (e.g., when the cylinders are firing at an operating point substantially optimized for fuel efficiency). However, in other instances, different level reference firings, firings optimized for factors other than fuel efficiency, the current engine settings, etc. may be used in determining the firing fraction. In various embodiments, the firing fraction is selected from a set or library of predetermined firing fractions.

The firing fraction determination process may take into account a variety of factors, including NVH, fuel efficiency and the desired torque. In some situations, for example, there is a particular firing fraction that delivers a desired torque in the most fuel efficient manner, given the current engine speed (e.g., using optimized firings.) If that firing fraction is available for use by the firing fraction calculator and also is associated with acceptable NVH levels, the firing fraction calculator 112 selects that firing fraction and transmits it to the firing timing determination module 120, so that a suitable operational firing sequence can be generated based on the firing fraction. The firing fraction calculator 112 also indicates to the NVH reduction module 121 that no NVH mitigation is needed, and thus the energy/storage release device 124 does not apply any smoothing torque to the powertrain while that sequence is used to operate the engine 150.

If the above firing fraction is instead known to generate unacceptable levels of NVH, then the firing fraction calculator may nevertheless select that firing fraction as the operational firing fraction. Such a selection is based on a determination that the NVH can be reduced to acceptable levels by applying a suitable smoothing torque to the powertrain. The selection is also based on the determination that there are no other more fuel efficient firing fraction alternatives, even when the energy costs associated with the NVH mitigation are taken into account. In this case, the firing fraction calculator 112 transmits the selected operational firing fraction to the firing timing determination module 120, so that a suitable operational firing sequence can be generated based on the firing fraction. The firing fraction calculator also indicates to the NVH reduction module that mitigation of the NVH is required. As a result, the NVH reduction module operates the energy storage/release device 124 to apply a suitable amount of smoothing torque on the powertrain to reduce the NVH generated by the firing sequence.

In still other circumstances, the firing fraction calculator 112 may select an operational firing fraction that is less ideally suited to deliver the desired torque i.e., a firing fraction that is better suited to deliver an amount of torque that is different from the desired torque, but has acceptable NVH characteristics. Thus, the cylinder output must be adjusted (e.g., by adjusting MAP, spark advance and other engine parameters) so that the desired torque is delivered. However, the operational firing fraction is nevertheless more fuel efficient than the other alternatives, which may include a firing fraction with poor NVH characteristics where NVH mitigation is not possible or ends up consuming too much energy.

The firing fraction calculator 112 is arranged to store and/or access data to help it make the above determinations and energy efficiency comparisons. Any suitable data structure or algorithm may be used to make the determinations. In some embodiments, for example, the firing fraction calculator 112 uses a lookup table to determine a suitable operational firing fraction and to determine whether a smoothing torque should be applied. In still other embodiments, the firing fraction calculator makes such determinations by dynamically calculating and comparing the energy efficiency associated with different candidate firing fractions and/or sequences. Some of these approaches will be described in greater detail later in the application.

After selecting a suitable operational firing fraction, the firing fraction calculator 112 transmits the firing fraction 119 to the firing timing determination module 120. The firing timing determination module 120 is arranged to issue a sequence of firing commands (e.g., drive pulse signal 113) that cause the engine 150 to deliver the percentage of firings dictated by a commanded firing fraction 119. In some implementations, for example, the firing timing determination module 120 generates a bit stream, in which each 0 indicates a skip and each 1 indicates a fire for the current cylinder firing opportunity.

The firing timing determining module 120 may generate the firing sequence in a wide variety of ways. By way of example, sigma delta convertors work well as the firing timing determining module 120. In still other embodiments, the firing timing determination module selects a suitable firing sequence from a firing sequence library based on the received firing fraction.

If it has been determined that there is no need to mitigate NVH generated by the firing sequence, the sequence of firing commands (sometimes referred to as drive pulse signal 113) outputted by the firing timing determination module 120 may be passed to the firing control unit 140 which actuates and commands the actual cylinder firings. No smoothing torque is applied to the powertrain by the energy storage/release device 124 during the execution of the firing sequence at the engine 150.

On the other hand, if it has been determined that the firing sequence requires mitigation, the firing fraction calculator 112 and/or the firing timing determination module 120 transmit the firing fraction and/or firing sequence to the NVH reduction module 121 before the firing sequence is used to operate the engine. Based on these inputs, the NVH reduction module 121 is arranged to determine a suitable smoothing torque that would bring the NVH generated by the firing sequence to acceptable levels. In various embodiments, the smoothing torque takes the form of one or more substantially sinusoid torque waveforms that are applied to the powertrain and that oppose particular variations in the torque generated by the skip fire firing sequence. The argument of the sinusoidal torque waveform may be based on the crank angle of the engine. That is, the smoothing torque can be described as smoothing torque=sin (f*θ+φ) where θ is the crank angle, φ is the phase and f=4/N (for a V8 engine) where N is the denominator of the firing fraction level.

In various embodiments, the smoothing torque waveform is applied to the powertrain by the energy storage/release device 124. The smoothing torque involves sequentially adding torque to and then subtracting torque from the powertrain. The timing, magnitude and pattern of the smoothing torque may be based on a variety of factors, including but not limited to the skip fire firing sequence, the engine speed, battery charge or charging level in an alternative storage device, i.e. capacitor, and the current cylinder number.

It should be noted that various implementations of the smoothing torque as described here differ from some prior art systems that used an electric motor to fill in missing torque pulses from a skipped cylinder. Such a system requires delivering high bandwidth and amplitude torque pulses from the energy storage/release device 124. Various implementations of the present invention do not attempt explicitly to fill in a torque hole created by a skipped firing opportunity. Rather, such implementations consider the overall torque signature generated by a particular firing fraction or firing sequence. In these implementations, the control electronics seek to counter the torque variation associated with one or more harmonics of the torque signature. Advantageously, this type of control algorithm requires a lower bandwidth energy storage/release device 124, since the control is not trying to cancel or mimic the high bandwidth components of the torque spike associated with a firing cylinder. Likewise, energy storage/release device 124 can deliver lower smoothing torque amplitudes, since the system is not trying to mimic a torque spike associated with a firing cylinder. Both the lower bandwidth and amplitude makes the hardware associated with the energy storage/release device 124 cheaper and easier to implement. A further advantage of this method is that lower frequency harmonics are felt more strongly by vehicle occupants, thus maximizing the reduction in sensed vibration for a given amount of smoothing torque.

Any suitable algorithm or technique may be used to generate the smoothing torque waveform. In some embodiments, for example, the NVH reduction module 121 receives a firing sequence from the firing timing determination module 120, which will be later used to operate the engine 150. The NVH reduction module 121 determines variations in the engine torque that would be generated by the firing sequence. The variations in the engine torque are responsible for the generation of NVH. The smoothing torque includes variations that oppose and help cancel out one or more types of variations in the engine torque.

The characteristics of the smoothing torque may vary widely, depending on the needs of a particular application. Consider an example process, similar to what was described above, in which the firing fraction calculator 112 selects an operational firing fraction that is known to generate unacceptable amounts of NVH. Thus, the NVH must be mitigated. Accordingly, the firing timing determination 120 generates a skip fire firing sequence based on the operational firing fraction, which is transmitted to the NVH reduction module 121 for analysis.

The NVH reduction module 121 determines an expected engine torque based on the skip fire firing sequence, engine speed, firing fraction and/or any other suitable parameter. In some implementations, this engine torque is understood to include a fixed component (i.e., a DC term) and a variable component that can be represented by multiple harmonic sinusoids, including a first harmonic (fundamental frequency) and other harmonics. The fixed DC term propels the vehicle and the harmonics are the unavoidable result of the variation in torque generated by an internal combustion engine as its cylinders move through the various strokes of a combustion cycle. These harmonic sinusoids or variations in the engine torque are considered to be the source of the NVH. The NVH reduction module 121 determines a smoothing torque, which is applied to the powertrain using a particular pattern or sequence. In various embodiments, the characteristics of the smoothing torque pattern or sequence (e.g., frequency, magnitude and phase) are designed to at least partially counter or oppose a selected set of one or more of the harmonic sinusoids.

Figure 7:
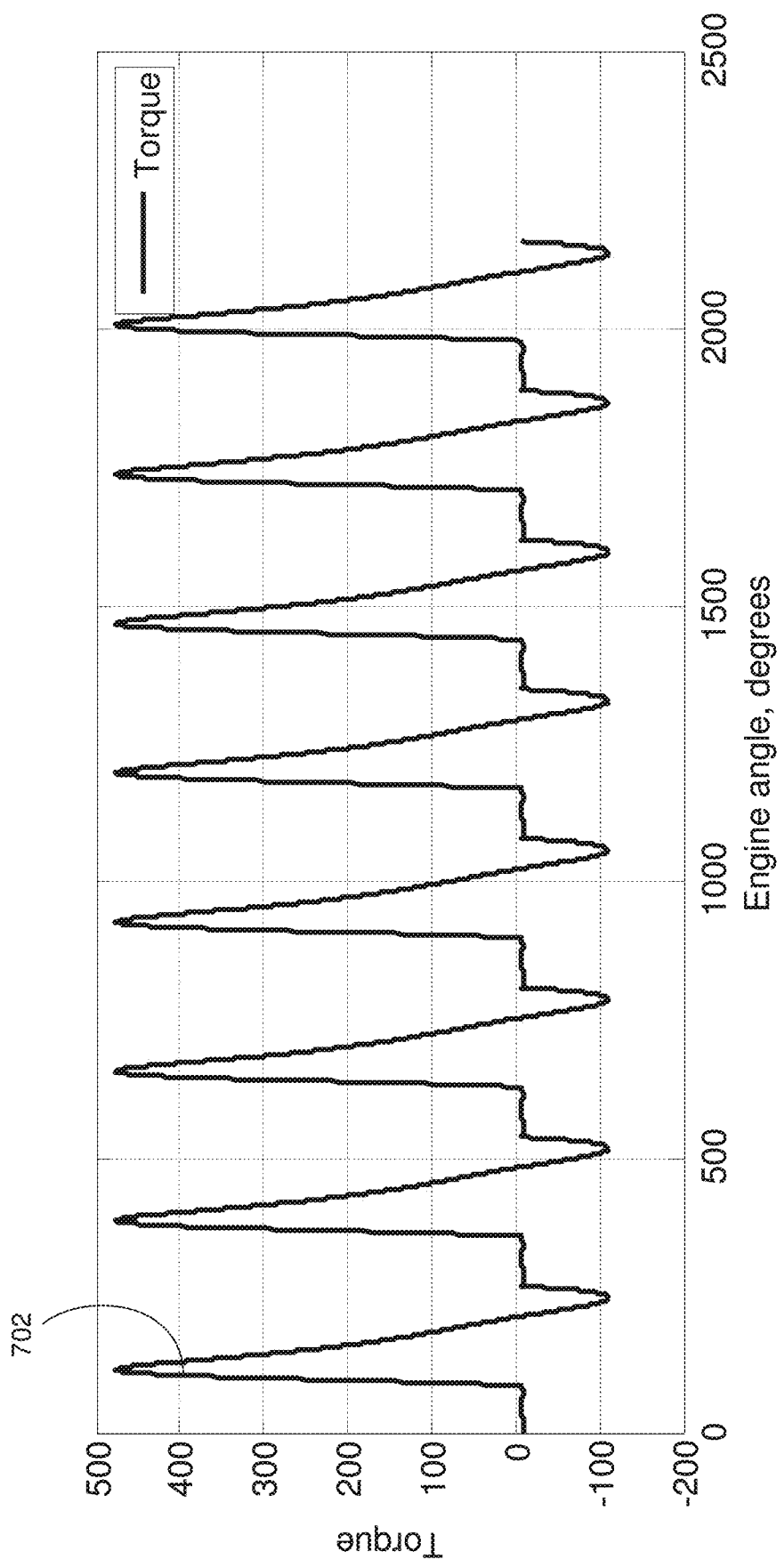
FIG. 7 is a diagram of an engine torque waveform according to one embodiment of the present invention.

An example of this concept is shown in FIGS. 7-11. FIG. 7 is a graph illustrating engine torque (N*m) applied to the crankshaft/powertrain as a function of engine angle. That is, the graph indicates a waveform 702 that represents the engine torque generated by a sample skip fire firing sequence. In this example, the average torque is approximately 87 N*m. This average torque is the fixed component of the engine torque i.e., the DC term. Using the techniques of Fourier analysis, the engine torque waveform 702 can be expressed as the sum of this fixed component and various harmonics each having a fixed amplitude. (i.e., multiple harmonics including a first harmonic, second harmonic . . . tenth harmonic, etc.)

Figure 8:
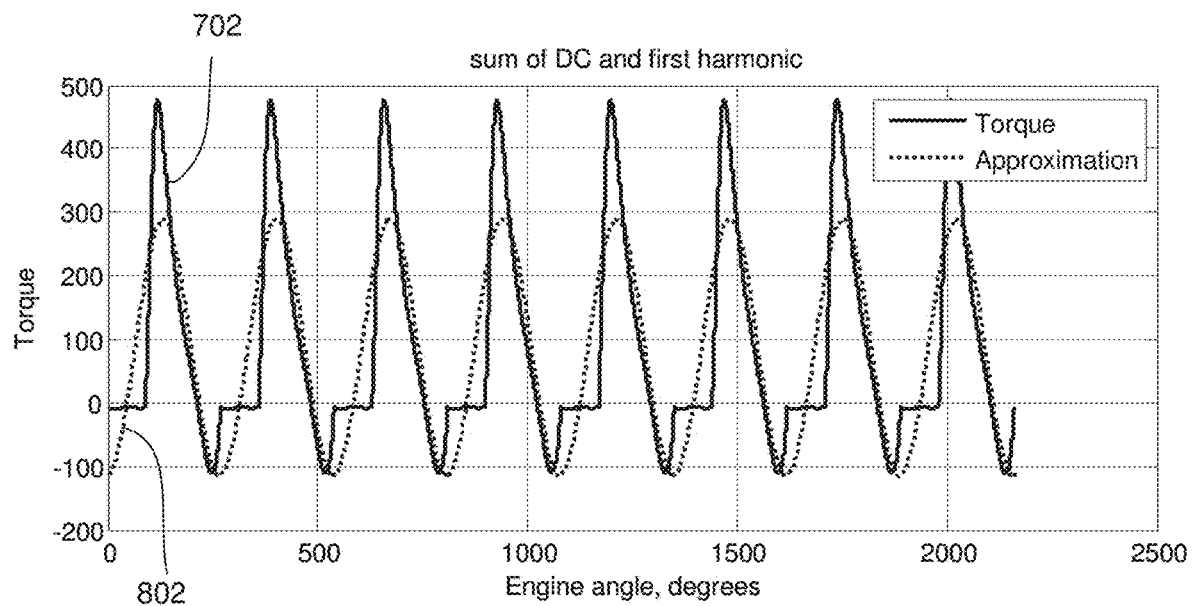
FIG. 8 is an example diagram of a first harmonic superimposed over the engine torque waveform illustrated in FIG. 7.
Figure 9:
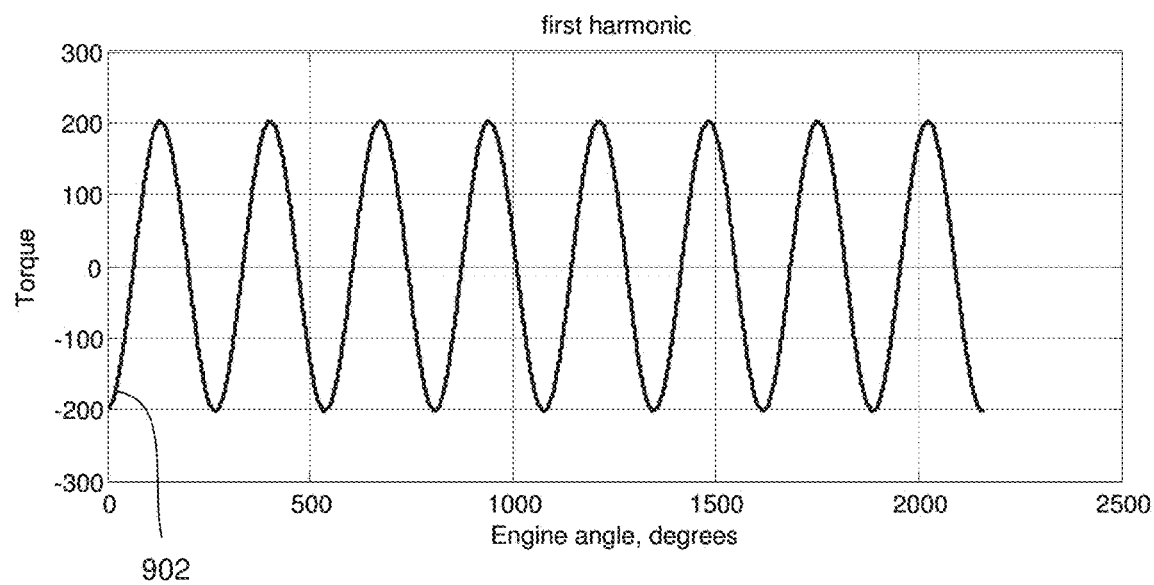
FIG. 9 is an example diagram of a first harmonic.

An example DC plus first harmonic waveform 802 is shown in FIG. 8, superimposed over the engine torque waveform 702. The offset first harmonic waveform 802, has a frequency that matches the fundamental frequency of the waveform 702. As can be seen in FIG. 8, offset first harmonic waveform 802 matches a significant fraction of the engine torque waveform 702. The first harmonic component can be isolated by subtracting the average torque (e.g., DC offset of 87 N*m) from waveform 802. This results in first harmonic waveform 902 of FIG. 9. In various embodiments, a smoothing torque waveform is generated to counter the waveform 902 i.e., to subtract torque from the powertrain when the waveform 902 adds torque to the powertrain, and to add torque to the powertrain when the waveform 902 subtracts torque from the powertrain.

Various approaches involve a smoothing torque that has characteristics (e.g., frequency) that are generally identical or substantially similar to those of a selected set of one or more of the harmonic sinusoids, except that the amplitude may be different and the phase is shifted (e.g., 180°) so that the smoothing torque reduces or cancels the selected harmonic sinusoid(s). In some embodiments, the smoothing torque is arranged to only oppose, be based on and/or have the same frequency as the first harmonic. That is, in various embodiments, the smoothing torque is not based on, has a different frequency from and/or does not oppose the other harmonics in the expected engine torque. The inventors have determined that in various applications, only one or a few harmonic sinusoids need to be cancelled or reduced in order to bring NVH to an acceptable level. In the example case shown in FIGS. 7-9 the smoothing torque can simply be configured to cancel or reduce to an acceptable level the first harmonic waveform 902. The smoothing torque may thus have the same frequency and amplitude as the first harmonic waveform 902, but may simply be offset in phase by 180 degrees. In still other embodiments, the smoothing torque takes into account and opposes multiple harmonics (e.g., the first harmonic and one or more other harmonics, etc.)

In further embodiments a DC term may be added to the smoothing torque. If the DC term is adequately large, then the smoothing torque will be uniformly in one direction; this may eliminate or reduce the impact of any non-linear behavior (e.g. dead-zone, lash, etc) arising when a energy storage/release device crosses zero net delivered torque. The DC term can be in either direction, i.e. the energy storage/release device can store energy from the powertrain or release energy to the powertrain. The DC term can be zero. The magnitude and sign of the DC can depend on a number of factors including battery or capacitor charge level, torque demand, or other operating characteristic.

Figure 10:
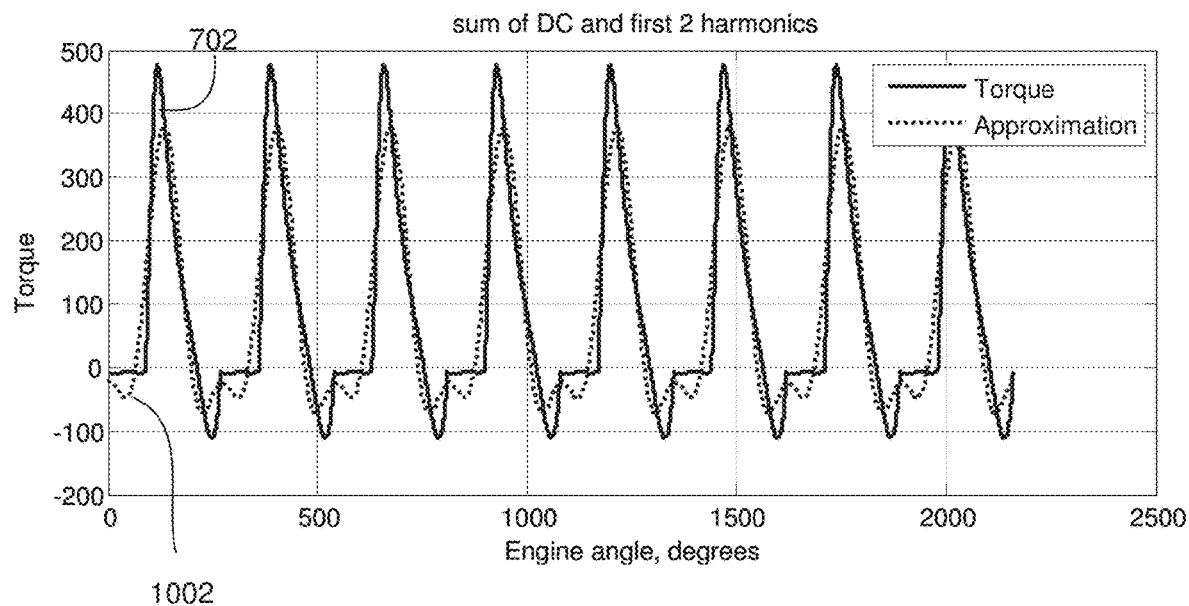
FIG. 10 is an example diagram of a waveform including the first and second harmonics superimposed over the engine torque waveform illustrated in FIG. 7.
Figure 11:
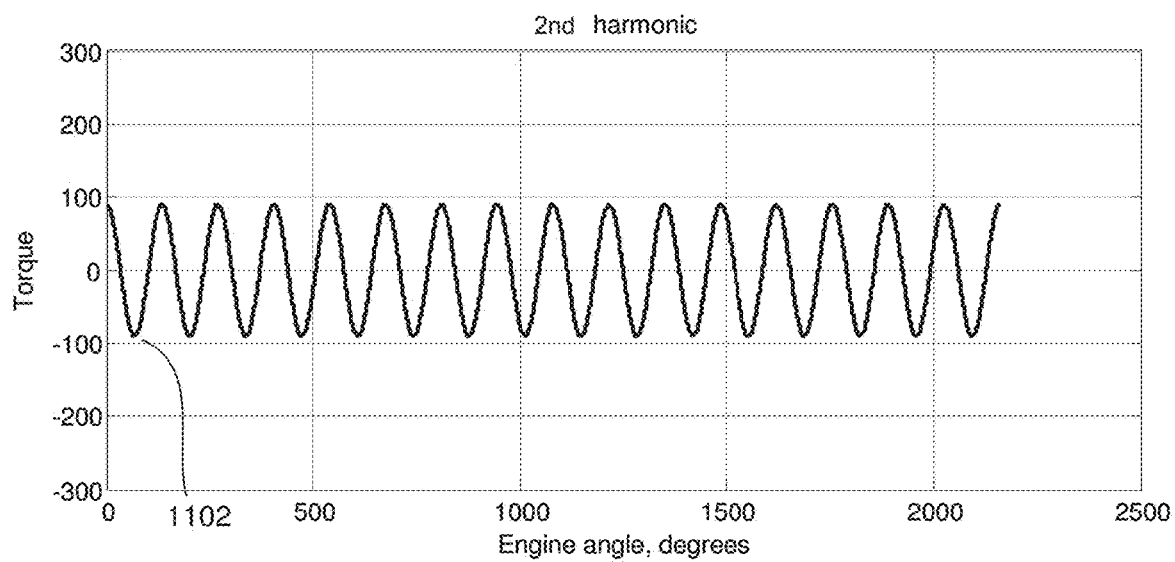
FIG. 11 is an example diagram of a second harmonic.

FIG. 10 illustrates a constant term and two harmonics (i.e., the first and second harmonic) represented by waveform 1002 being isolated and superimposed over the example engine torque waveform 702. As can be seen by comparing FIGS. 8 and 10, the two harmonics, when combined, even better match the overall variation in the engine torque waveform 702 than was the case for the offset first harmonic alone in FIG. 8. FIG. 11 illustrates a second harmonic waveform 1102, which represents the second harmonic after the DC and first harmonic terms have been removed. As can be seen by comparing FIGS. 9 and 11, the amplitude of the first harmonic waveform 902 is substantially greater than the amplitude of the second harmonic waveform 1102. That is, the engine torque waveform 702 has a larger first harmonic component than second harmonic component. The larger first harmonic component will generally generate more undesirable NVH and thus control algorithms may focus on cancelling or reducing this harmonic component. In various applications, the smoothing torque is arranged to oppose only the first harmonic (e.g., waveform 902 of FIG. 9), and not any other harmonics. It has been determined that in some designs, this simplifies calculation and implementation of the smoothing torque and nevertheless is sufficient to bring NVH down to acceptable levels. In still other embodiments, the smoothing torque is arranged to cancel or oppose multiple harmonics (e.g., a composite waveform including waveforms 902 and 1102). Cancelling higher harmonics may be advantageous in reducing acoustic noise arising from the induced vibration. For example, the first and some harmonic other than the second may be substantially cancelled. Specifically harmonics that are in the vicinity of the cabin boom frequency may be advantageously substantially cancelled or reduced.

The magnitude (e.g., amplitude) of the smoothing torque may vary, depending on different conditions and applications. In various embodiments, for example, the magnitude of the smoothing torque is substantially lower than the magnitude of the engine generated harmonic sinusoid(s) that it opposes. In these embodiments, the magnitude of the smoothing torque is arranged to reduce, not eliminate engine NVH and to bring the NVH below a predefined level that is determined to be acceptable to vehicle occupants. What defines this predefined NVH level may vary between different engine and vehicle designs. In various embodiments, user testing is performed to determine the acceptable level of NVH. Additionally, this predefined level of acceptable NVH may also be adjusted dynamically based on a variety of conditions, such as accelerator pedal position, the rate of change in the accelerator pedal position, road conditions, operating gear, vehicle speed, cabin noise level, presence of engine idle and any other suitable parameter. Such conditions may be detected by one or more suitable sensors.

In some implementations, the smoothing torque is also adjusted based on feedback received from sensor unit 122. Sensor unit 122 includes one or more sensors that may detect a variety of engine parameters, including but not limited to crankshaft speed/acceleration, accelerometer data, vibration, etc. By way of example, accelerometers may be positioned at a seat rail, adjacent to, and/or inside an ECU in order to detect vibrations felt by vehicle occupants. Based on the feedback received from the sensor unit 122, the smoothing torque is dynamically adjusted. By way of example, the timing (phase) and magnitude of the smoothing torque sequence may be changed based on the sensor input. It should be appreciated that the above sensor feedback is not required, and that in various embodiments the smoothing torque generation system is a feed forward system.

Once the NVH reduction module prepares a suitable smoothing torque, the NVH reduction module operates the energy storage/release device 124 to apply the smoothing torque to the powertrain. The application of the smoothing torque is coordinated with the execution of the corresponding firing sequence at the engine 120. As a result, the smoothing torque opposes particular variations in the engine torque, and the NVH generated by the skip fire firing sequence is reduced.

In the illustrated embodiment, an optional power train parameter adjusting module 116 is provided that cooperates with the firing fraction calculator 112. The power train parameter adjusting module 116 directs the firing control unit 140 to set selected power train parameters appropriately to insure that the actual engine output substantially equals the requested engine output at the commanded firing fraction. By way of example, the power train parameter adjusting module 116 may be responsible for determining the desired mass air charge (MAC), sparking timing, and valve timing and/or other engine settings that are desirable to help ensure that the actual engine output matches the requested engine output. Of course, in other embodiments, the power train parameter adjusting module may be arranged to directly control various engine settings.

It should be appreciated that valve control may be implemented in a variety of manners. In some embodiments, valve timing may be controlled by a cam. Some embodiments may utilize a single cam with a fixed lift schedule whereas in other embodiments valve lift may be selected by adjusting between different cams having different lobe profiles. Valve lift may also be changed by adjusting the mechanical relationship between a single cam lob and its associated valve. Valve deactivation may be realized by use of a lost motion lifter, a zero lift cam, or a change in the mechanical relationship between a cam and its associated valve. In some embodiments, a cylinder may have more than one intake valve and/or more than one exhaust valve, which may be actuated by either a single cam or many have separate cams with different profiles and timing. In some embodiments, electromagnetic valve actuation may be used, which gives almost complete flexibility in implementing different valve lift and timing arrangements.

The firing fraction calculator 112, the firing timing determination module 120, the NVH reduction module 121, the power train parameter adjusting module 116, the sensor unit 122 and the other illustrated components of FIG. 1 may take a wide variety of different forms and their functionalities may alternatively be incorporated into an ECU, or provided by other more integrated components, by groups of subcomponents or using a wide variety of alternative approaches. In various alternative implementations, these functional blocks may be accomplished algorithmically using a microprocessor, ECU or other computation device, using analog or digital components, using programmable logic, using combinations of the foregoing and/or in any other suitable manner.

Although not required in all implementations, in some implementations determination of an appropriate firing fraction and/or the smoothing torque (i.e., a determination as to whether smoothing torque will be used and what the smoothing torque will be) may be made on a firing opportunity by firing opportunity basis. That is, the currently desired firing fraction and/or smoothing torque can be re-determined before each firing opportunity based on the accelerator pedal position or other operating parameters. This allows the controller 100 to be particularly responsive to changing demands (e.g., change in the manifold absolute pressure or other engine parameters) while maintaining the benefits of skip fire operation. In other implementations the torque generated while changing firing fractions can be predicted and a control system based on adaptive filters or model predictive control may be used to improve NVH.

One example where firing opportunity by firing opportunity control is advantageous is when the desired firing fraction changes. A particular example is if the firing fraction changes from ½ to 1. In this example, the MAP needs to be reduced to generate the right level of torque, but this is slow, i.e. MAP has limited ability to change on a firing opportunity by firing opportunity basis. One prior art solution to this problem, such as described in U.S. patent application Ser. No. 13/654,244, is to adjust the firing fraction at a relatively low speed to match the expected change in MAP. By constantly recalculating and delivering an appropriate smoothing torque, the NVH reduction module can remove excessive torque resulting from a too-high MAP, allowing a faster transition.

In some embodiments, the smoothing torque may be determined using a precalculated future firing sequence in a short-horizon optimal control computation. This control method is particularly useful when the firing sequence is non-repeating, such as during a transition between firing fraction levels. Herein short-horizon may refer to the firing decisions that have been made, but not yet implemented. This may be in the range of 4 to 20 firing opportunities, but could be more or less. Since these decisions are known before they are implemented the smoothing torque can be precalculated. The smoothing torque may include both negative and positive torques in order to obtain optimum NVH-fuel economy tradeoff, subject to motor/generator and energy storage device constraints. Motor/generator constraints may include maximum allowable torque and power levels. Energy storage constraints may include current energy storage level and well as the maximum power transfer from the energy storage device.

Figure 2:
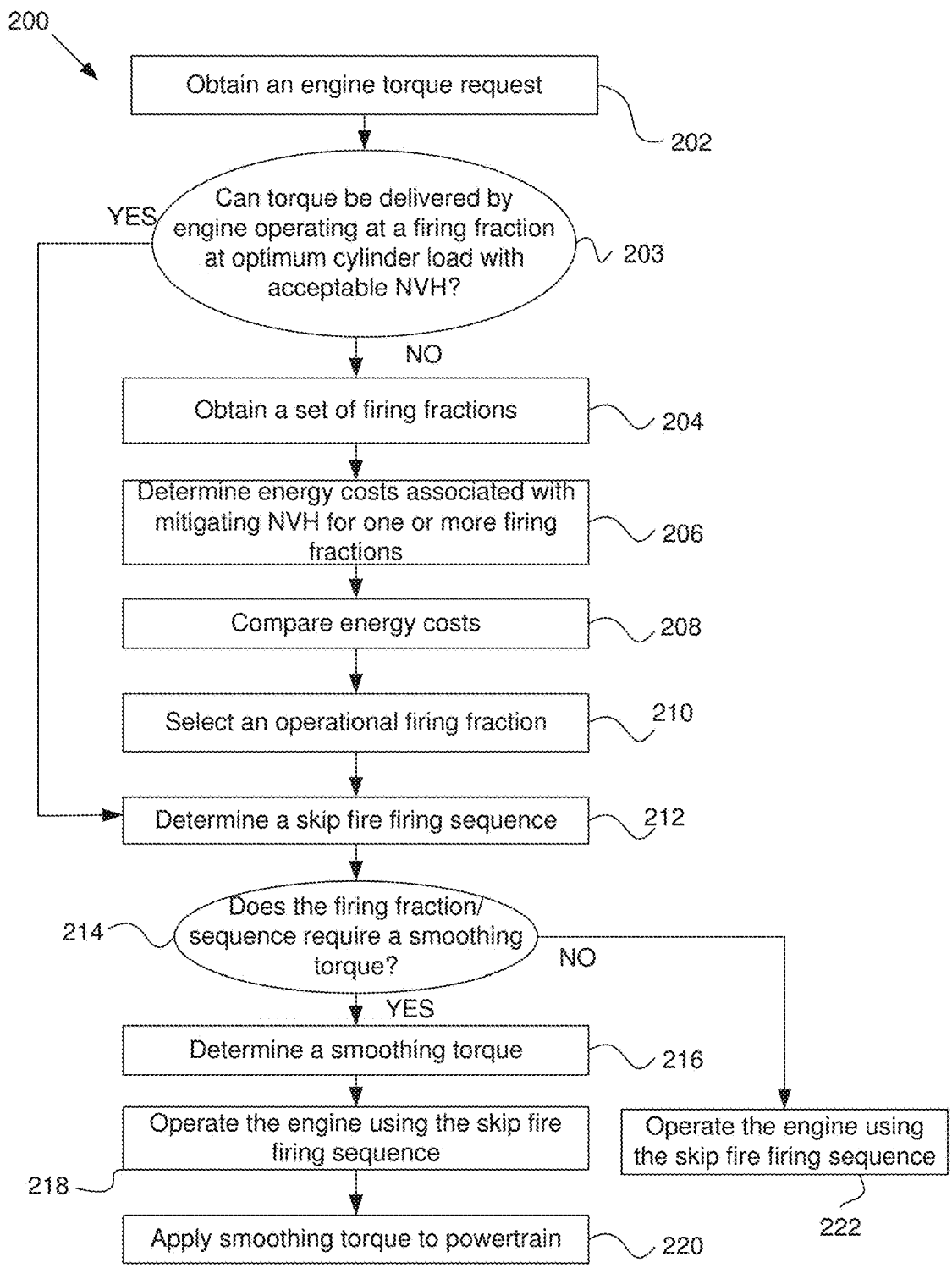
FIG. 2 is a flow chart that diagrammatically illustrates a method for reducing noise, vibration and harshness (NVH) in a skip fire engine control system according to one embodiment of the present invention.

Referring next to FIG. 2, a method 200 for determining a smoothing torque according to a particular embodiment of the present invention will be described. Initially, at step 202, an engine torque request is received. In various implementations, the firing fraction calculator 112 determines a requested or desired engine torque based on the accelerator pedal position, engine speed, a cruise controller setting and any other suitable engine parameter.

Steps 203, 204, 206 and 208 relate to a process for evaluating different candidate firing fractions to select an operational firing fraction that delivers the desired torque and has acceptable NVH characteristics, either with or without any mitigation. In some embodiments, the powertrain controller performs these steps as appropriate when an operational firing fraction needs to be selected. In other embodiments, however, the evaluating of different candidate firing fractions is instead incorporated into an algorithm, lookup table or any other suitable decision making mechanism. That is, rather than dynamically comparing different candidate firing fractions on the fly, the powertrain controller instead may consult a table or other mechanism that directly generates the operational firing fraction based on various inputs. In that case, the method proceeds directly to step 210.

Returning to step 203 of FIG. 2, after a desired torque level is obtained, the firing fraction calculator 112 determines whether an available firing fraction with acceptable NVH characteristics can deliver the desired torque while operating at optimum cylinder load e.g., the cylinder load which maximizes fuel economy. In some embodiments, for example, the firing fraction calculator 112 stores data indicating a set of such firing fractions that are known to have acceptable NVH characteristics while operating under optimum cylinder load under certain operational conditions. It should be appreciated that which firing fractions produce acceptable NVH is a function of the engine speed and transmission gear as described in co-pending U.S. patent application Ser. Nos. 13/654,244 and 13/963,686, which are incorporated herein in their entirety for all purposes. If one of these firing fractions can deliver the desired torque, then the method proceeds to step 212 and that firing fraction becomes the operational firing fraction.

If the firing fraction calculator 112 determines that there is no firing fraction with acceptable NVH characteristics that can deliver the desired torque at optimum cylinder load, then the method proceeds to step 204. At step 204, the firing fraction calculator obtains a set of candidate firing fractions. The set of firing fractions may include two types of firing fractions. One type involves one or more candidate firing fractions with acceptable NVH characteristics that deliver the desired torque, but only if the cylinder output is adjusted to a non-optimal load, as discussed in U.S. patent application Ser. No. 13/654,244, which is incorporated herein by reference in its entirety for all purposes. For the purpose of this application, such a firing fraction is referred to as a "low NVH firing fraction." The other type of firing fraction involves one or more candidate firing fractions that can deliver the desired torque with less or minimal cylinder load adjustment, but the NVH associated with such firing fractions may be unacceptable without mitigation. For the purpose of this application, such a firing fraction is referred to as a "high NVH firing fraction."

At step 206, energy costs associated with mitigating NVH for the high NVH firing fraction(s) is/are determined. This may be performed in a wide variety of ways. One example approach is described below.

In this example, the firing timing determination module 120 generates a candidate skip fire firing sequence based on the candidate high NVH firing fraction. The torque generated by the skip fire firing sequence and firing fraction can be modeled as a periodic waveform. That waveform, in turn can, be represented as a Fourier series:

$$Tq(t) = a_0 + \sum_{n=1}^{\infty}\left(a_n \cos\frac{n2\pi t}{T} + \varphi_n\right) \quad (1)$$

where Tq(t) is the torque as a function of time, $a_0$ is the average torque (DC term), $a_n$ is the amplitude associated with the $n^{th}$ harmonic component, T is the period of the first harmonic (fundamental frequency), and $\varphi_n$ is the phase of the $n^{th}$ harmonic component.

Human perception of NVH varies with frequency. Typically lower frequencies, below approximately 8 Hz, are perceived as more annoying than higher frequency oscillations. The relative contribution of each harmonic component to NVH can be defined by a weighting factor, $w_n$. If $w_n$ is the weight of the $n^{th}$ harmonic, total NVH can be determined by taking the RMS value of the product of the weighting functions and the magnitude of the various harmonic frequencies:

$$NVH = \sqrt{\frac{1}{2}\sum_{n=1}^{\infty} w_n^2 a_n^2} \quad (2)$$

If an energy storage/release device 124 is included in the powertrain, Eq. 2 needs to be modified to include a smoothing torque applied to the powertrain by the energy storage/release device 124. The smoothing torque can be expressed by a Fourier expansion similar to Eq. 1 where the $n^{th}$ harmonic component has a magnitude $e_n$. Equation 3 below represents the NVH including the effect of the smoothing torque, assuming the phase of each harmonic term of the smoothing torque is shifted by 180 degrees from the engine torque:

$$NVH = \sqrt{\frac{1}{2}\sum_{n=1}^{\infty} w_n^2 (a_n - e_n)^2} \quad (3)$$

The power required to create the above mitigating waveform or smoothing torque is as follows:

$$P = (1-\eta)\sqrt{\frac{1}{2}\sum_{n=1}^{\infty} (e_n)^2} \quad (4)$$

here $\eta$ is the round trip efficiency of the energy storage/release device. Put another way, Equation 4 indicates the amount of energy required by the energy storage/release device 124 to generate the corresponding smoothing torque. Typical values for $\eta$ are 0.7 to 0.9 for an energy storage/release device based on a motor/generator and capacitive energy storage. Other energy storage/release devices may have higher or lower efficiencies.

It should be appreciated that Eq. 4 assumes that round trip efficiency is constant for all harmonics and that a single energy source/sink is used. Generally these are valid assumptions as typically an internal combustion engine is the ultimate source of all energy to drive the vehicle and only a single energy storage/release device exists within the vehicle. While this is generally the case, there are vehicle architectures where this may not be true. For example, plug in hybrids obtain energy from the electrical grid. Likewise vehicles with regenerative braking may store energy in an energy storage/release device independent of the internal combustion engine. In these cases a supervisory module can access the relative costs of energy from different sources and use the optimal source or mix of sources to apply the smoothing torque. It should be noted that the round trip efficiency of storing powertrain energy and releasing powertrain energy is always less than one. The energy deficiency associated with this energy transfer can be factored in during NVH mitigation, management of the energy level of a capacitor, from a battery, etc.

In Eqs. 3 and 4, note that the smoothing torque harmonic components $e_n$ need not have the same magnitude as their corresponding engine generated harmonic components $a_n$. That is, the smoothing torque need not eliminate all NVH, but instead may bring it down to a target, acceptable NVH level. At the target NVH level, the NVH may be composed of two components, NVH from harmonics that are not mitigated, i.e. the higher harmonics and NVH from harmonics that may be incompletely cancelled.

Thus, the challenge is to determine the lowest level of energy consumption required to reach a target, acceptable NVH. This optimization problem may be expressed as a cost function captured by the following equation:

$$\min_{e_n} P = \sqrt{\frac{1}{2}\sum_{n=1}^{\infty} (e_n)^2} \quad (5)$$

subject to the following constraint:

$$NVH_{target} \geq \sqrt{\frac{1}{2}\sum_{n=1}^{\infty} w_n^2 (a_n - e_n)^2} \quad (6)$$

Figure 4:
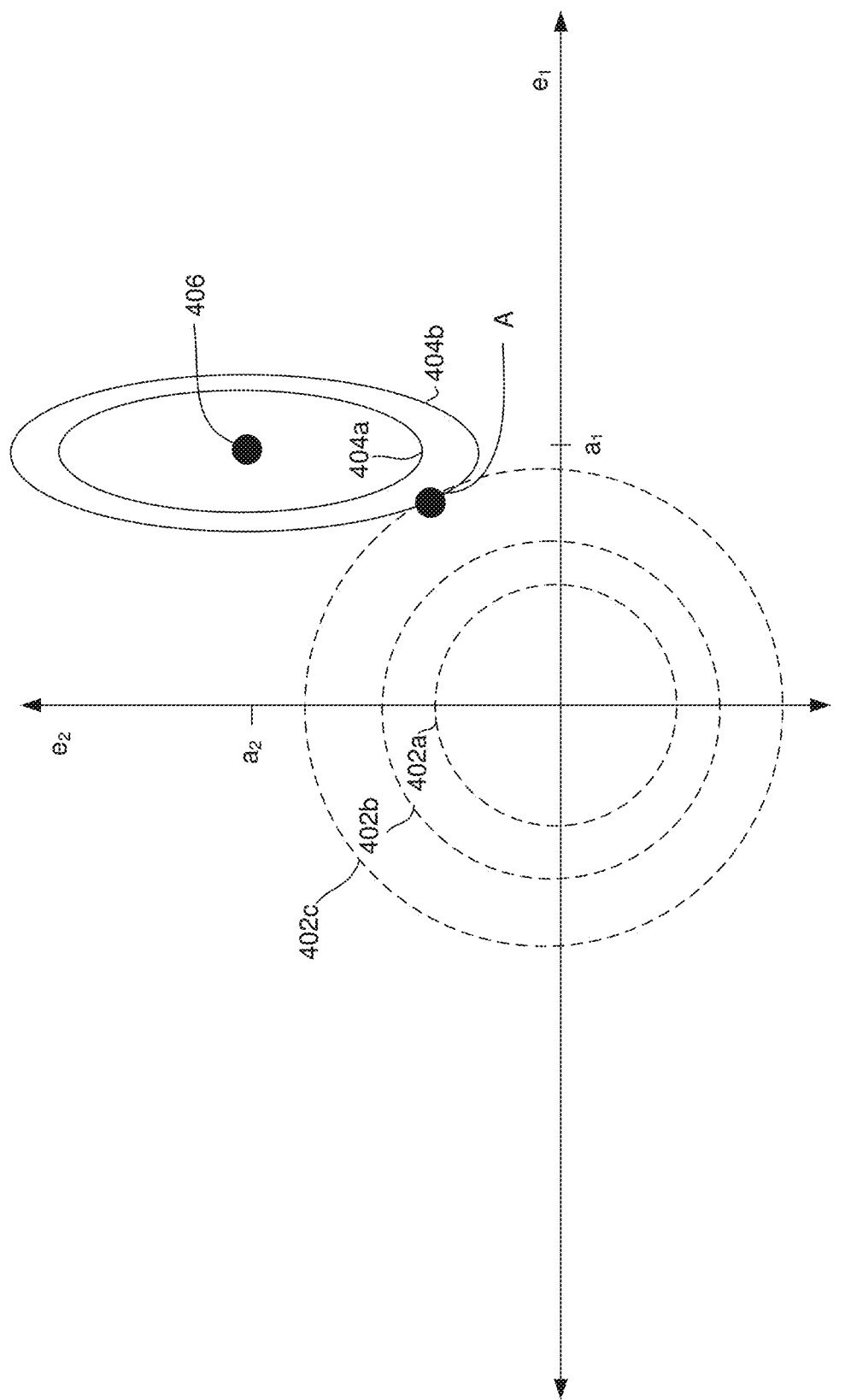
FIGS. 4 and 5 are diagrams illustrating example techniques for optimizing the reduction of NVH according to one embodiment of the present invention.
Figure 5:
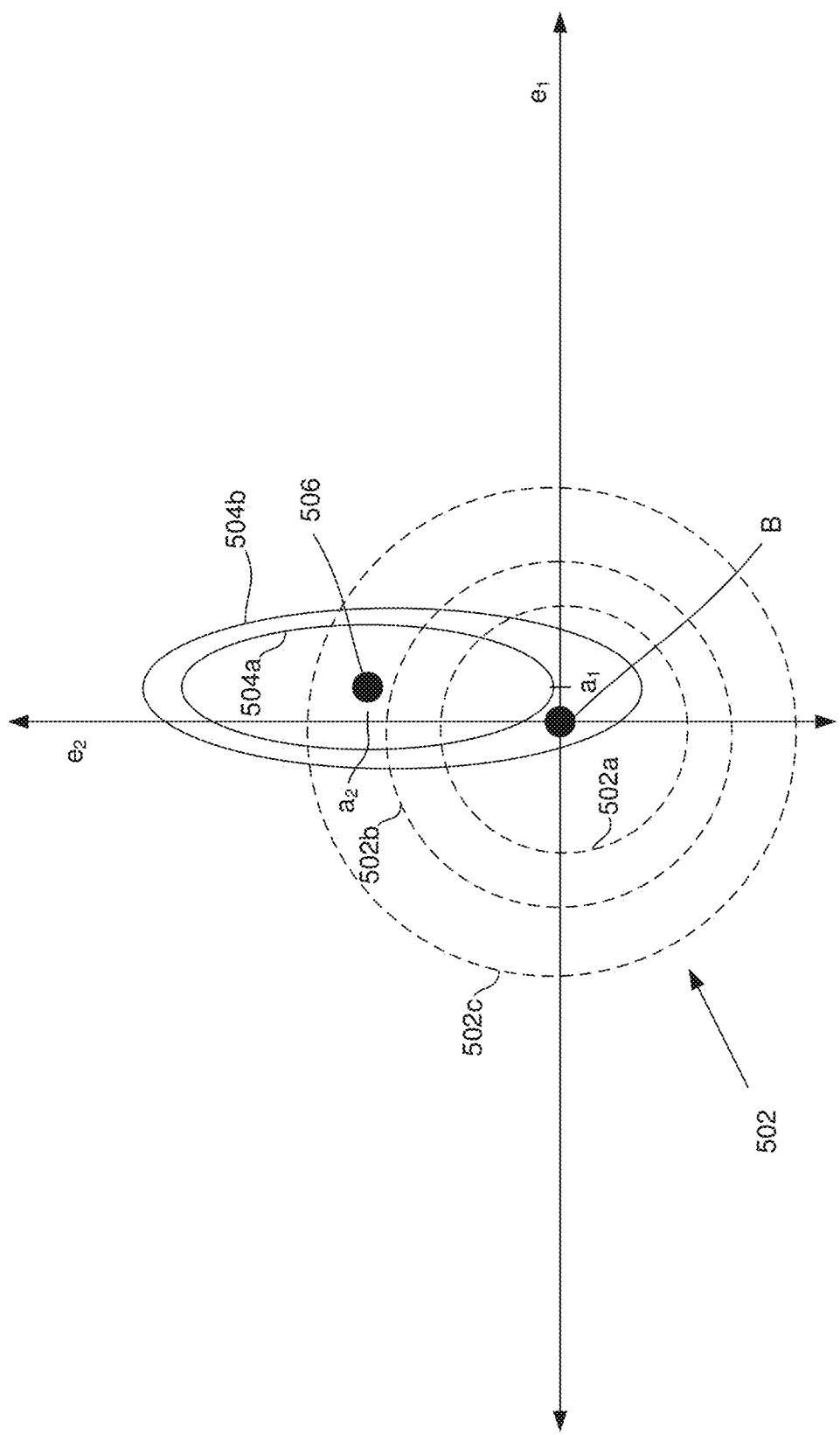

This optimization problem may be represented graphically. Two simplified examples are illustrated in FIGS. 4 and 5. FIG. 4 illustrates a set of circles 402a, 402b and 402c and a set of ellipses 404a and 404b, which represent the energy cost function i.e., equation (5) and the constraint function i.e., equation (6), respectively for a particular candidate firing fraction. This sample graph involves only the first two harmonics. The magnitude of the first harmonic smoothing torque component $e_1$ is given along the horizontal axis and the magnitude of the second harmonic smoothing torque component $e_2$ is give along the vertical axis. The values of the engine generated first and second harmonic components $a_1$ and $a_2$, respectively are noted. Each cylinder load, firing fraction, engine speed, and transmission gear will have an associated set of $a_1$ and $a_2$ that can be determined through vehicle calibration or some other means.

In FIG. 4, each concentric circle in circle set 402a-402c represents a constant amount of consumed energy to mitigate torque, assuming that the efficiency of the energy storage/release device 124 is the same for the first and second harmonic frequencies. The smaller the circle, the less energy used. The center of the circle set, the origin, indicates a point at which no energy is used, i.e. $e_1=e_2=0$. Each concentric ellipse in the ellipse set 404a-404b represents a target NVH level generated by the first and second harmonic components. Any point on or inside the chosen target NVH ellipse will produce an acceptable NVH level. The eccentricity of ellipses 404a and 404b is determined by the ratio of the weighting factors $w_2/w_1$. For equal weighting factors, the ellipses reduce to circles. Generally, humans are more sensitive to the lower frequency first harmonic and thus the ellipses are elongated vertically in FIG. 4. Less variation is required in $e_1$ than $e_2$ to change NHV by a fixed amount. The smaller the ellipse, the lower the allowed NVH. The center 406 of the ellipses 404a and 404b represents a situation in which all NVH associated with the first and second harmonics has been eliminated. At point 406, $a_1=e_1$ and $a_2=e_2$, the smoothing torque exactly cancels the first and second harmonics of the engine generated torque variation.

To optimize energy costs, it is desirable to consume as little energy as possible while bringing NVH down to an acceptable level. Assuming the acceptable NVH level is defined by ellipse 404b, this goal is realized at point A, where ellipse 404b and the circle 402c intersect. Point A yields an acceptable NVH, since it is on ellipse 404b and minimized energy consumption, since this point on ellipse 404b is closest the origin, i.e. the circle 402c is as small as possible consistent with intersecting ellipse 404b.

For purposes of comparison, FIG. 5 illustrates a diagram involving a different vehicle operating point, i.e. cylinder load, firing fraction, engine speed, and/or transmission gear. For example, the engine torque, engine speed and transmission gear may be identical to those of FIG. 4, but the firing fraction and cylinder load may be different This operating point has markedly different NVH characteristics than the firing fraction and cylinder load corresponding to FIG. 4. FIG. 5 has similar axes to FIG. 4 and the concentric circles 502a, 502b, and 502c represent constant energy expenditure from the energy storage/release device 124. Similarly, ellipses 504a and 504b represent different acceptable levels of NHV produced by the first and second harmonic components. In FIG. 5 the engine generated first and second harmonics are $a_1$ and $a_2$, respectively. If $e_1=a_1$ and $e_2=a_2$ the powertrain operates at point 506 and no NVH is produced by the first and second harmonics. Assuming that the acceptable NVH level is defined by ellipse 504b no smoothing torque from the energy storage/release device 124 is required to meet the NVH target, since point B, corresponding to $e_1=e_2=0$, lies within ellipse 504b. If ellipse 504a represented the acceptable NVH limit, then some smoothing torque mitigation would be required to reach the target.

It should be appreciated that the graphical explanation shown in FIGS. 4 and 5 is appropriate in the case where the first two harmonics may be mitigated by the energy storage/release device. If only the first harmonic is considered, the two dimensional circles and ellipses would become lines. Likewise, if the first, second, and third harmonics were considered, the circles would become spheres and the ellipses would become ellipsoids. Generally the number of optimization variables equals the number of harmonics being potentially mitigated. Any number of harmonics can be mitigated if desired, but as explained above generally only mitigation of one or two harmonics is required to obtain acceptable NVH performance.

The above approach assumes that an acceptable level of NVH has been established. The acceptable level of NVH may be determined in any suitable manner By way of example, extensive user testing can be performed to determine the amount of vibration that is acceptable to passengers in a vehicle. It should be appreciated that the acceptable level of NVH may vary dynamically based on different conditions. In some embodiments, the acceptable level of NVH is adjusted based on road conditions, user selection, operating gear, gear shift, vehicle speed, cabin noise level, presence of engine idle, the accelerator pedal position (e.g., the change in rate of the accelerator pedal position) and/or any other suitable engine parameter or criteria.

Returning to FIG. 2, using any of the above techniques, the NVH reduction module 121 determines the energy cost required to mitigate the NVH of each high NVH candidate firing fraction, such that the associated NVH is brought down to acceptable levels. The total energy cost associated with the high NVH candidate firing fraction is the sum of the mitigation costs and costs associated with operating the engine at the candidate firing fraction and cylinder load. It should be appreciated that any known technique may be performed to do this, and that the energy cost estimation process is not limited to the examples, diagrams and equations provided above.

At step 208, the NVH reduction module compares the energy costs associated with each of the candidate firing fractions. The manner in which this comparison is performed may vary depending on the characteristics of each candidate firing fraction. Consider an example in which it is assumed that each cylinder ideally is fired under optimal conditions e.g., in which throttle position, mass air charge, spark advance, valve timing, and other engine parameters are substantially optimized for fuel efficiency. Consider further that in this example, both a low NVH firing fraction and a high NVH firing fraction may be used to deliver the desired torque. The high NVH firing fraction is able to deliver the desired torque under close to optimal cylinder conditions. However, mitigation is required to reduce the resulting NVH. On the other hand, the low NVH firing fraction has the opposite problem—while it has acceptable NVH characteristics, it cannot deliver the desired torque without some adjustments in cylinder output i.e., by departing from the above optimal conditions, which results in a loss of fuel efficiency. Thus, comparing the energy costs of these two candidate firing fractions involves comparing the energy cost (losses) of adjusting the cylinder output associated with the low NVH firing fraction with the energy cost of mitigating the NVH associated with the high NVH firing fraction. Such comparisons can be performed between any number and types of candidate firing fractions.

Based on the above analysis and/or comparisons, the NVH reduction module and/or the firing fraction calculator selects the candidate firing fraction that delivers the desired torque in the most fuel efficient manner (i.e., with the lowest energy cost.) In some embodiments, other factors are taken into account in the selection process. The selected candidate firing fraction becomes the operational firing fraction (step 210).

Figure 6:
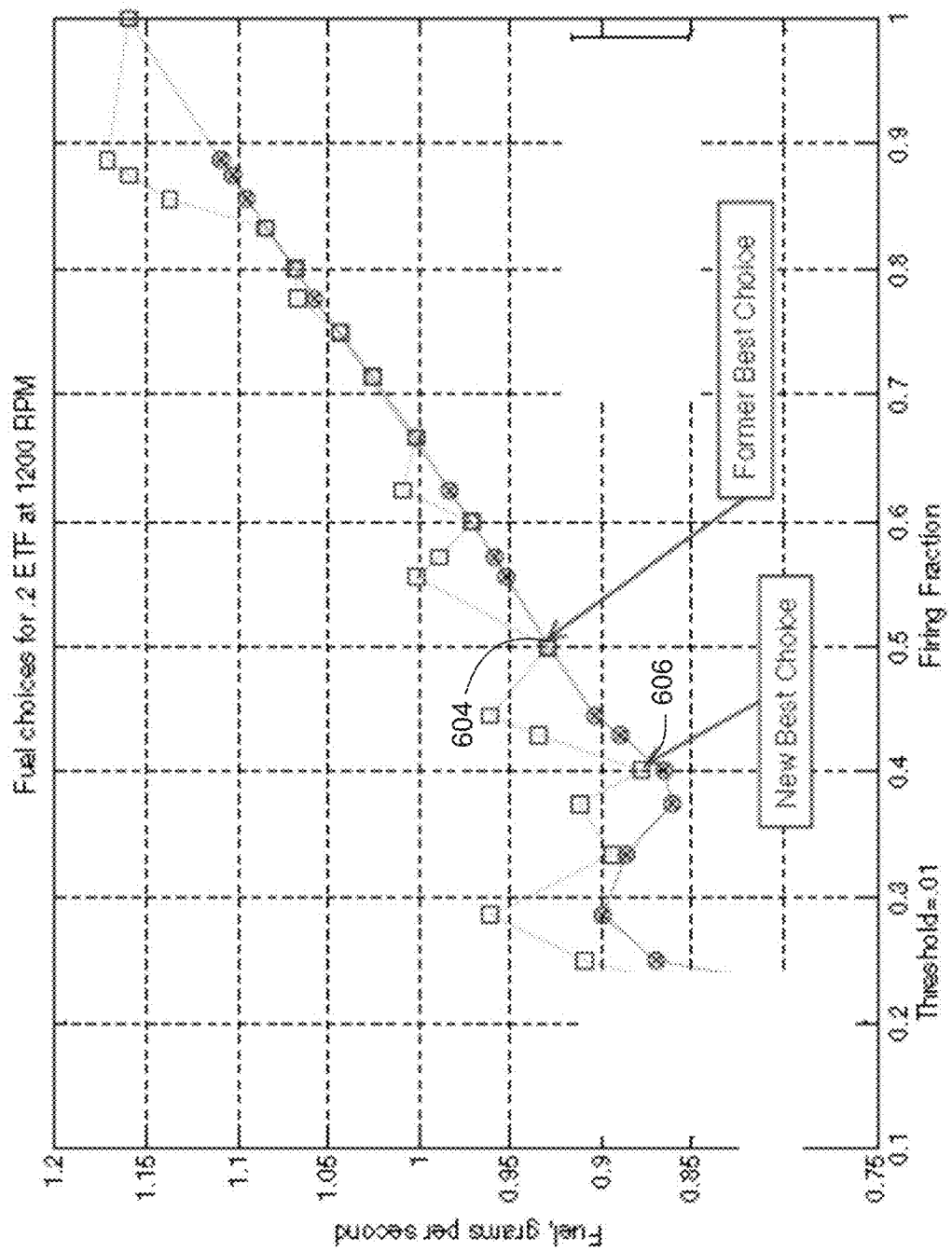
FIG. 6 is a graph of fuel consumed as a function of firing fraction according to one embodiment of the present invention.

An example process for selecting an operational firing fraction from multiple candidate firing fractions is described in FIG. 6. FIG. 6 is a graph illustrating fuel consumption, inversely related to fuel efficiency, as a function of the firing fraction. The graph assumes an engine speed of 1200 RPM and an Engine Torque Fraction (ETF) of 0.2. (In this example, ETF represents a desired engine torque. For example, an ETF=1 assumes full engine output.)

The vertical axis of the graph represents fuel consumption (grams per second). The horizontal axis represents candidate firing fractions. In this figure, data points marked by a circle within a square indicate a low NVH firing fraction, in which no NVH mitigation is required to meet an acceptable NHV. Data points with an x within the circle indicate a high NVH firing fraction, where the NVH is unacceptable without mitigation. Directly above these points are points marked with a square, which indicate the total fuel consumption associated with both operating the internal combustion engine and smoothing the torque using the aforementioned techniques to bring the NVH to an acceptable level.

Without any NVH mitigation, point 604 represents the most fuel efficient firing fraction selection i.e., a firing fraction of 0.5 that delivers the desired torque, has acceptable NVH characteristics and a fuel consumption rate of approximately 0.93 g/s. Point 606, however, is a superior choice to point 604, because point 606 requires less energy (approximately 0.87 g/s) and uses a firing fraction of 0.4, while also delivering the desired torque. Although the firing fraction of 0.4 at an engine speed of 1200 is known to generate unacceptable amounts of NVH, the NVH can be mitigated using a smoothing torque. The calculated energy cost of 0.87 g/s takes into account the energy costs of mitigation and yet is still less than the energy costs associated with point 604. Thus, in this simplified example, the firing fraction 0.4 is selected as the operational firing fraction. The fuel savings in this case ((0.93−0.87)/0.93) is about 6.5%, demonstrating the advantage of using the control method described here.

It should be noted that the selection of the operational firing faction may be based on factors other than fuel efficiency. In some embodiments, for example, the status of the energy storage/release device 124 plays a role in the selection process. That is, consider an example in which a particular high NVH firing fraction is determined to be suitable for delivering the desired torque. Additionally, the NVH reduction module 121 determines that the NVH associated with the firing fraction can be adequately mitigated with a smoothing torque e.g., using the techniques described above. The NVH reduction module 121 also determines the amount of energy required to generate a suitable smoothing torque. However, the NVH reduction module 121 and/or firing fraction calculator 112 may also determine that the firing fraction cannot be selected as the operational firing fraction, because the energy storage/release device is not currently capable of generating the necessary smoothing torque (e.g., based on battery status, a lack of stored energy, inability to provide the determined amount of energy, etc.) Conversely, if the energy storage device is nearly full, due perhaps to regenerative braking, then the cost of mitigation may be reduced compared to the prior calculation.

Returning to FIG. 2, at step 212, the firing fraction calculator 112 transmits the selected operational firing fraction to the firing timing determination module 120. Based on the operational firing fraction, the firing timing determination module 120 generates a skip fire firing sequence (step 212). At step 214, a determination is made as to whether the operational firing fraction requires NVH mitigation. If it does not (e.g., it is a low NVH firing fraction), then the method proceeds to step 222. At step 222, the engine is operated in a skip fire manner based on the firing sequence.

If it is determined that the operational firing fraction does require NVH mitigation, then the NVH reduction module 121 determines a suitable smoothing torque (step 216). The smoothing torque may involve any suitable smoothing torque or smoothing torque waveform that is applied to the powertrain by the energy storage/release device 124 to help reduce NVH generated by the firing sequence. The smoothing torque may be generated using any suitable algorithm, technique or mechanism (e.g., any of the techniques described in connection with FIG. 1.)

One approach may be described as follows. After the firing fraction calculator 112 selects an operational firing fraction and determines that a suitable smoothing torque needs to be generated, the firing fraction calculator 112 transmits the operational firing fraction to the firing timing determination module 120. The firing timing determination module then generates a skip fire firing sequence based on the operational firing fraction.

The firing sequence is transmitted to the NVH reduction module 121. The NVH reduction module analyzes the skip fire firing sequence and identifies one or more selected variations in engine torque that would be generated by the sequence. This may be performed in a wide variety of ways. In some embodiments, for example, the torque can be characterized as a torque waveform having a fixed component and a variable component (e.g., made of multiple harmonic variations/sinusoids.) Some approaches involve selecting the harmonic sinusoid whose frequency is the fundamental frequency. Other approaches involve selecting multiple harmonic sinusoids whose associated frequencies include the fundamental frequency and one or more other frequencies (e.g., the second harmonic, etc.)

The NVH reduction module 121 then generates a smoothing torque based on the selected variations/sinusoids. As previously discussed, in various approaches the smoothing torque takes the form of one or more sinusoidal waveform(s) at substantially the same frequency as the harmonics generated by the internal combustion engine. In some approaches, the smoothing torque waveform would have the same frequency as the selected variations, but be out of phase (e.g., offset by) 180° so as to cancel the torque variations generated by the engine. The smoothing torque is designed to at least partially, but not necessarily completely, cancel out the selected variation(s), which are the source of at least some NVH. In various applications, the magnitude of the smoothing torque waveform is designed to bring NVH generated by the firing sequence below a predefined level.

At step 218, the engine is operated in a skip fire manner based on the operational firing fraction selected in step 210 and its corresponding firing sequence. At step 220, the smoothing torque determined in step 216 is applied to the powertrain by the energy storage/release device 124 as the skip fire firing sequence is orchestrated at the engine. Thus, the smoothing torque helps reduce the NVH generated by the skip fire firing sequence. In various embodiments, the NVH reduction module 121 receives any suitable inputs (e.g., the firing sequence, the engine speed, the current cylinder, etc.) necessary to properly coordinate the application of the smoothing torque and the execution of the firing sequence.

The above operations of method 200 may be performed on a firing opportunity by firing opportunity basis. Alternatively, one, some or all of the above operations may be performed somewhat less frequently, such as one or more times per engine cycle.

Figure 3:
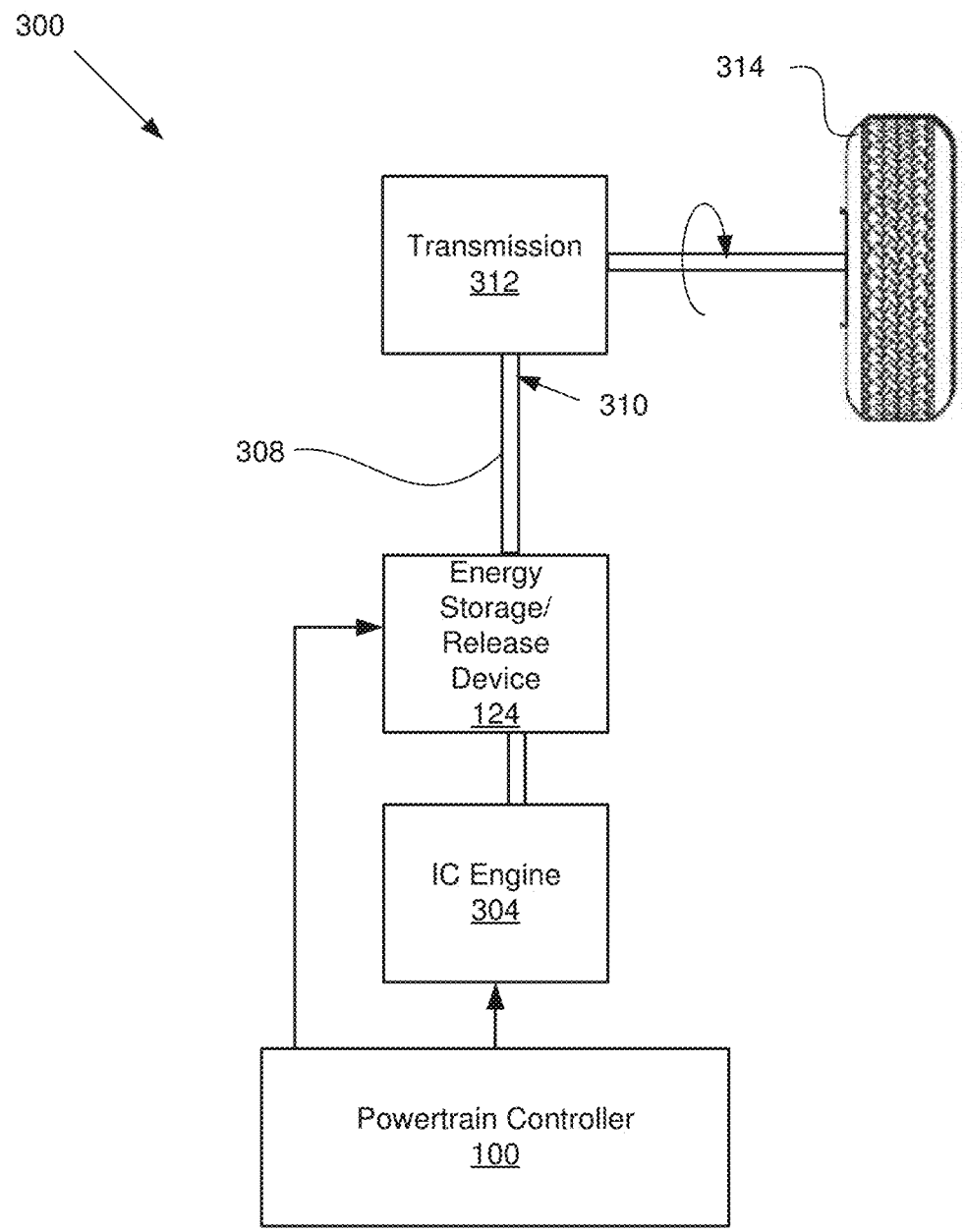
FIG. 3 is a diagram of a powertrain and a powertrain controller according to one embodiment of the present invention.

Referring next to FIG. 3, a powertrain system 300 according to a particular embodiment of the present invention will be described. The powertrain system 300 includes a powertrain controller 100, an internal combustion engine 304, an energy storage/release device 124, a crankshaft 308, a transmission 312 and wheels 314. The engine 304 and/or engine storage/release device 124 are arranged to apply torque to the crankshaft 308, which drives the wheels 314 through the transmission 312. The powertrain controller, which is described in FIG. 1, is arranged to coordinate the operation of the engine 304 and the energy storage release device 124. The powertrain system may be operated using any of the techniques described in connection with FIGS. 1, 2, 12, 13, 15, and 17B. It should be appreciated that although a particular powertrain configuration is illustrated in FIG. 3, the components of the figure may be positioned in any suitable arrangement.

The energy storage/release device 124 is arranged to add torque to or subtract torque from the powertrain. In various embodiments, the energy storage/release device 124 generates a smoothing torque pulse waveform. The smoothing torque pulse waveform applied by the energy storage/release device 124, may be substantially a sum of one or more sinusoidal waveforms applying torque at one moment and subtracting torque at another moment. Generally, the smoothing torque pulse waveform is arranged to cancel a selected variation of torque generated by the engine (e.g., as discussed in connection with the NVH reduction module 121 of FIG. 1 and step 216 of FIG. 2.)

The energy storage/release device 124 may be any suitable device or devices that can absorb or subtract torque from the powertrain, store the resulting energy, and/or use the energy to add torque to the powertrain. In various implementations, the energy storage/release device 124 includes a motor/generator and a battery or a capacitor. In other implementations, the energy/storage release device 124 stores and releases energy mechanically (e.g., a flywheel), pneumatically or hydraulically.

Some embodiments involve an energy storage/release device 124 that is arranged to have multiple applications i.e., other applications in addition to generating a smoothing torque. In some applications, for example, the energy storage/release device 124 also subtracts torque from and adds torque to the powertrain in the same manner as any modern hybrid vehicle in order to improve fuel efficiency (e.g., using regenerative braking, etc.). That is as well as supplying an oscillating smoothing torque the energy storage/release device supplies a DC component to the powertrain torque. This DC component may be positive or negative depending on the operating conditions, the amount of energy currently stored in the energy storage/release device and other variables. The DC component may be chosen in part to compensate for the inefficiencies associated with storing and releasing energy from the energy storage/release device. The energy storage/release device 124 may also be an integrated starter-generator used to restart an engine as part of a start/stop engine system.

In various approaches, the energy storage/release device 124 is also used to smooth transitions between different firing fractions. By way of example, if the engine is operated in a skip fire manner and shifting from a lower firing fraction to a higher firing fraction, the manifold absolute pressure may take time to adjust from a higher to a lower level. That is, if the shift is made immediately, the vehicle may leap forward because the cylinder output will be too great. In various applications and under such circumstances, the energy storage/release device 124 is arranged to absorb/supply torque from/to the powertrain, thereby helping to ensure a smoother transition between the firing fractions. By way of example, the powertrain controller 100 and the energy storage/release device 124 may be operated using any of the techniques or operations described in U.S. patent application Ser. No. 13/654,244 and U.S. Provisional Patent Application No. 62/053,351, which are incorporated by reference in their entirety for all purposes.

The invention has been described primarily in the context of controlling the firing of 4-stroke piston engines suitable for use in motor vehicles. However, it should be appreciated that the described skip fire approaches are very well suited for use in a wide variety of internal combustion engines. These include engines for virtually any type of vehicle—including cars, trucks, boats, construction equipment, aircraft, motorcycles, scooters, etc.; and virtually any other application that involves the firing of working chambers and utilizes an internal combustion engine. The various described approaches work with engines that operate under a wide variety of different thermodynamic cycles—including virtually any type of two stroke piston engines, diesel engines, Otto cycle engines, Dual cycle engines, Miller cycle engines, Atkinson cycle engines, Wankel engines and other types of rotary engines, mixed cycle engines (such as dual Otto and diesel engines), radial engines, etc. It is also believed that the described approaches will work well with newly developed internal combustion engines regardless of whether they operate utilizing currently known, or later developed thermodynamic cycles.

In some preferred embodiments, the firing timing determination module utilizes sigma delta conversion. Although it is believed that sigma delta converters are very well suited for use in this application, it should be appreciated that the converters may employ a wide variety of modulation schemes. For example, pulse width modulation, pulse height modulation, CDMA oriented modulation or other modulation schemes may be used to deliver the drive pulse signal. Some of the described embodiments utilize first order converters. However, in other embodiments higher order converters or a library of predetermined firing sequences may be used.

It should be appreciated that the powertrain controller designs contemplated in this application are not limited to the specific arrangements shown in FIGS. 1 and 3. One or more of the illustrated modules may be integrated together. Alternatively, the features of a particular module may instead be distributed among multiple modules. The controller may also include additional features, modules or operations based on other co-assigned patent applications, including U.S. Pat. Nos. 7,954,474; 7,886,715; 7,849,835; 7,577,511; 8,099,224; 8,131,445; and 8,131,447; U.S. patent application Ser. Nos. 13/774,134; 13/963,686; 13/953,615; 13/886,107; 13/963,759; 13/963,819; 13/961,701; 13/963,744; 13/843,567; 13/794,157; 13/842,234; 13/004,839, 13/654,244; 13/004,844; 14/207,109; and 13/681,378 and U.S. Provisional Patent Application Nos. 61/952,737 and 61/879,481, each of which is incorporated herein by reference in its entirety for all purposes. Any of the features, modules and operations described in the above patent documents may be added to the controller 100. In various alternative implementations, these functional blocks may be accomplished algorithmically using a microprocessor, ECU or other computation device, using analog or digital components, using programmable logic, using combinations of the foregoing and/or in any other suitable manner.

A technique for reducing vibration using an electric machine is described in U.S. Pat. No. 8,015,960, although the technique differs from various embodiments of the present invention in several respects. For one, the '960 patent focuses on a variable displacement engine control system, not a skip fire engine control system. Also, the '960 patent describes the following process: 1) determining torque applied to a crankshaft; 2) extracting components from the torque attributable to uneven cylinder firings in variable displacement mode; 3) removing a fixed component (a fixed target torque) from the extracted component to leave only the variable component in the extracted components; 4) generating a vibration-damping torque that opposes the variable component generated in the third step. In other words, the vibration-damping torque is arranged to oppose all variation (i.e., after removal of the target torque) attributable to uneven cylinder firings. In various embodiments of the present invention, a smoothing torque is generated that does not necessarily oppose all variation attributable to uneven cylinder firings. Rather, in some embodiments, the smoothing torque opposes only some of the variation (e.g., the smoothing torque may oppose only one or more of the harmonic sinusoids with particular frequencies, such as the fundamental frequency, etc.) In various implementations, the smoothing torque does not oppose particular types of variations attributable to uneven cylinder firings e.g., may not oppose one or more other harmonic sinusoids. Various embodiments of the present invention also describe a control algorithm that applies only a sufficient amount of smoothing torque to meet a NVH target. The control algorithm also selects an operational firing fraction that maximizes fuel efficiency considering the energy costs associated with generating the smoothing torque. Another distinction between the current invention and the prior art is that, the frequency of the smoothing torque may not be equal to the firing frequency. For example, at 1500 RPM and a firing fraction of 40%, the firing frequency is 40 Hz, but the desired smoothing torque may have a frequency of 20 Hz.

Figure 12:
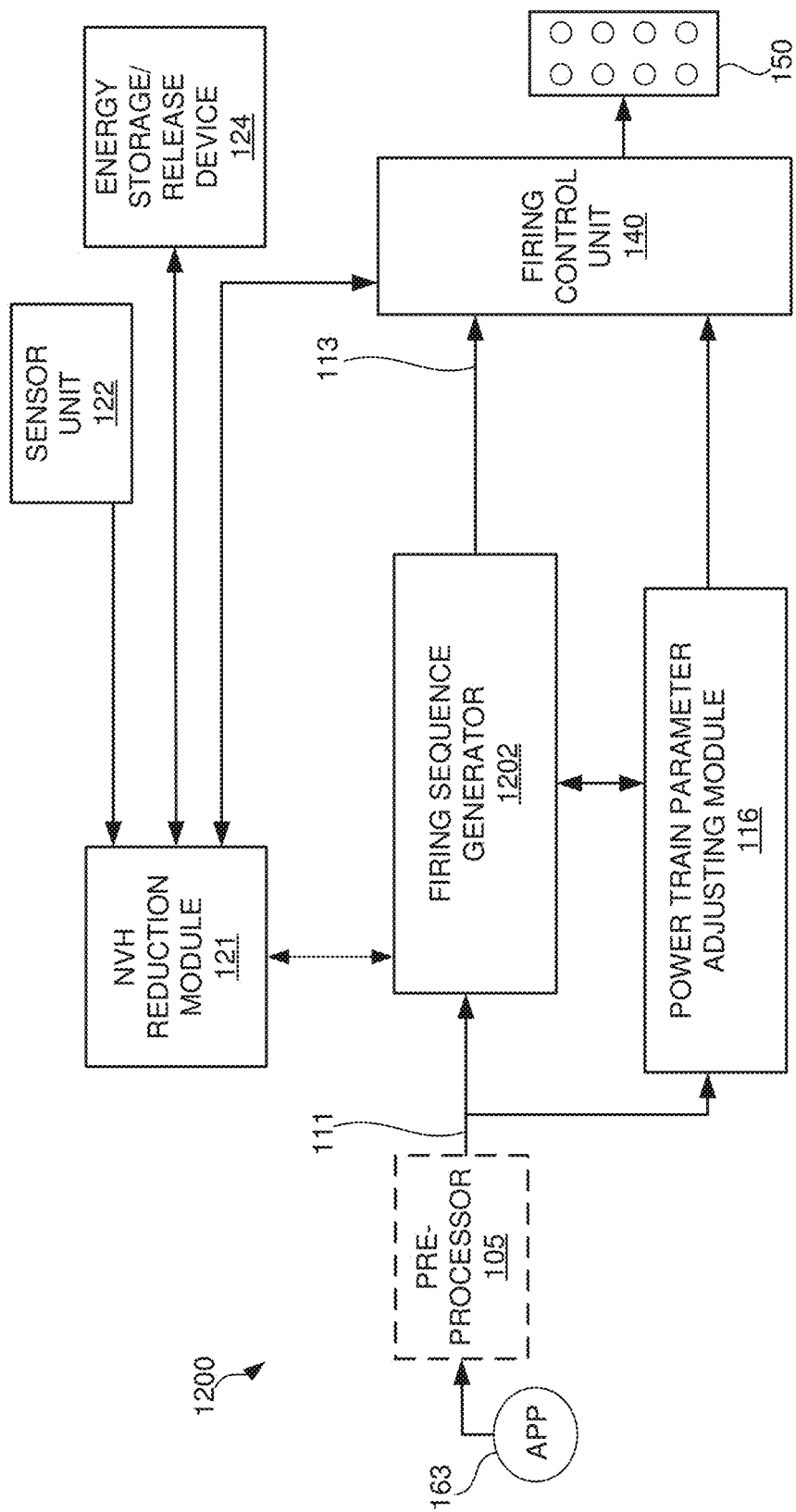
FIG. 12 is a block diagram of a powertrain controller in a skip fire engine control system according to one embodiment of the present invention.

While the invention has been generally described in terms of using a firing fraction to characterize the firing sequence, this is not a requirement. FIG. 12 shows an embodiment of a power train controller 1200. Many of the various elements of power train controller 1200 are similar or identical to those shown and described in relation to power train controller 100 shown in FIG. 1. Unlike power train controller 100, FIG. 12 shows the drive pulse signal 113 generated directly from a torque request signal 111 without reference to a firing fraction. Instead a firing sequence generator 1202 may produce drive pulse signal 113. Drive pulse signal 113 may consist of a bit stream, in which each 0 indicates a skip and each 1 indicates a fire for the current cylinder firing opportunity that defines the firing sequence. The firing decision associated with any firing opportunity is generated in advance of the firing opportunity to provide adequate time for the firing control unit 140 to correctly configure the engine, for example, deactivate a cylinder intake valve on a skipped firing opportunity. Each firing opportunity will have a known torque signature depending on whether the firing opportunity corresponds to a skip or a fire and the settings of the power train parameters defined by power train parameter adjusting module 116.

The firing sequence and smoothing torque may be determined using a variety of methods. In one embodiment short horizon model predictive control, which includes matching of the requested and delivered torque, NVH, and energy costs associated with producing the smoothing torque as part of the optimization problem may be used. In various embodiments, model predictive control is an optimal control method which straightforwardly handles systems with multiple performance criteria using a short horizon optimal control computation. In various implementations of this method a discrete optimization is performed at each time using new system measurements to compute the best system inputs to apply to the controlled system at the current time. The method repetitively solves this optimization each time a new input is desired. Inputs to the model may include the requested torque, the torque signature associated with skips and fires, acceptable NVH level, acceptable emission level, and energy costs and energy/power constraints associated with generation of a smoothing torque. Model variables may include, but are not limited to, engine speed, transmission gear setting, engine and ambient temperature, road conditions and engine parameters, such as MAP, valve timing, and spark timing.

Applying this control method may involve various combinations of power train parameters, smoothing torques and firing sequences that deliver the requested torque being determined and evaluated at each firing opportunity in the firing sequence generator 1202. The firing sequence generator 1202 may then produce a firing sequence that delivers optimum/improved fuel economy with acceptable NVH subject to the system constraints. This control method is particularly useful when the firing sequence is non-periodic, such as during a transition between firing sequences associated with changing torque requests 111 but also applies naturally to steady torque requests as well. Here short horizon may refer to firing decisions that have been made, but not yet implemented. This may be in the range of 4 to 8 firing opportunities, since these decisions are known before they are implemented, the smoothing torque can be precalculated. Constraints on the smoothing torque may include maximum allowable torque levels and frequency delivery limitation. Energy storage constraints may include current energy storage level and well as the maximum power transfer from the energy storage device.

Figure 13:
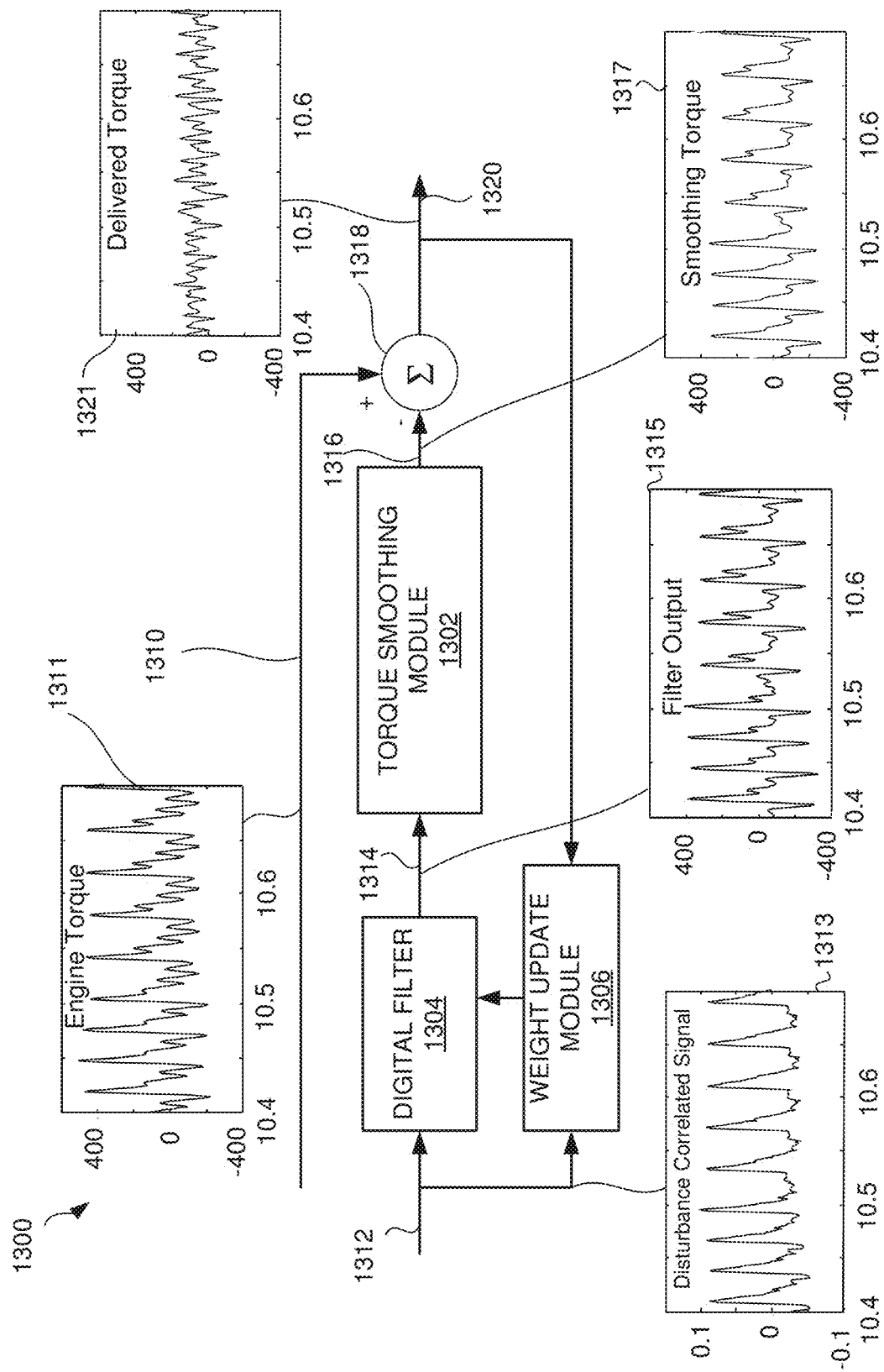
FIG. 13 is a block diagram of an adaptive filter feed forward control system according to one embodiment of the present invention.

In another embodiment adaptive filter (AF) feed forward (FF) control may be used to attenuate undesired torque oscillation caused by combustion events. In some embodiments AF-FF control can take advantage of the fact that the firing sequence and resultant torque disturbances are clearly defined. FIG. 13 shows a schematic diagram of AF-FF control. The objective of AF-FF control is to attenuate a disturbance on a system of interest, and AF-FF control achieves this objective by generating a disturbance cancelling signal which counteracts the disturbance when applied to the system. In this case the disturbance is the variation in the engine torque 1310 from its mean value. A disturbance cancelling signal filter output 1314 is generated by a digital filter 1304 based on an inputted disturbance correlated signal 1312. The disturbance correlated signal 1312 may have a mean value of zero, so as not to alter the average overall power train output torque. The disturbance correlated signal 1312 contains information regarding the expected disturbance with some time advance. This signal 1312 may be based on a firing sequence and estimated torque signatures associated with skips and fires. The firing sequence may be derived using a torque request, firing fraction, sigma-delta filter, a look up table, a state machine or by some other means. The filter output 1314 may be inputted to a smoothing torque module 1302, which generates a smoothing torque 1316. The smoothing torque module 1302 represents the dynamic response of a motor/generator or any other system that supplies a smoothing torque which includes any response delays or limitation so as to generate the desired smoothing torque 1316. The smoothing torque 1316 is combined with the engine torque 1310 in summing junction 1318. Summing junction 1318 outputs a delivered torque 1320 to the power train. The summing junction 1318 shows the smoothing torque 1316 being subtracted from the engine torque 1310. It should be appreciated that in other embodiments the smoothing torque may have the opposite polarity and the smoothing torque is added to the engine torque.

Adaptive filter parameters called weights may be updated by a weight update module 1306 that uses an adaptive algorithm to minimize differences between the smoothing torque 1316 and the disturbance, the engine torque 1310 less the mean value, so as to smooth the delivered torque 1320. The weight update module 1306 uses a model of smoothing torque module 1302 and inputs of both the delivered torque 1320 and disturbance correlated signal 1312 to determine the appropriate weights. The minimization may involve minimizing a mean square difference between the signals, although other minimization criteria may be used.

Graphs depicting the time behavior of the various signals in FIG. 13 are shown in order to better understand and explain operation of example powertrain controller 1300. The engine torque graph 1311 depicts oscillations in the engine torque output similar to those previously shown in FIG. 8. The disturbance correlated signal graph 1313 shows an estimated signal of the disturbance in engine torque, which will be necessary to minimize variations in the delivered torque 1320. This estimate reflects the skip fire nature of the firings, so it will provide the necessary frequency component information to the digital filter 1304, which will result in the filter output 1314 having the proper frequency components. Based on the various weights associated with magnitude and phase response of the filter, the digital filter 1304 will adaptively control the filter output 1314 so as to minimize disturbances in delivered torque 1320. Filter output graph 1315 illustrates how the disturbance correlated signal 1312 is modified by digital filter 1304. The filter output 1314 is inputted into the smoothing torque module 1302, which includes a motor/generator or some similar system that can generate or absorb torque. The smoothing torque module 1302 outputs a smoothing torque 1316 depicted in graph 1317. Graph 1317 illustrates how the smoothing torque 1316 matches and cancels the variations in the engine torque 1310. When the smoothing torque and engine torque are combined in adder 1318 the resultant delivered torque 1320 has relatively small torque variations as depicted in graph 1321.

An advantage of various implementations of AF-FF control is that since it is a feed forward control, it can eliminate or at least minimize any disturbance in the delivered powertrain torque within the bandwidth of the smoothing torque module, provided the time advance of the disturbance correlated signal 1312 with respect to the disturbance is larger than the delay caused by the torque smoothing module 1302 and filter computations in digital filter 1304. Adaptation of the weights used in digital filter 1304 is relatively slower than the change in the disturbance, but it does not restrict the ability of the controller 1300 to attenuate the disturbance. The adaptive algorithm determines the engine characteristics relating the disturbance correlated signal 1312 and the actual disturbance (variation in engine torque 1310) as well as secondary path dynamics associated with the torque smoothing module 1302, which are fixed or whose change rate is much slower than that of the disturbance.

Figure 14:
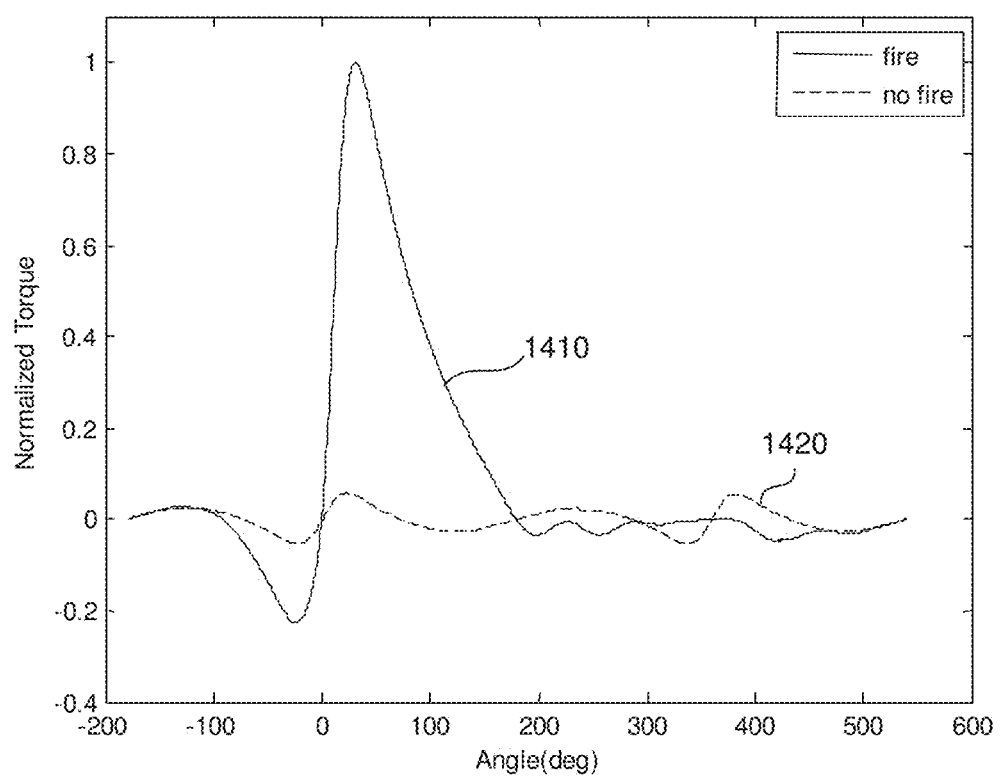
FIG. 14 is an example waveform showing torque signatures associated with cylinder firings and cylinder skips according to one embodiment of the present invention.

One input into both adaptive filter feed forward and short horizon model predictive control may be the torque signature associated with cylinder skips and fires. FIG. 14 shows representative torque signatures associated with fires curve 1410 and no fires (skips) curve 1420. These representative curves depict the normalized torque output associated with a cylinder through a working cycle of 720 degrees of crankshaft rotation. These representative torque signatures can be scaled and adjusted based on the engine parameters. The total engine torque is given by the sum of the torque generated by all cylinders. The total estimated engine torque may then be used in as part of a short horizon predictive model control or an adaptive filter feed forward control system.

Adaptive Control

The control methods described in relation to FIG. 4-11 work well for steady state operation; however, they depend on the accuracy of the underlying models for engine torque and auxiliary torque to provide optimum fuel efficiency with acceptable NVH. An adaptive control method overcomes these limitations. In adaptive control a controller adapts or modifies its control characteristics based on the observed characteristics of the controlled object that vary or are initially uncertain. In the present invention, adaptive control uses a sensed NVH level to modify the control signals to the auxiliary torque source/sink to reduce NVH to an acceptable level while providing for fuel efficient operation.

One type of adaptive control is adaptive filter feed forward (AF-FF) control. In AF-FF a filter that impacts the control system response is modified, i.e. adapts, based on a sensed output. The system characteristics vary based on the sensed output, i.e. the adaptive filter. Typically changes to the filter characteristics are slow relative to variations in the sensed output.

In one embodiment, AF-FF control is used in a micro-hybrid vehicle having an internal combustion engine and motor/generator connected to a common powertrain. The motor/generator may oppose torque oscillations caused by combustion events in fired working chambers and thus attenuate the torque oscillations on the powertrain. The motor/generator may also oppose other oscillatory powertrain loads, such as those of skipped working chambers, a camshaft drive, etc.; however, these oscillations tend to be smaller in magnitude that those resulting from a working chamber firing. In one embodiment, the smoothing torque may, for example, be generated by an electric motor/generator having a capacitor serving as an energy storage/capture/release device. An advantage of AF-FF control is that it can compensate for any inaccuracy in the dynamics from a mitigation command to the actual smoothing torque applied to the crankshaft. It also can help to compensate for changes in powertrain performance due to wear or other factors. AF-FF control also works seamless for both steady state and transient conditions, such as during a firing fraction transition.

As example of such a micro-hybrid system, an internal combustion engine may be a 4 cylinder, 4-stroke engine capable of producing a maximum power output of 200 hp ($\approx$150 kW). Auxiliary power may be supplied/removed by an electric motor/generator may have a maximum steady-state output 10% or less of this value, i.e. $\leq$15 kW. The motor/generator may be electrically connected to a capacitor for energy storage. The capacitor energy storage/release capacity under normal operation may be only sufficient to attenuate the variation in torque generated by a firing sequence. For example, the engine running at 1000 rpm has a firing opportunity every 30 msec. The maximum energy that a 15 kW motor can deliver in that period is 450 J. In practice to reduce the torque oscillations the motor/generator would not be operating at its maximum output for most of this period, so the actual delivered or stored energy can be less than this value, for example ⅓ or 150 J. To store this energy in a capacitor a tradeoff exists between the capacitor voltage, the allowed amount of energy withdrawal, and the capacitor capacitance. For example, the capacitor may have a capacitance of 0.3 F and operate at a peak voltage of 125 V. During normal operation the capacitor voltage may fluctuate between 120 V and 125 V as energy is stored and released from the capacitor, a net change of approximately 184 J, slightly more than the 150 J estimate from the prior calculation. Operating with a relatively small drop in the capacitor voltage from its peak value is advantageous, since it generally improves efficiency of the motor/generator. For example, the capacitor voltage may vary no more than 2%, 4%, or 10% from its maximum value as it stores and releases energy to attenuate engine torque oscillations. It should be appreciated that the values given here are exemplary only and the current invention may be used with both larger and smaller internal combustion engines, motor/generators, and storage capacitors. The peak capacitor voltage may be higher or lower than 125 V, such as 300 V, 48 V, or some other voltage.

In addition, a battery may be placed in parallel with the capacitor to allow greater energy storage. The battery may be used to store energy from a regenerative braking system and/or may be part of a stop/start system that turns the engine off when there is no torque demand. In some embodiments, an electrical system that operates with peak voltages less than 60 Volts may be used. These lower voltage systems are advantageous because costs associated with insulating the system electrical elements are lower due to the lower voltage. In particular, a battery operating at a nominal voltage of 48 Volts may be used. Such a battery may have a battery chemistry that allows fast and efficient charging and recharging. Exemplary types of battery chemistry include, but are not limited to, lithium titanate, lithium iron phosphate, lithium iron manganese phosphate, nickel manganese cobalt, or some other type of fast charging/discharging battery chemistry. The battery constituents may be arranged as small particles, for example, nanoparticles, to increase the available surface area for chemical reactions increasing the charge/discharge rate. An exemplary battery that may be used is a 8 Ah UltraPhosphate battery available from A123 Systems of Livonia, Mich. Such a battery has a total energy storage capacity of approximately 1.3 MJ, so it may be used for both starting an internal combustion, regenerative braking, and as the energy source/sink in supplying a smoothing torque.

While an electrical system that uses only a battery as the energy storage element may be used, an advantage of using a capacitor for energy storage is that the round-trip energy efficiency of storing energy into, and releasing energy from, a capacitor is typically higher than in a battery, for example 80% versus 50%. Thus the battery may be used where energy storage needs are greater and the capacitor used where energy storage needs are modest, such as attenuating the torque oscillations of an internal combustion engine.

The exact arrangement of the motor/generator and its relation to the powertrain may vary widely. For example the motor/generator may be mechanically coupled into the powertrain either between the engine and the wheels or on the engine side opposite from the wheels. The motor/generator may be coupled by a belt pulley system, a chain sprocket system, a gear system, or may be directly in line with the powertrain. Systems with the motor/generator coupled to the crankshaft by the accessory drive belt, generally referred to as a front end accessory drive belt (FEAD) may be cost effective when combined with a 48V battery system in micro- or mild-hybrid system.

The motor/generator may be an AC induction electric motor/generator, which advantageously can generate high torque and can work symmetrically as either a motor or a generator. Other types of electric motor/generators may be used; for example, an internal permanent magnet brushless DC motor/generator, a surface permanent magnet brushless DC motor/generator, a switch reluctance motor/generator or some other type of motor/generator. All the motor/generator types are very efficient at converting mechanical energy to electrical energy and vice versa. Conversion efficiencies are generally higher than 80%. Advantageously, the internal permanent magnet brushless DC motor provides very high efficiency operation, typically in the range of 92-95%. Another consideration in selection of an electric motor/generator is its operating speed range. Advantageously, a switch reluctance motor/generator can operate over a wider speed range than some of the other motor/generator types. This is particularly advantageous in a P0 hybrid architecture where the engine and motor/generator are connected by a belt in a front end accessory drive (FEAD) and rotate at the same speed.

Much of the previous discussion has focused on optimizing fuel efficiency during steady-state or nominally steady-state operating conditions. An acceptable level of NVH or some other parameter may be chosen and an algorithm that maximized energy efficiency summing the contributions of the internal combustion engine and electric motor/generator was implemented. However, in a normal drive cycle the required torque to operate the vehicle varies almost continuously with changing driving conditions. In a conventionally controlled, Otto cycle, internal combustion engine, throttle control is the primary mechanism for controlling engine output torque. In an Otto cycle engine with skip fire control, control of the firing fraction or firing density is the primary mechanism for controlling engine output torque. To minimize brake specific fuel consumption (BSFC) and thus optimize fuel efficiency, it is generally desirable to operate the engine at or close to wide open throttle to minimize pumping losses. As described above, during skip fire operation operating at certain firing fractions that provide desirable NVH characteristics is preferred. These desirable firing fractions tend to be simple fractions having a small denominator, such as ½, ⅓, ⅔, ¼, ¾, ⅕, ⅖, ⅗, ⅘, ⅙ etc. Much of the previous discussion has focused on optimizing fuel efficiency by selecting the firing fraction and smoothing torque combination that delivers the requested torque using one of these firing fraction levels. However, to accommodate changes in the required engine output torque, the engine must shift or transition between these various firing fraction levels. During a normal drive cycle, such as a FTP (Federal Test Protocol) fuel economy test cycle the engine may spend approximately 20% of its time transitioning between various firing fraction levels. It is thus important to optimize fuel efficiency during these transitions while simultaneously providing acceptable NVH performance.

In prior U.S. patents and patent application the Assignee has described various strategies for providing acceptable NVH during firing fraction level transitions in non-hybrid vehicles. These strategies include slowing the transition in firing fraction to match intake air manifold dynamics, matching firing patterns thru a transition, using a linear slew rate for the firing fraction in a transition, using firings having different output levels, coordinating the firing fraction change with motion of various actuators, inserting extra firings into the firing sequence, and using feed forward and feedback control based on firing sequence induced torque variations during the transition. The present invention extends these ideas to use in a hybrid vehicle where an auxiliary torque source/sink may be used to attenuate powertrain oscillations.

In one embodiment, the feedback signal may correspond to a sensed output of the engine, such as engine torque. However, the feedback signal can be any sensed signal that correlates with the actual torque applied to the crankshaft, such as crankshaft acceleration which can be obtained from a crankshaft rotation speed measurement. The rotation speed is often measured in rpm, revolutions per minute. The crankshaft angular acceleration is simply the time derivative of the rotation speed. Thus the crankshaft angular acceleration measurement may be used to infer the torque applied to the powertrain by the engine and auxiliary power source/sink. The crankshaft acceleration signal may be filtered to reduce signal noise, low frequency components of the engine torque, and variations in the load torque Although load torque and other torques applied at the wheels (which are usually unknown) affect acceleration, frequencies of these torques are often low compared with those of engine torque oscillations (2 to 50 Hz) that a micro-hybrid system is designed to address. The mitigation frequency range of 2 to 50 Hz is exemplary only and larger and smaller frequency ranges may be used. The mitigating frequencies should generally be above frequencies related to driver torque requests or load torque variations. Therefore, crankshaft acceleration can be used in place of a direct torque measurement for the purpose of attenuation of torque oscillation, as it reflects the engine torque pulses associated with firing and skipping working chambers. By extending this idea, in one embodiment, measurements directly related to an NVH metric are used instead of or in additional to crankshaft acceleration, such as an acceleration measurement of a seat rail or a sound measurement near the driver's ear, such as a seat head rest. The NVH metric includes varying human perception to different vibration and noise frequencies. In some embodiments the NVH metric is based on the crankshaft rotation signal or a time derivative thereof.

Figure 15:
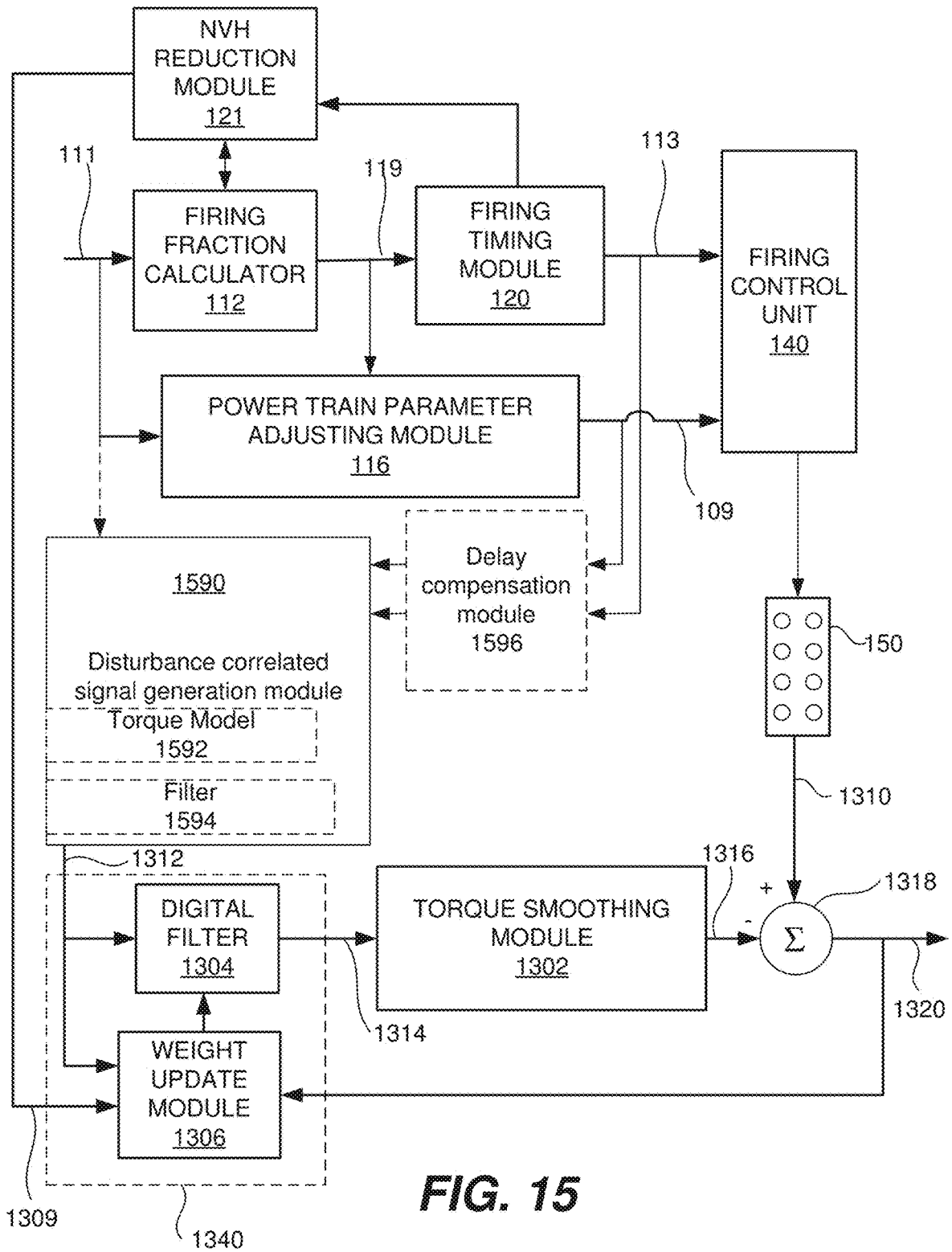
FIG. 15 is a block diagram illustrating portions of a powertrain controller having a firing timing determination module and adaptive filter feed forward control according to one embodiment of the present invention.

FIG. 15 shows how FIGS. 1 and 13 are related according to an embodiment. The firing fraction calculator 112 and firing timing determination module 120 generate a firing fraction 119 and firing sequence 113, respectively, based on the torque request 111. The firing sequence, or alternatively drive pulse signal, 113 is known prior to the actual combustion events of the cylinders, so a scheduled firing sequence may be used as the basis for the disturbance correlated signal 1312. Generally, the disturbance correlated signal is an input into a control system regarding an anticipated undesired fluctuation on the output that is to be at least partially cancelled by the control system. The disturbance correlated signal is provided to the control system in advance of the fluctuation so that the control system may minimize or reduce the fluctuation using feed forward control. The disturbance correlated signal is generated in the disturbance correlated signal generation module 1590. The module 1590 may have as inputs the firing sequence 113 and the power train adjustment parameters 109, which allow estimating the torque profile associated with fired and skipped working chambers. These signals may optionally be directed through a delay compensation module 1596 to help synchronize the disturbance correlated signal with the disturbance, since the fire/skip decision is generally known several firing opportunities prior to its execution. Using the delay compensation module 1596 may reduce the number of required weights in the digital filter 1304 reducing computational time and complexity. The disturbance correlated signal generation module 1590 may use a torque model 1592 or filter 1594 to help generate the disturbance correlated signal 1312. The torque model 1592 may include the torque profile associated with fired and skip working chambers as shown in FIG. 14 scaled by the power train adjustment parameters 109. The torque model 1592 may include the firing sequence and other engine operating parameters, such as MAC, spark timing, and air/fuel ratio. Basing the disturbance correlated signal 1312 on the scaled torque model can improve transient performance, as the weights in digital filter 1304 will vary less through any transition. The bias torque may be removed, so that only the oscillatory portions of the torque profile are incorporated into the disturbance correlated signal 1312. That is in some embodiments the disturbance correlated signal may be substantially bias-free having a mean value of substantially zero. Here substantially means that the DC component of the disturbance correlated signal is small compared to the AC components, for example, the DC component of the disturbance correlated signal is less than 10% of the root mean square (rms) value of the AC components. An overall engine torque model is described in more detail in U.S. provisional application No. 62/379,357, which is hereby incorporated by reference.

The disturbance correlated signal 1312 is directed into filter module 1340. The filter module may have two elements, digital filter 1304 and weight update module 1306, that operate as previously described. It should be appreciated that filter module 1340 can take a wide variety of forms, some of which are described in more detail below. The filter module 1340 may also have as an NVH signal 1309 coming from the NVH reduction module 121. NVH signal 1309 helps optimize the trade-off between NVH and fuel economy.

The time advance of the disturbance correlated signal 1312 with respect to the disturbance 1310 is larger than the delay caused by secondary path dynamics of torque smoothing module 1302 and any filter computations of digital filter 1304. Here secondary path dynamics refers to the frequency response of the torque smoothing module 1302. The secondary path dynamics include the dynamics of the motor/generator and its mechanical linkage to the crankshaft, which may introduce differences between commanded torque and the actual torque delivered/absorbed by the motor/generator. The time advance of the disturbance correlated signal with respect to the disturbance may be used to improve response and stability of the control system.

An objective of AF-FF control is to attenuate a disturbance on a system of interest and AF-FF control achieves this objective by generating a disturbance cancelling signal which counteracts the disturbance when applied to the system as shown in FIG. 13. In this case the disturbance is the variation in the engine torque 1310 from its mean value. A filter output 1314 is generated by an adaptive digital filter 1304 based on an inputted disturbance correlated signal 1312. The filter output may have a mean value of zero or substantially zero, so as not to alter the average overall power train output torque. In some embodiments filter output 1314 may have a small offset to compensate for inefficiencies in the motor/generator system. Alternatively, the torque request may be slightly increased to compensate for these inefficiencies.

The disturbance correlated signal 1312 contains information regarding the expected disturbance with some time advance. This signal 1312 may be based on a firing sequence. The firing sequence may be derived using a torque request, firing fraction, sigma-delta filter, a look up table, a state machine or by some other means. The disturbance correlated signal 1312 may also incorporate estimated torque signatures associated with the firing and skipping of the working chambers in the firing sequence as previously described. Incorporation of this information will reduce convergence times of weights in the adaptive digital filter 1304, but is not required.

The filter output 1314 may be inputted to a smoothing torque module 1302, which generates a smoothing torque 1316. The smoothing torque module 1302 may be a motor/generator coupled to a capacitor, battery or any other energy storage device. The smoothing torque module 1302 may have response delays, or other limitations that cause the generated smoothing torque 1316 to differ from the filter output 1314. The smoothing torque 1316 is combined with the engine torque 1310 in summing junction 1318. Summing junction 1318 outputs a delivered torque 1320 to the powertrain. The summing junction 1318 shows the smoothing torque 1316 being subtracted from the engine torque 1310. It should be appreciated that in other embodiments the smoothing torque may have the opposite polarity and the smoothing torque is added to the engine torque. The delivered torque 1320 is used to power the vehicle and is fed back into the weight update module 1306 as part of a feedback loop. The oscillations in the delivered torque 1320 may be used at least in part to modify the weights used in the digital filter 1304.

Adaptive filter parameters, called weights, may be updated by a weight update module 1306 that uses an adaptive algorithm to reduce differences between the smoothing torque 1316 and the disturbance, the engine torque 1310 less its mean value, so as to smooth the delivered torque 1320. The weight update module 1306 determines the appropriate weights in accordance with methods described in greater detail below. In some embodiments the difference may be minimized; however, this may be unnecessarily energy consumptive. In some embodiments, the oscillations in the delivered torque 1320 are only reduced to a level providing acceptable NVH, which provides optimum fuel efficiency.

Graphs depicting the time behavior of the various signals in FIG. 13 are shown in order to better understand and explain operation of example powertrain controller 1300. The engine torque graph 1311 depicts oscillations in the engine torque output similar to those previously shown in FIG. 8. The disturbance correlated signal graph 1313 shows an estimated signal of the disturbance in engine torque, which will be used to minimize variations in the delivered torque 1320. This estimate reflects the skip fire nature of the firings, so it will provide the necessary frequency component information to the digital filter 1304, which will result in the filter output 1314 having the proper frequency components. Estimation of the disturbance is not necessary in the disturbance correlates signal 1312, the signal just needs to have the same frequency components as the disturbance to allow convergence; however, estimation of the disturbance is often desirable since it will reduce convergence time.

By adjusting weights in the digital filter 1304 the control system 1300 will adaptively control the filter output 1314 so as to reduce or minimize disturbances in delivered torque 1320. Filter output graph 1315 illustrates how the disturbance correlated signal 1312 is modified by digital filter 1304. The filter output 1314 is inputted into the smoothing torque module 1302, which includes a motor/generator or some similar system that can generate and/or absorb torque. The smoothing torque module 1302 outputs a smoothing torque 1316 depicted in graph 1317. When the smoothing torque and engine torque are combined in adder 1318 the resultant delivered torque 1320 has relatively small torque variations as depicted in graph 1321.

In one embodiment, one or more aspects of the AF-FF control design improve control stability and/or improve convergence of the adaptive filter weights. For example, in one embodiment the AF-FF control is modified to take advantage of the fact that the firing pattern may be generated by a sigma delta filter. In particular, the input to the sigma delta filter represents the requested mean engine torque without any delay (in fact it is advanced relative to the torque delivery). This signal is represented by torque request 111, which may optionally be inputted into disturbance correlated signal generation module 1592 as shown in FIG. 15. Since the mean torque is known, it can be removed, yielding a zero-mean disturbance correlated signal. This facilitates generation of a smoothing or mitigation torque that more accurately cancels the torque disturbance produced by the engine. Also, incorporating information regarding the torque signatures of fired and skipped working chambers and the operating engine parameters, i.e. cam phase, MAC, MAP, sparking timing, etc. into the disturbance correlated signal will generally improve convergence. The exemplary graph 1313 shown in FIG. 13 illustrates incorporation of this information into the disturbance correlated signal 1312.

An alternative method to remove bias from an oscillatory torque signal is to use a filter having a low-pass nature to extract the bias and subtract it from the original signal, effectively forming a high-pass filter. A simple conventional filter can be used, but it introduces a delay to the filtered signal. However, some filters can be used that have minimal delays. The oscillating components of engine torque are primarily at the fundamental and harmonics of the firing frequency. A comb type filter, such as an adaptive average filter, may be used to remove all harmonics with reduced delay.

In one embodiment, scaling of the disturbance correlated signal is used to reduce the convergence time of the adaptive filter during engine transients. Scaling of the disturbance correlated signal is arbitrary, since the adaptive filter adjusts the amplitude. However, to reduce the convergence time, the disturbance correlated signal may be scaled for the actual torque for a given operating condition obtained from estimation of the engine parameters impacting the working chamber output, such as MAC, MAP, cam phase, spark timing, etc. This estimation may be performed in the torque model module 1592.

Figure 16:
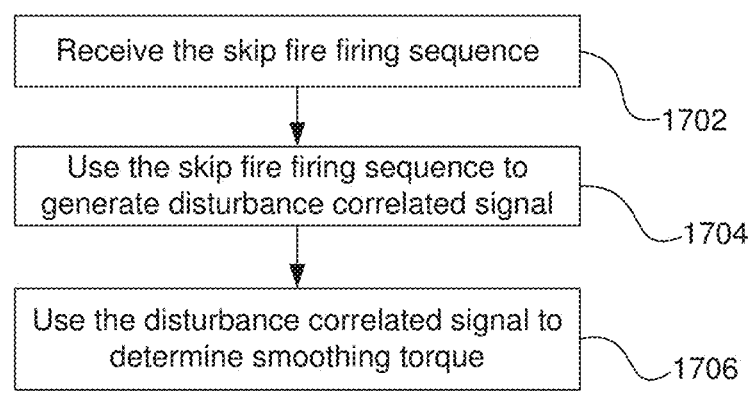
FIG. 16 is a flow chart of a method of adaptive filter feed forward control according to one embodiment of the present invention.

FIG. 16 is a flowchart illustrating an embodiment of a method of adaptive filter feed forward control. The firing sequence is received 1702 by disturbance correlation signal generation module 1590. The skip firing sequence is used to generate the disturbance correlated signal 1704. The disturbance correlated signal is used, via AF-FF, to determine the smoothing torque 1706.

Additional examples of adaptive FIR filters used as adaptive digital filter in FIGS. 13 and 15 will now be described in accordance with an embodiment. The purpose of an adaptive FIR filter is to filter the disturbance correlated signal to adjust the phase and the magnitude to generate a disturbance cancelling command to the motor/generator that cancels or reduces the disturbance. The adaptive FIR filter helps to compensate for secondary path dynamics associated with differences between the motor/generator command and the actual torque applied to the crankshaft. In an embodiment of the present invention, an additional technique called bias-estimation may be used to separate the bias from the disturbance cancelling command. The following is an exemplary formulation of FIR filter with bias estimation.

$$u(k) = [w_c(k)\ w_1(k)\ \ldots\ w_N(k)] \begin{bmatrix} 1 \\ x_1(k) \\ \vdots \\ x_N(k) \end{bmatrix} \quad (7a)$$

$$= w_c(k) + [w_1(k)\ w_2(k)\ \ldots\ w_N(k)] \begin{bmatrix} x_1(k) \\ x \\ \vdots \\ x_N(k) \end{bmatrix} \quad (7b)$$

$$u'(k) = u(k) - w_c(k) = [w_1(k)\ w_2(k)\ \ldots\ w_N(k)] \begin{bmatrix} x_1(k) \\ x_2(k) \\ \vdots \\ x_N(k) \end{bmatrix} \quad (7c)$$

The components of the column vector are the last N samples (x(k)) of the disturbance correlated signal 1312 and the components of the row vector (w$_c$(k) and w$_i$(k)), are the N weights of the FIR filter. Here k is the sample index. The sampling can be done in the crank angle domain or time domain, the domains being related by the known engine speed. The number of weights in the FIR filter can be chosen to provide an acceptable tradeoff between filter performance and computation speed. In practice the number of weights may be between 5 and 100, with 10 being a suitable value for many engines. In some cases down sampling may be used to reduce the computational burden. More weights will generally be necessary if attenuation of low frequencies, ~2 Hz, is required. The first component of the column vector, 1, is the constant introduced for bias estimation and $w_c$ is the weight for the bias. The signal u(k) is the disturbance cancelling command before subtracting the bias term $w_c$(k). The signal u'(k) is the disturbance cancelling command after subtracting the bias term $w_c$(k). This may be the filter output signal 1314 that is directed into the torque smoothing module 1302 in FIGS. 13 and 15.

In one embodiment, the filter output 1314 is constructed as in the previous section removing $w_c$(k) from u(k), which removes the bias. The bias component of the filter output is confined to the bias weight, which is easy to separate from the rest of the filter components. For micro-hybrid applications, where the total available stored energy is small, the bias component may be removed from the filter output so that the energy storage/release capabilities of the system are not exceeded. Alternatively, a slight bias may be included to compensate for inefficiencies in the energy capture/storage/release system. In other embodiments, if the auxiliary energy source/sink has enough capacity to address bias error of the delivered torque, the bias term can simply be put back to attenuate the bias error. However, in this case, the torque needs to be accurately estimated and the difference between the requested torque and estimated torque needs to be determined.

In an embodiment of the present invention, the bias is removed from the filter output and only signal u'(k) of Eq. 7c is applied to the motor/generator to attenuate frequencies related to the engine torque oscillations. Although it is possible to correct the bias deviation from the requested torque using the motor/generator, in some embodiments it is more practical to restrict the corrective action by the motor/generator to the oscillating torque pulse component because of the limited energy storage capacity of the energy storage/release device. Another reason for this restriction is the accuracy of the torque estimate. It is often difficult to estimate the bias component accurately because of variability in the combustion dynamics and estimation errors in the various engine parameters, such as MAC. The uncertainty in the load torque also complicates estimating the engine torque from powertrain rotational acceleration.

In some cases it may be desirable to limit the magnitude or frequency of the filter output 1314 inputted into the motor/generator because of hardware limitation. This can be done; for example, using a loop shaping filter such as a notch filter(s) to remove or attenuate certain harmonic components from the filter output 1314. The same technique used for bias removal as described below relative to Eq. 10 can be applied for those removed or attenuated harmonics to assure stability. This flexibility is another advantage of embodiments of the present invention.

There are many optimization methods to minimize fuel consumption while delivering the required torque with acceptable NVH. One method is to minimize a function J, such that $$J(k)=A(k)^2+R*u(k)^2 \quad (8)$$

where A(k) is the measured or inferred engine torque, R is a penalty weight term, and u(k) is the filtered output command signal into the smoothing torque module 1302. The term $R*u(k)^2$ represents the penalty term associated with energy required to produce the smoothing torque. R can vary depending on the frequency components present in the engine torque deviation and the acceptable level of NVH. In some embodiments, R can be determined using a lookup table, which includes as indices engine speed, firing fraction, and transmission gear Minimizing J(k) maximizes fuel efficiency while providing an acceptable NVH level.

One of the simplest and most common methods to minimize J is a Least Mean Squares (LMS) algorithm whose difference equation is given below.

$$\begin{bmatrix} w_c(k+1) \\ w_1(k+1) \\ \vdots \\ w_N(k+1) \end{bmatrix} = \begin{bmatrix} w_c(k) \\ w_1(k) \\ \vdots \\ w_N(k) \end{bmatrix} + \lambda \frac{1}{2} \frac{\partial J(k)}{\partial w(k)} \quad (9a)$$

$$\begin{bmatrix} w_c(k+1) \\ w_1 \\ \vdots \\ w_N(k+1) \end{bmatrix} = \begin{bmatrix} w_c(k) \\ w_1(k) \\ \vdots \\ w_N(k) \end{bmatrix} + \lambda(A(k)-Ru(k)) \begin{bmatrix} 1 \\ x_1(k) \\ \vdots \\ x_N(k) \end{bmatrix} \quad (9b)$$

The LMS method minimizes J(k) which is an approximation of the statistical expectation of J. The adaptation gain λ determines the stability and convergence rate. For the LMS method, there is a trade-off in selecting the value of λ. For large λ, the weights can oscillate with a large amplitude when converged and for small λ the convergence rate can be slow. Other algorithms, such as a Recursive Least Squares (RLS) method, can provide faster convergence and smaller steady state error, but require more computation.

As previously described in an embodiment of the present invention, the bias may be removed from the disturbance cancelling command. In order to improve stability of this embodiment, it may necessary to make the following modification to the measured error.

$$A(k)=A_m(k)-P\{w_c(k)x_c(k)\} \quad (10)$$

Here, $A_m$(k) is the measured torque error (or powertrain acceleration with appropriate scaling) and p{ } represents the filtering of the signal with a filter estimated from the secondary path model. The estimate of the secondary path response to the bias term, $w_c$(k)$x_c$(k), is removed from the measured error to obtain, A(k) which is fed to the weight update. The secondary path model does not need to be very accurate, since it is only used to remove the effect of bias term from the measured error and any modeling error p{ } from the actual secondary path will be compensated by the adaptive weight $w_c$. The purpose of this modification is to form a virtual feedback loop for the bias term to improve system stability. Otherwise, the bias estimation has a possibility to grow infinitely and have a negative effect on the convergence of other weights.

In other embodiments, the disturbance correlated signal used for weight updates can be filtered by a model representing the secondary path dynamics in order to improve the stability. This case may be referred to as a filtered-X implementation. Here the weight update algorithm module 1306 has as an input the disturbance correlated signal 1312, which is filtered by the secondary path dynamics.

For $x_c$=1 as in Eq. 9, the change of the bias is represented by $w_c$(k). For steady state, the average torque is stationary and $w_c$(k) converges to a constant. In transient operation, it will track the bias changes. But for a large torque change, such as a firing fraction change, it will take time for $w_c$(k)

to converge to the correct value. Although the bias term will not be used in the disturbance cancellation signal, the convergence of $w_c(k)$ affects the convergence of other weights.

To improve convergence, an embodiment of the present invention adjusts the value of $x_c(k)$ based on the estimated mean engine torque, instead of using a constant value for $x_c(k)$. Assuming that $x_c(k)$ is approximately proportional to the change of the bias term during a transient, using $x_c(k)$ reduces the convergence time. The modified FIR filter and weight update formulae are given below.

$$u(k) = w_c(k)x_c(k) + [w_1(k)\ w_2(k)\ \ldots\ w_N(k)]\begin{bmatrix} x_1(k) \\ x_2(k) \\ \vdots \\ x_N(k) \end{bmatrix} \quad (11)$$

$$\begin{bmatrix} w_c(k+1) \\ w_1(k+1) \\ \vdots \\ w_N(k+1) \end{bmatrix} = \begin{bmatrix} w_c(k) \\ w_1(k) \\ \vdots \\ w_N(k) \end{bmatrix} + \lambda(A(k) - Ru(k))\begin{bmatrix} x_c(k) \\ x_1(k) \\ \vdots \\ x_N(k) \end{bmatrix} \quad (12)$$

The bias term is removed from the disturbance correlated signal, but it is added as $x_c(k)$ here in equation 12. This is necessary to explicitly separate the slow bias from combustion pulses at higher frequency, which is important for managing the addressed frequency components.

Figure 17A:
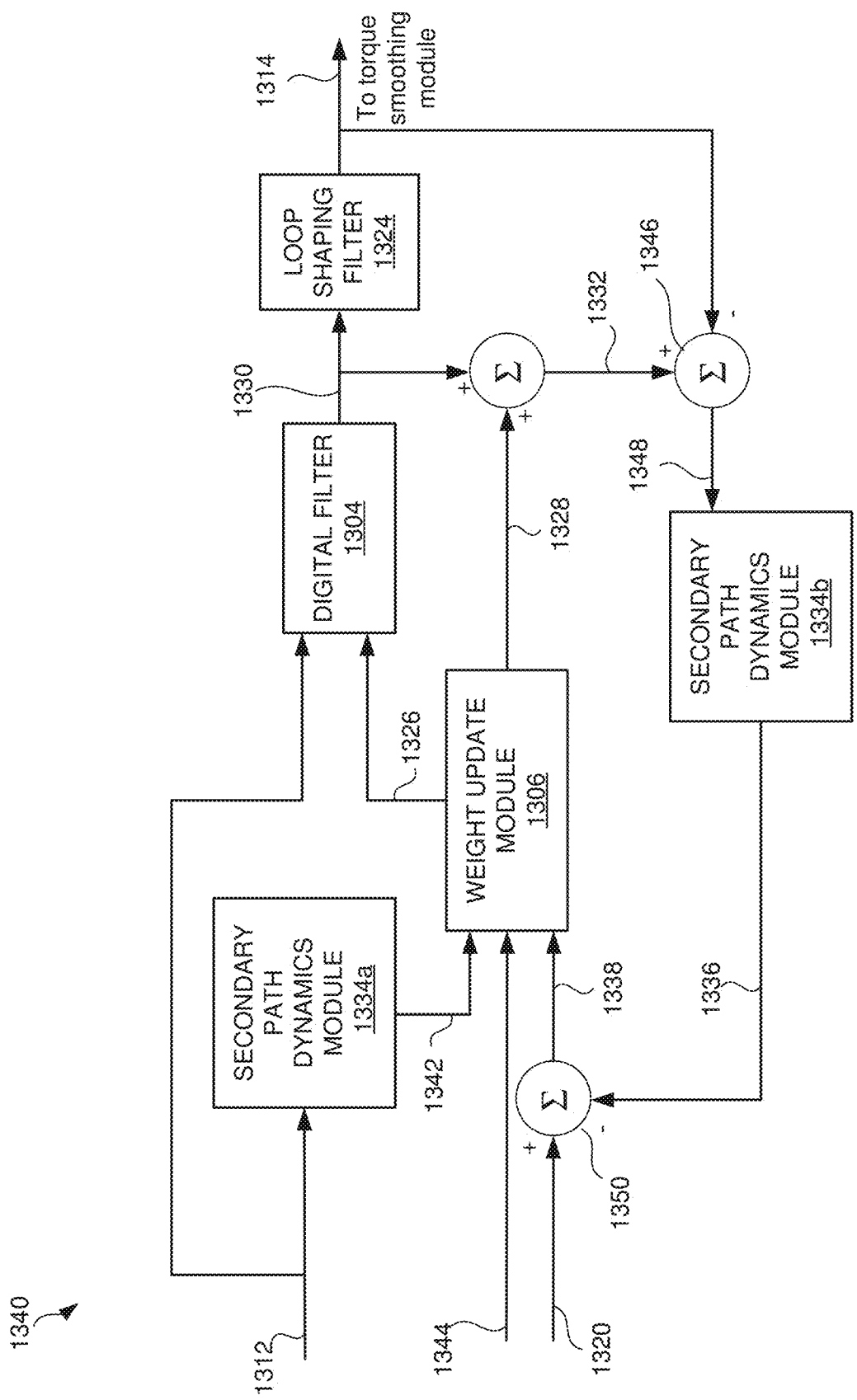
FIG. 17A is a block diagram of a filter module according to one embodiment of the present invention.

FIG. 17A is a schematic diagram of a control system using a filtered-X implementation, with the modification to the feedback term described in Eq. 10, according to an embodiment of the current invention. Inputs to the filter module 1340 may include the disturbance correlated signal 1312, the delivered torque 1320, and the estimated mean engine torque 1344. As previously discussed some other disturbance parameters, such as crankshaft acceleration, may be used in place of the delivered torque. The disturbance correlated signal 1312 is inputted into a secondary path dynamics module 1334a. The secondary path dynamics module 1334a filters the disturbance correlated signal 1312 to provide a filtered disturbance correlated signal 1342, which is inputted into the weight update module 1306. Also inputted into the weight update module 1306 is the estimated mean engine torque 1344, which may be the requested torque 111 or may be derived from the requested engine torque and some torque model. Another signal inputted into the weight update module 1306 may be the modified delivered torque signal 1338, which represents the delivered torque modified with removal of one or more selected components by the virtual feedback. The modified delivered torque signal 1338 may be determined by taking the difference between the delivered torque 1320 and the correction term 1336, which represents the effect of removed components by the loop shaping filter 1324 on delivered torque. The weight update module 1306 may use a Least Mean Squares Algorithm, a Recursive Least Mean Squares Algorithm or some other algorithm to determine appropriate weights. The weight update module 1306 may output updated weights 1326, which are used by the digital filter 1304. The digital filter filters the disturbance correlated signal 1312 to generate a disturbance cancelling command without bias signal 1330. The disturbance cancelling command without bias 1330 may be outputted by the digital filter 1304 and directed to a loop shaping filter 1324. The output of the loop shaping filter 1324 may output a filtered disturbance cancelling command 1314, which is directed to the torque smoothing module. The weight update module may also output a bias estimate 1328, which represents the estimated mean torque value. The bias estimate 1328 may be added to the output disturbance cancelling command without bias signal 1330 to obtain a disturbance cancelling command with bias signal 1332. The difference between the disturbance cancelling command with bias 1332 and the filtered disturbance cancelling command 1314 may be determined in summing node 1346. The output of summing node 1346 is 1348, the component removed from the filtered disturbance cancelling command 1314, which may be inputted into a secondary path dynamics module 1334b. The secondary path dynamics module 1334b outputs a correction term 1336, which filters signal 1348 based on the secondary path dynamics model. The output of the secondary path dynamics module 1334b is correction term 1336, which reflects the disturbance cancelling command modified by the secondary path dynamics and loop shaping filter. The correction signal 1336 may be subtracted from the delivered torque 1320 at summing node 1350, which outputs the difference of the two signals 1338. Signal 1338 may be inputted into weight update module 1306 where it provides modified feedback based on the delivered torque 1320 to help reduce NVH to an acceptable level.

It should be appreciated that the filter module 1340 may be implemented in a number of ways. The filter module 1340 shown in FIG. 17A, works in the time domain. Filters with similar filtering characteristics may be implemented in the frequency domain as well. Filter 1340 has as an input signal 1320 representing the delivered torque. It is possible that filter has no feedback signal and just uses the disturbance correlated signal 1312 to generate the smoothing torque. In this case the disturbance correlated signal 1312 should be based at least in part on the torque model 1592, since there is no feedback to help reduce torque disturbances.

In one embodiment, a controller may be switched between an on-line to an off-line adaptation. For example, the weights can be adaptively updated on-line i.e. recursively calculated in real time as described in Eq. 9. Alternatively, pre-calculated values may be stored off-line in a look-up table of weights that are used by the controller at various operating points when running the control algorithm.

Matched Basis Function Control

Another type of adaptive control that may be used in hybrid powertrain control is matched basis function control. In matched basis function control a control signal is expressed as one or more functions of time, for example, trigonometric functions, such as sine and cosine functions. Arguments to the trigonometric functions are chosen to match one or more frequencies that are expected to be in the disturbance, i.e. the trigonometric functions are matched to the disturbance. Use of matched basis function control is particularly advantageous when an engine is operating at a fixed firing fraction, since in this case the periodicity of the firing sequence is fixed and the frequency components of interest are well defined.

Figure 17B:
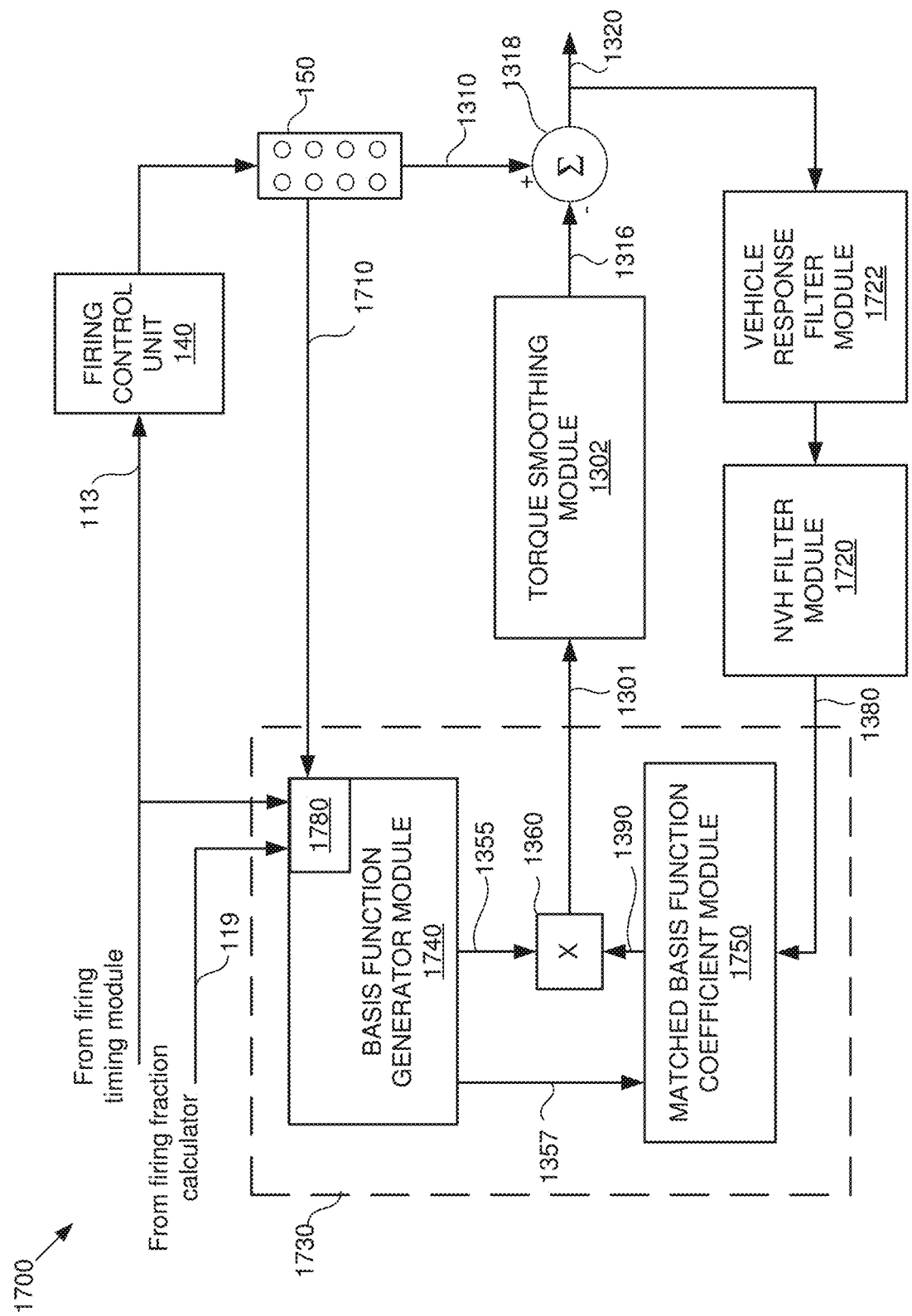
FIG. 17B is schematic diagram of a portion of a hybrid powertrain using matched basis function control according to one embodiment of the present invention.

FIG. 17B schematically shows a portion of a hybrid powertrain 1700 using matched basis function control. This control method is similar to those previously described, but rather than using a disturbance correlated signal to control the motor/generator, a matched basis function is used to determine the motor/generator control signal. The matched basis function can be any function of time, and the mitigation or smoothing torque may be constructed from the basis functions. In an embodiment, the basis function is composed of cosine and sine function pair(s) of one or more selected frequencies. Generally, the frequencies will correspond to a fundamental frequency matching the periodicity of the firing sequence and harmonics of that frequency. The phase and magnitude of the matched basis function may be adaptively adjusted by a well-known algorithm, such as a recursive least square (RLS) algorithm, a least mean square (LMS) algorithm, or some other algorithm to minimize an objective function subject to a constraint. The objective function may be fuel efficiency and the constraint may an NVH metric, such as the mean square of the estimated driver seat rail acceleration or crank shaft acceleration. The magnitude of the mitigation is adjusted via a weighting factor that determines the ratio of the control action and NVH metric in an objective function, which assures that the control effort is minimized while meeting the NVH constraint.

Various aspects of FIG. 17B are similar to those in FIG. 15. As previously described, drive pulses 113 are determined by a firing timing module based on a firing fraction 119. These two signals, drive pulse signal 113 and firing fraction 119, may be inputted into an angle generation module 1780 that is part of a basis function generator module 1740. The firing fraction is indicative of the length of the repeating firing sequence length in steady-state operation. Drive pulses 113 indicate whether a firing opportunity should be fired or skipped. The drive pulses 113 are indicative of the phase of the repeating firing sequence. The drive pulses 113 are also inputted into a firing control unit 140 that orchestrates operation of engine 150. Engine 150 outputs a crank angle signal 1710 that indicates the crank angle orientation, which is also inputted into the angle generation module 1780. Operation of the angle generation module 1780 is explained in more detail below.

The basis pair module 1740 generates a pair of sine and cosine functions at one or more frequencies present in the drive pulses 113. The outputs of the sine and cosine pair generation module 1740 are an input basis function 1355 and an output basis function 1357. The input basis function 1355 and output basis function 1357 may be vectors composed of one or more pairs of sine and cosine functions. The input basis function 1355 and output basis function 1357 have similar time dependencies, but may different by a phase angle and/or the relative magnitude of the sine and cosine functions. These differences arise from the secondary dynamics. The input basis function 1355 is inputted into a multiplier 1360. The output basis function 1357 is inputted into a matched basis function coefficient module 1750.

Based on the input from the firing control unit 140 the engine 150 generates an engine torque 1310. The engine torque 1310 is mechanically combined in adder 1318 with the output 1316 of the torque smoothing module 1302. The resultant delivered torque 1320 may be used to power the vehicle and drive any vehicle accessories. The delivered torque 1320, or a signal related to it is fed back, into a vehicle response filter module 1722 and an NVH estimation module 1720 that determine an NVH metric based on the vehicle response and vehicle occupant sensitivity to NVH. The NVH metric signal 1380 is inputted into the matched basis function coefficient module 1750. The matched basis function coefficient module 1750 determines coefficients 1390 that are multiplied with the corresponding sine or cosine function in the input basis function 1355 in multiplier 1360. The output is a motor/generator control signal 1301 that is inputted into the torque smoothing module 1302 to deliver smoothing torque 1316. The sine and cosine pair generation module 1740, multiplier 1360, and matched basis function coefficient module 1750 may all be incorporated into a matched basis function control module 1730.

Figure 17C:
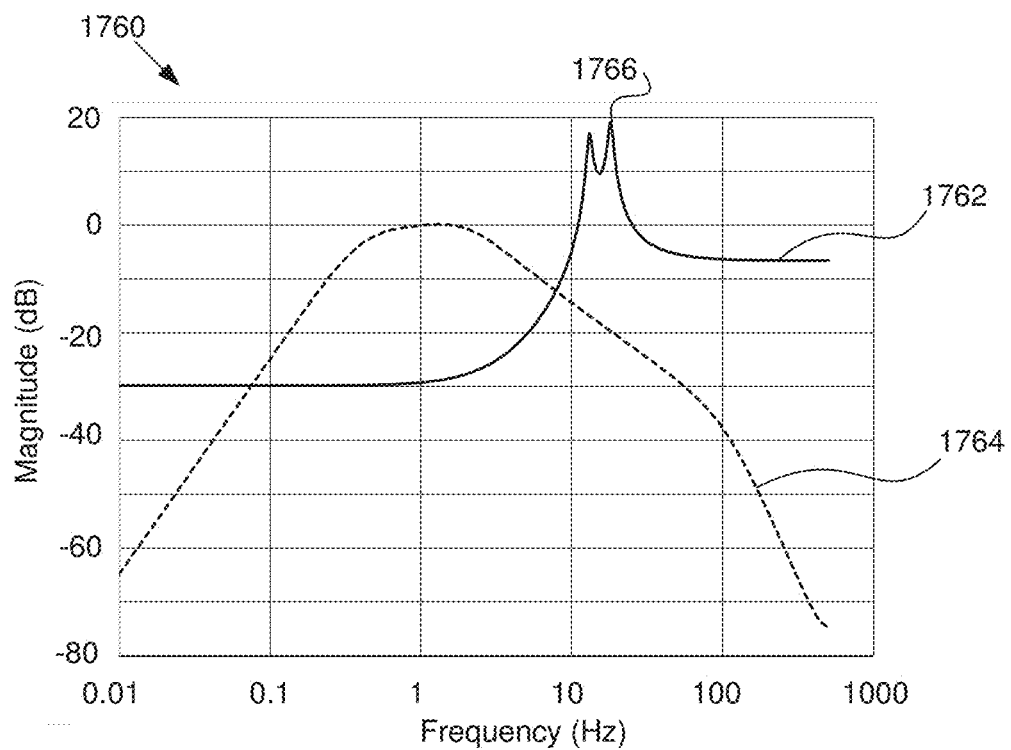
FIGS. 17C and 17D are an exemplary Bode plot of the magnitude and phase of the vehicle response filter and NVH response filter.
Figure 17D:
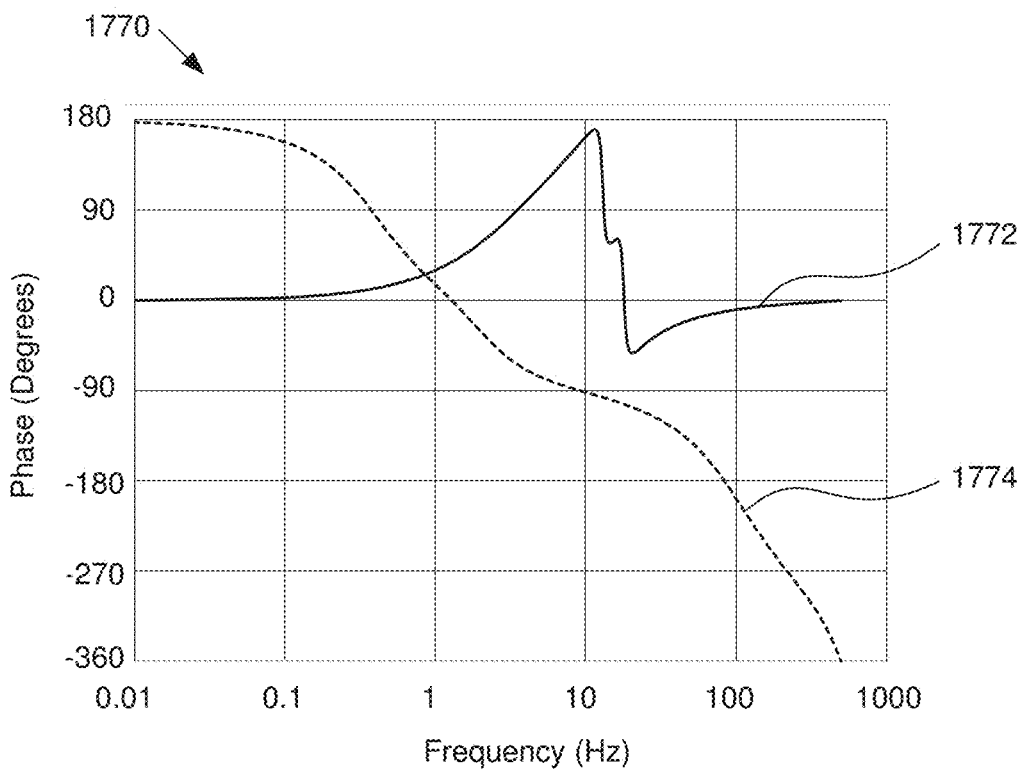

Bode diagrams depicting exemplary filter responses for the magnitude and phase of the vehicle response filter module 1722 and NVH filter module 1720 are shown in FIGS. 17C and 17D. FIG. 17C shows a graph 1760 that depicts an exemplary magnitude of the vehicle response 1762 and NVH response 1764. The vehicle response may be measured at the driver's seat or some other location in the vehicle cabin. The vehicle response magnitude 1762 may have one or more resonance peaks 1766, that correspond to powertrain resonant frequencies or some other vehicle resonance. The NVH filter response 1764 is governed by human perception of shock and vibration. There have been a number of studies involving the effects of vibrations on vehicle occupants. For example, ISO 2631 provides guidance regarding the impact of vibration on vehicle occupants. In general, as shown in FIG. 17C, vibrations at frequencies between 0.2 and 8 Hz are considered to be among the worst types of vibration from the passenger comfort perspective (although of course, there are a number of competing theories as to the most relevant boundaries). Therefore, these frequency components are preferentially passed by the NVH filter 1720 so that they can be attenuated by application of a smoothing torque.

FIG. 17D shows a graph 1770 that depicts an exemplary phase of the vehicle response 1772 and NVH response 1774. The vehicle response filter module 1722 characteristics may vary based on the transmission gear, or effective gear ratio for a continuously variable transmission. Other factors such as ambient temperature, may also modify the characteristics of the vehicle response filter. That is the graphs of the vehicle response magnitude 1762 and phase 1772 shown in FIGS. 17C and 17D, respectively, may vary depending on transmission gear and perhaps other factors.

Figure 17E:
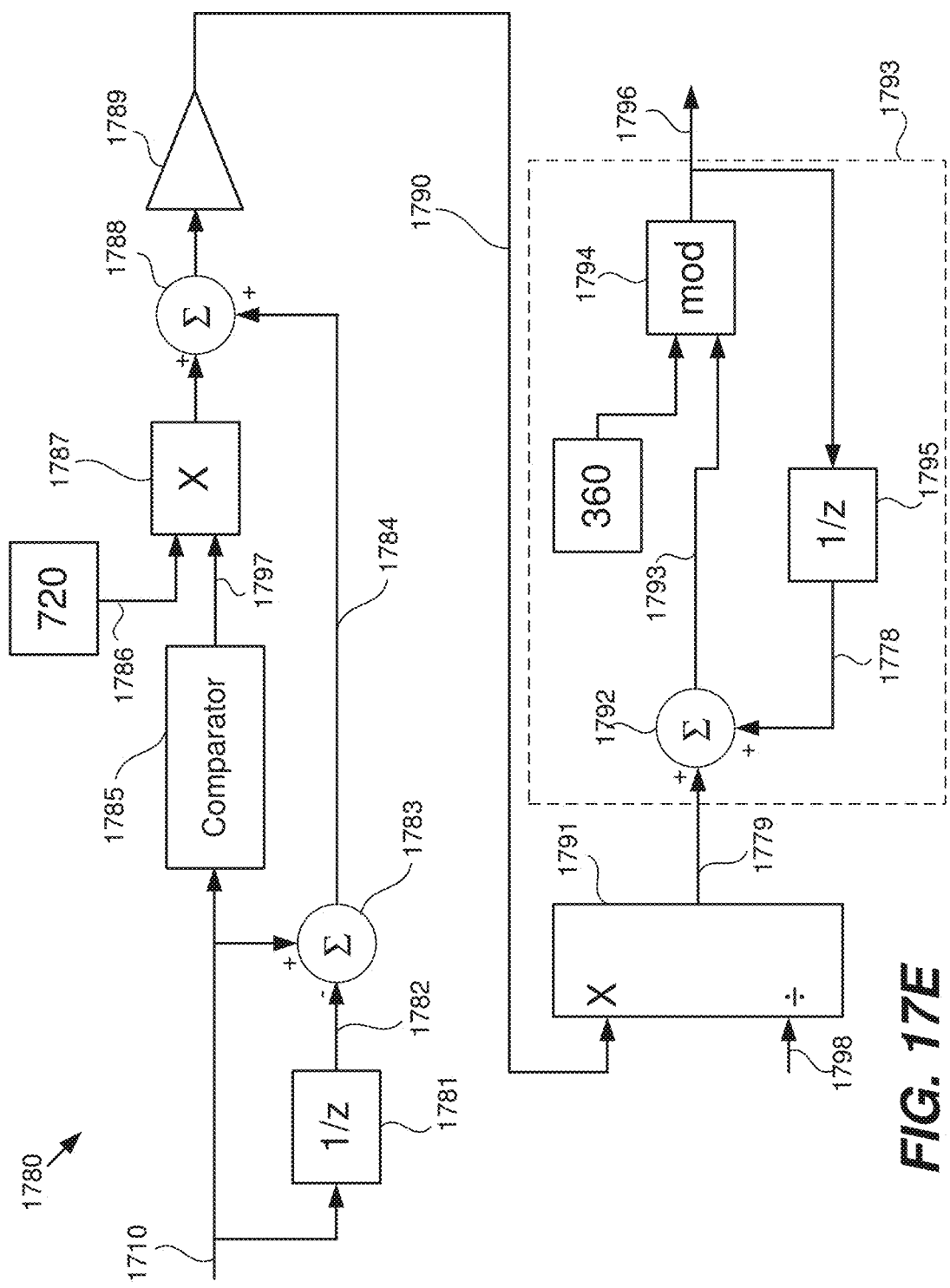
FIG. 17E is a block diagram illustrating an angle generation module according to one embodiment of the present invention.

FIG. 17E is a block diagram illustrating an angle generation module 1780 according to one embodiment of the present invention. The purpose of the angle generation module 1780 is to unwrap the crank angle signal 1710 and generate a periodic function that has a periodicity matching that of the firing sequence. The crank angle signal 1710 can vary between 0 and 720 degrees. It may be in 6-degree increments, although this is not a requirement. The crank angle signal 1710 is split and a portion of the signal goes through delay element 1781. The difference between the crank angle signal 1710 and delayed signal 1782 is determined by adder 1783 producing comparison signal 1784. The comparison signal 1784 is generally a small positive value, since the crank angle increases with time. An exception occurs when the crank angle signal 1710 crosses 720 and resets to zero, then the comparison signal becomes approximately equal to a negative 720 degrees.

The crank angle signal 1710 is also inputted into comparator 1785. Comparator 1785 compares the current version of the crank angle signal 1710 with its previous value. If the current crank angle signal is larger, comparator output signal 1797 is zero. If it is smaller, then the comparator output signal is one. The comparator output signal 1797 is inputted into multiplier 1787. Multiplier 1787 multiplies the inputted signals 1786 and 1797. Since comparator signal 1797 is normally zero the output of multiplier 1787 is normally zero. When the crank angle signal 1710 wraps back to zero, or near zero, the comparator output signal 1797 will be one and the multiplier 1787 output will be 720. The output of the multiplier 1787 is summed with comparison signal 1784 in adder 1788. This output will be the crank angle difference between successive measurements, for example 6-degrees. The output of the adder 1788 is inputted to gain element 1789. The amount of gain in gain element 1789 is determined by the number of firing opportunities per crank shaft revolution. For example, a 4 cylinder, 4-stroke engine would have a gain of 2. The output of the gain element 1789 is an adjusted crank angle increment 1790 that is inputted into multiplier 1791.

The other input into multiplier 1791 is the firing fraction 119. For skip fire controlled engines, the denominator of the firing fraction is the length of the periodic firing sequence when operating in steady state. Multiplying the crank angle increment 1790 in multiplier 1791 is equivalent to dividing it by the length of the repeating firing sequence. The output of the multiplier 1791 is inputted into an adder 1792. The adder 1792 sums the output 1779 with a signal 1778. Signal 1778 is outputted by delay block 1795, which has as an input the output 1796 of modulo unit 1794. The inputs to modulo unit 1794 are adder output 1793 and 360, which is the modulo argument. Collectively elements in block 1793 serve to integrate divider output signal 1779 and return a value between 0 and 360. The output 1796 may be used as the argument in the trigonometric functions that define the matched basis function. The functions are periodic with a period length matching the length of the repeating firing sequence length.

In order to assure the stability of the algorithm, some information on the secondary path, such as belt transmission and motor/generator dynamics, may be needed. An accurate model of the secondary path is not required, since the actual phase adjustment is done adaptively using the measured feedback signal to minimize the defined error compensating for any uncertainty in the secondary path model.

In contrast to some of the previously described embodiments, matched basis function control addresses a finite number of dominate harmonics in the engine torque profile instead of addressing all frequencies within a certain bandwidth. Similar to the previously described methods it uses feedback to adaptively modify parameters in the control system to reduce NVH to an acceptable level while providing maximum fuel efficiency. Matched basis function control may use a pair of cosine and sine signals or other orthogonal functions that can represent engine torque pulse generated by DSF operation. Advantageously, the trigonometric function may be generated directly from crank angle measurement to avoid any delay associated with filtering.

The relationship between engine configuration and firing frequency of four stroke engine is given by the following formula.

$$f = \frac{N_{rpm}}{60} \frac{N_{cyl}}{2} \frac{1}{N_{Denom}} (\text{Hz}) \quad (13)$$

Here, $N_{rpm}$ is the engine speed expressed in rpm, $N_{cyl}$ is the number of cylinder in the engine, $N_{Denom}$ is the denominator of a simple fraction, and f is the fundamental frequency of the engine torque pulse. All values are integers, and fundamental frequency is the same for firing densities which share the same denominator. Harmonics of the fundamental frequency are integer multiple of frequency f.

In order to mitigate those harmonics, it is necessary to generate sinusoidal torque of the corresponding frequencies, and it can be done by using trigonometric function(s) that oscillates at this angular velocity 2πf (radian). Measured engine speed is, however, very noisy and some kind of filter is needed to remove high frequency noise from engine speed measurements. The drawback of this approach is that a filter introduces a delay in the estimated angular velocity trajectory which results in mitigation error.

Since what is really needed is not the frequency, but the argument of the trigonometric functions, i.e. integral of angular velocity, a crank angle measurement can be used instead as the needed integral is an integer multiple of the crank angle. Crank angle measurement is less noisy in general, and because it does not require filtering, no delay is introduced. The following formula, Eq. 14, shows the equivalent sine function whose arguments are obtained from angular velocity (left side of equation) and crank angle (right side of equation).

$$\sin\left(\int_{t=0}^{t} \omega(\tau)d\tau\right) = \sin\left(\frac{N_{cyl}}{2} \frac{1}{N_{Denom}} \varphi(t)\right), \varphi(t): \text{Crank Angle} \quad (14)$$

Usually, crank angle is wrapped to 0-720 degrees, and it needs to be unwrapped before applying the above formula. A exemplary module for performing this unwrapping was described in relation to FIG. 17E and angle generation module 1780.

In an embodiment of matched basis function control, a pair of sine and cosine functions whose frequency corresponds to the addressed frequency is used as the basis function. An output basis function, H(k), may be defined as follows.

$$H(k) = [\cos(\omega kT) \sin(\omega kT)]^T \quad (15)$$

In Eq. 15 and in other equations, the superscript $^T$ refers to the transpose of the output basis function, H(k), and is used to make the expression of H(k) more compact. In Eq. 15 the basis function has only one frequency, the fundamental oscillation frequency; however, more terms can be added to the basis function for other frequencies of interest, such as, but not limited to, 2ω and 3ω. The output basis function corresponds to signal 1357 in FIG. 17E.

An input basis function, G(k), that incorporates compensation for secondary path dynamics, may be defined as follows:

$$G(k) = \left[\frac{1}{\rho(\omega)}\cos(\omega kT - \theta(\omega)) \quad \frac{1}{\rho(\omega)}\sin(\omega kT - \theta(\omega))\right]^T \quad (16)$$

here, θ and ρ are the phase and magnitude of the frequency response of a transfer function F which represents any dynamics between the mitigation torque command and the measured NVH metric providing a constraint. The input basis function corresponds to signal 1355 in FIG. 17E.

In some embodiments, the input basis function can be obtained by filtering the basis function with a transfer function F. A drawback of this approach is it results in some delay of the phase and magnitude. Instead, the input basis function in Eq. 16 can be obtained by the phase and magnitude of the frequency response of F at the addressed frequency which can be provided as a table or a formula. The transfer function F may be expressed in multiple forms as shown in Eq. 17 below.

$$\begin{bmatrix} \rho(\omega)\cos(\omega kT + \theta(\omega)) \\ \rho(\omega)\sin(\omega kT + \theta(\omega)) \end{bmatrix} = \qquad (17)$$

$$F\left\{ \begin{bmatrix} \cos(\omega kT) \\ \sin(\omega kT) \end{bmatrix} \right\} = \rho(\omega) \begin{bmatrix} \cos(\theta(\omega)) & -\sin(\theta(\omega)) \\ \sin(\theta(\omega)) & \cos(\theta(\omega)) \end{bmatrix} \begin{bmatrix} \cos(\omega kT) \\ \sin(\omega kT) \end{bmatrix}$$

The transfer function F includes the secondary path dynamics and filters for NVH metric and vehicle response. Since the effect of transfer function F will be implicitly identified and compensated by an adaptive algorithm, knowledge of the transfer function does not have to be very accurate as long as it is accurate enough to make the system stable. The tolerances for the accuracy of transfer function F are very relaxed.

In some cases input basis function can be obtained as shown below.

$$\frac{1}{\rho}\begin{bmatrix} \cos(\omega kT - \theta) \\ \sin(\omega kT - \theta) \end{bmatrix} = \frac{1}{\rho}\begin{bmatrix} \cos(\theta) & \sin(\theta) \\ -\sin(\theta) & \cos(\theta) \end{bmatrix}\begin{bmatrix} \cos(\omega kT) \\ \sin(\omega kT) \end{bmatrix} \qquad (18)$$

The derivation shown above has the advantage of not introducing any delay, since it directly uses the measured crank angle.

In operation of the matched basis function control algorithm, input basis function G(k) is transformed from the output basis function H(k) by the magnitude and phase estimate of transfer function F for the given frequency. The difference from true magnitude and phase of the transfer function F will be adaptively compensated by the control algorithm.

The input basis functions G(k) can be multiplied with an input basis function coefficient vector $\alpha(n)$ to generate a mitigation command u(k) as shown below in Eq. 19.

$$u(k) = G^T(k)\alpha(k) \qquad (19)$$

The coefficients $\alpha(n)$ may be determined by an adaptive algorithm, such as Recursive Least Square (RLS) method or Least Mean Square (LMS, or gradient algorithm), which minimizes an objective function J. The objective function J for RLS can be expressed as $$J = \frac{1}{2}e_{NVH}^T e_{NVH} + \frac{1}{2}u_c^T R u_c = \frac{1}{2}(y_{NVH} - T\alpha)^T(y_{NVH} - T\alpha) + \frac{1}{2}\alpha^T T^T R T\alpha$$

$$u_c = [h(n)^T \alpha h(n-1)^T \alpha \ldots h(n-N+1)T\alpha]^T$$

$$y_{NVH} = [h'(n)^T w_0 h(n-1)^T w_0 \ldots h(n-N+1)^T w_0]^T$$

$$h(n) = [\cos(n\omega T)\sin(n\omega T)\cos(2n\omega T) \ldots ]^T, T = [h(n)h(n-1) \ldots h(n-N+1)]^T$$

$$h'(n) = [q_1^c g_1^c \cos(n\omega T) q_1^s g_1^s \sin(n\omega T) q_2^c g_2^c \cos(2n\omega T) \ldots ]^T, T = [h'(n)h'(n-1) \ldots h'(n-N+1)]^T$$

$$R = r^2 I \qquad (20)$$

where $e_{NVH}$ and $u_c$ are the history of the NVH metric and control command, $w_0$ and are the corresponding basis function coefficients, I is the identity matrix, and $r^2$ is a weight to adjust for the penalty, in this case energy consumption, for a control action. $g_m^c$, $g_m^s$, $q_m^c$, and $q_m^s$ are the projection of the frequency response of the secondary path transfer function and NVH metric/vehicle response transfer function at the $m^{th}$ harmonics onto the basis function, respectively.

The RLS update formula for the coefficient vector $\alpha[n]$ may be given as follows:

$$\alpha[n] = \alpha[n-1] + P[n](h'[n]e[n] - r^2 h[n]h[n]^T \alpha[n-1])$$

$$P[0] = (T[0]^T T[0] + r^2 T[0]^T T[0])^{-1}$$

$$P[n] = (\lambda P[n-1]^{-1} + r^2 h'[n]h'[n]^T + r^2 h[n]h[n]^T) \qquad (21)$$

$$e_{NVH}[n] = F_{NVH}\{y[n] - u[n]\} \qquad (22)$$

where, y[n] is the engine torque, u[n] is the delivered mitigation torque with some error due to uncertainty in the secondary path, $\lambda$ is forgetting factor, $r^2$ is the weighting factor as before, $F_{NVH}$ is the transfer function from engine torque to NVH metric, and $e_{NVH}[n]$ is the measured NVH metric.

By incorporating the penalty for control action in the objective function, the magnitude of control effort can be controlled. The value for the weight can be determined by solving the equation below for r, where the desired NVH metric is expressed as $\sigma_{NVH}$. $w_m^c$ and $w_m^s$ are the projection of the engine torque pulse onto cosine and sine basis functions of the $m^{th}$ addressed frequency and the component of the vector $w_0$.

$$\frac{1}{2}\sum_{m=1}^{M} w_m^{c2} q_m^{c2}\left(\frac{r^2}{g_m^{c2} q_m^{c2} + r^2}\right)^2 + w_m^{s2} q_m^{s2}\left(\frac{r^2}{g_m^{s2} q_m^{s2} + r^2}\right)^2 = \sigma_{NVH}^2 \qquad (23)$$

In some embodiments, the powertrain controller may switch between an adaptive filter feed forward algorithm and a matched basis function control algorithm depending on whether the vehicle is operating with a fixed firing sequence or the vehicle is in transition between two firing sequence levels. In firing fraction transitions, the firing pattern no longer consists of a repeating firing sequence; however, the length of the transition, i.e. number of firing opportunities in the transition, may be known and that may be used as an input into the matched basis function control module 1730.

While an exemplary embodiment of a matched basis function controller and control algorithm have been described above, it should be appreciated that the controller and control method can be reconfigured while maintaining their basic functionality.

Results

Figure 18A:
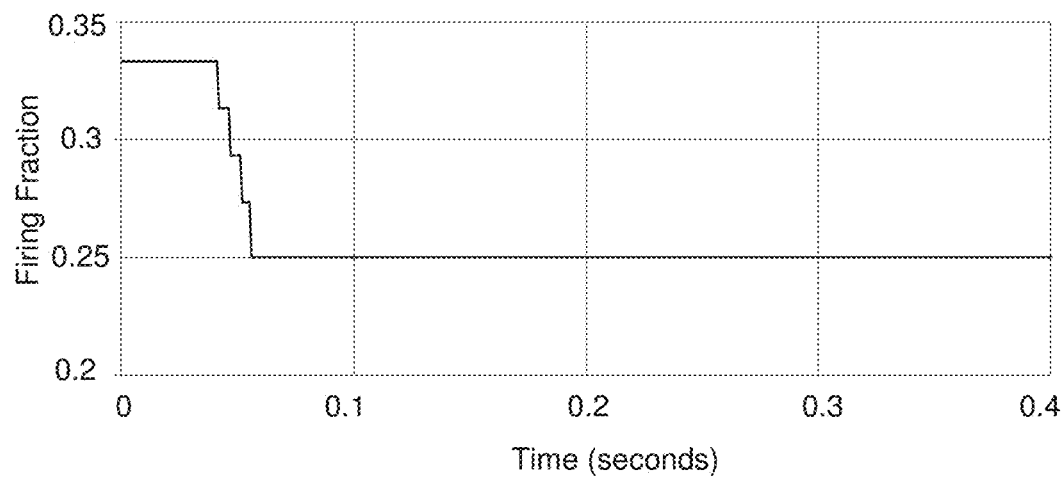
FIG. 18A illustrates an example of an exemplary transition in the firing fraction.
Figure 18B:
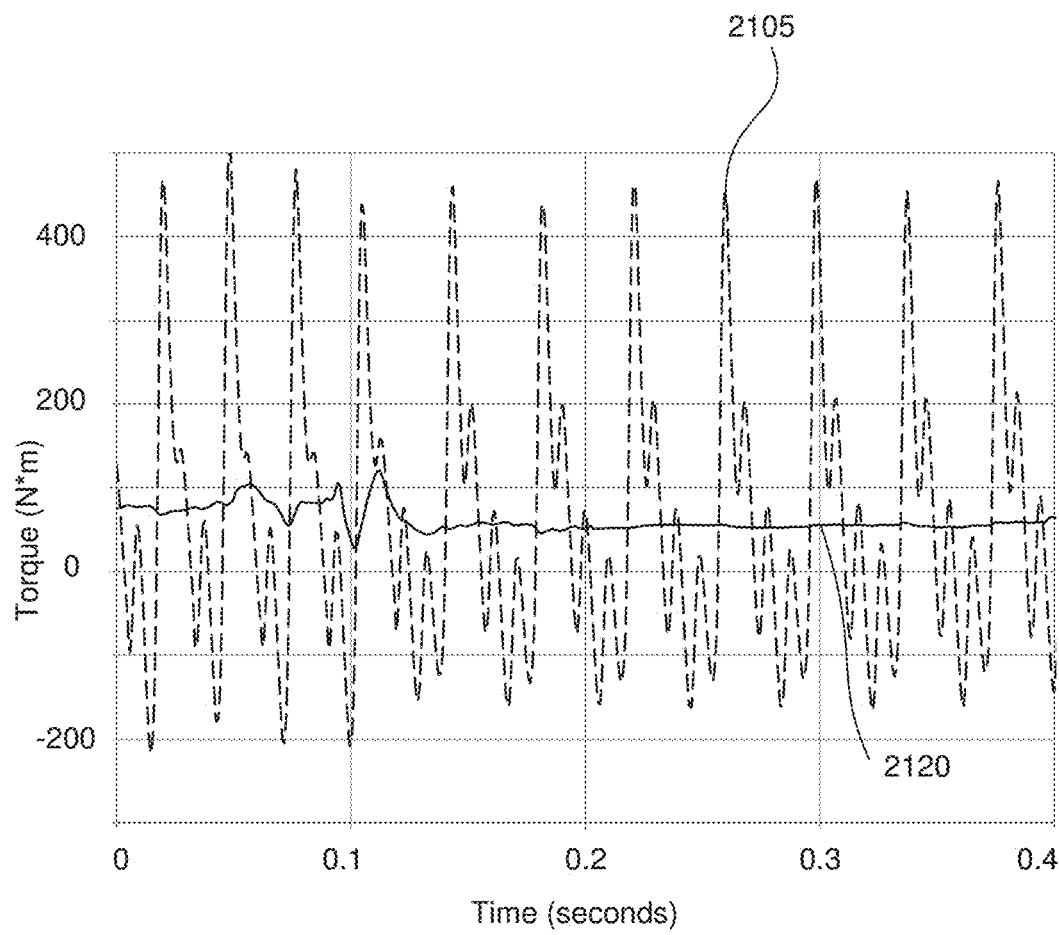
FIG. 18B shows an instantaneous and average engine torque before, during, and after an exemplary firing fraction transition.
Figure 18C:
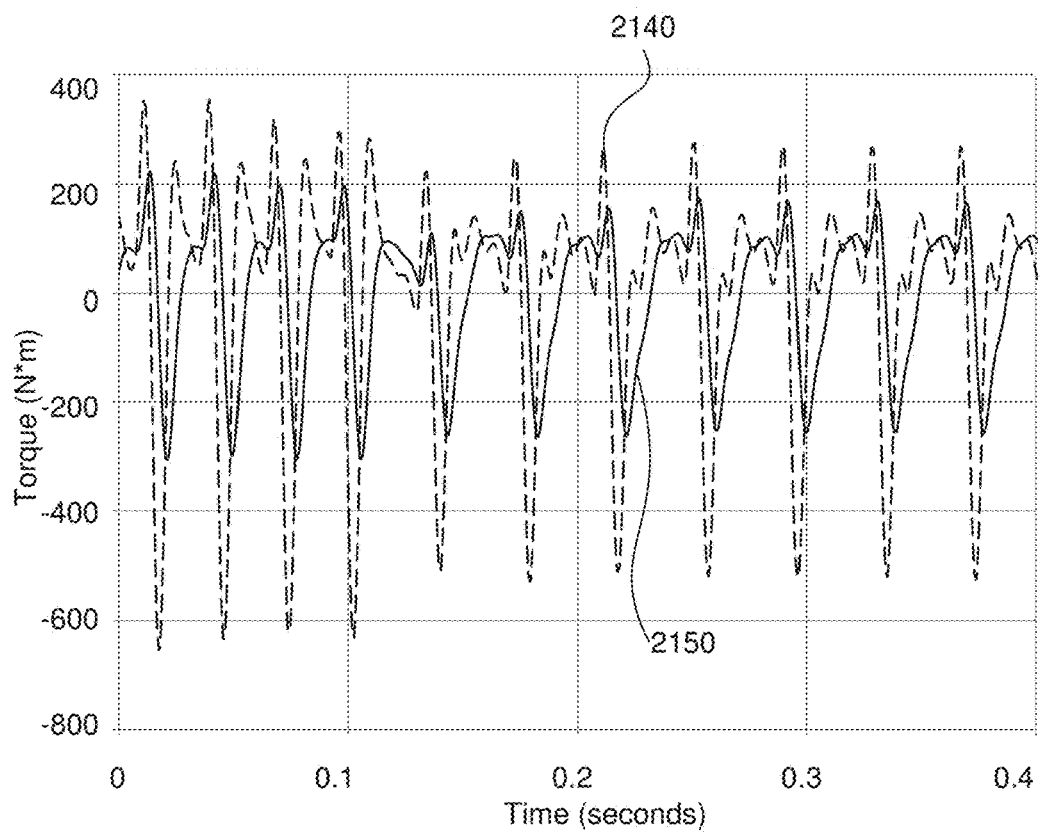
FIG. 18C shows a motor/generator command curve and an instantaneous motor/generator torque delivered/withdrawn from a powertrain before, during and after an exemplary firing fraction transition.
Figure 18D:
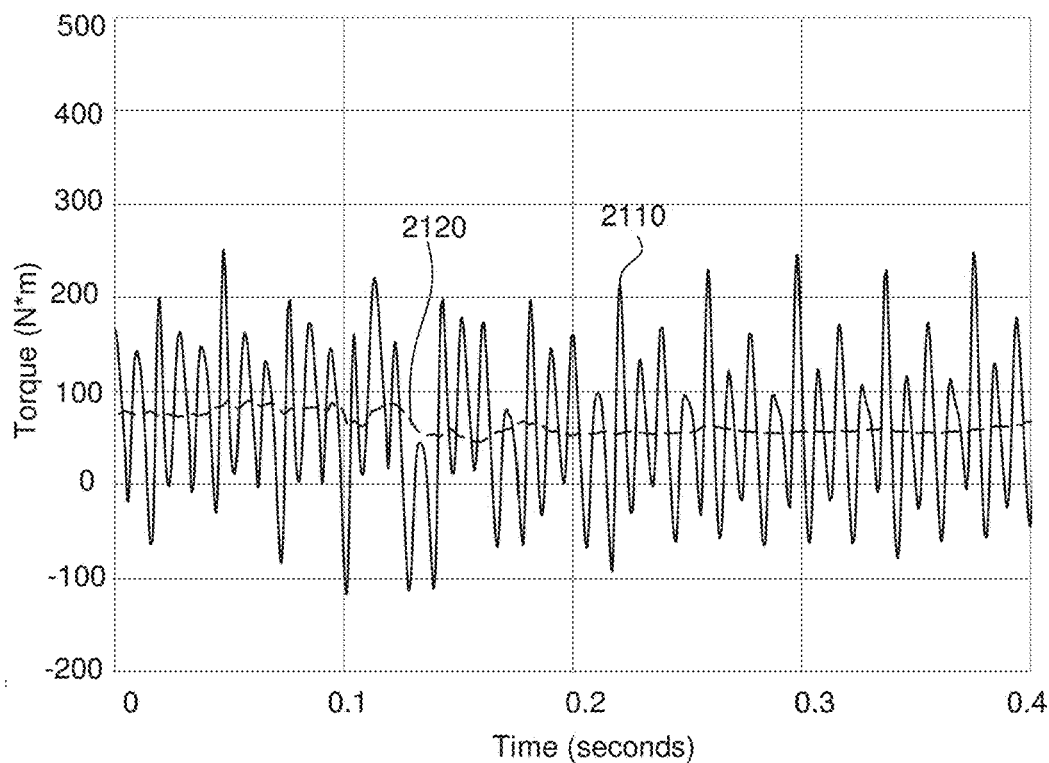
FIG. 18D shows the total powertrain torque and average powertrain torque before, during, and after an exemplary firing fraction transition.

FIGS. 18A-D shows a simulation result of an embodiment of the present invention. FIG. 18A shows the firing fraction command, which starts at 0.33 and moves to 0.25 over the span of about 20 ms. FIG. 18B shows two curves. Curve 2105 is the engine torque and curve 2120 is the average engine torque, which is the bias level removed in determination of the disturbance correlated signal. Initially there is an engine firing approximately every 30 ms. Since the firing fraction is 0.33, this implies there is a firing opportunity approximately every 10 ms. This exemplary engine torque output may result from a 4 cylinder engine operating at 3000 rpm, an eight cylinder engine operating at 1500 rpm, or any other combination of cylinder count and engine speed that produces firing opportunities at this interval. Note that the change in engine firing density as a result of the firing fraction transition begins to occur slightly after 0.1 seconds or about 60 ms after the change in the firing fraction command signal shown in FIG. 18A. This delay, in this case about 6 firing opportunities, represents the delay associated between determining a firing sequence based on a firing fraction and executing that sequence in the engine. This level of delay is typical for engines that control valve motion via a rotating cam and deactivate skipped cylinders by disabling valve motion. FIG. 18C shows curve 2140, which is the motor/generator command curve and curve 2150, which is the torque delivered/withdrawn from the powertrain by the motor/generator. Motor generator command curve 2150 is an example of filter output 1314 from FIG. 13 or the motor/generator command signal 1301 from FIG. 15. The difference between curves 2140 and 2150 reflects the impact of the previously discussed secondary path dynamics FIG. 18D shows the overall powertrain torque as curve 2110 and the average overall torque as curve 2120. Curve 2110 is an example of the delivered torque 1320 shown in FIGS. 13, 15, 17A, and 17B.

Figure 19:
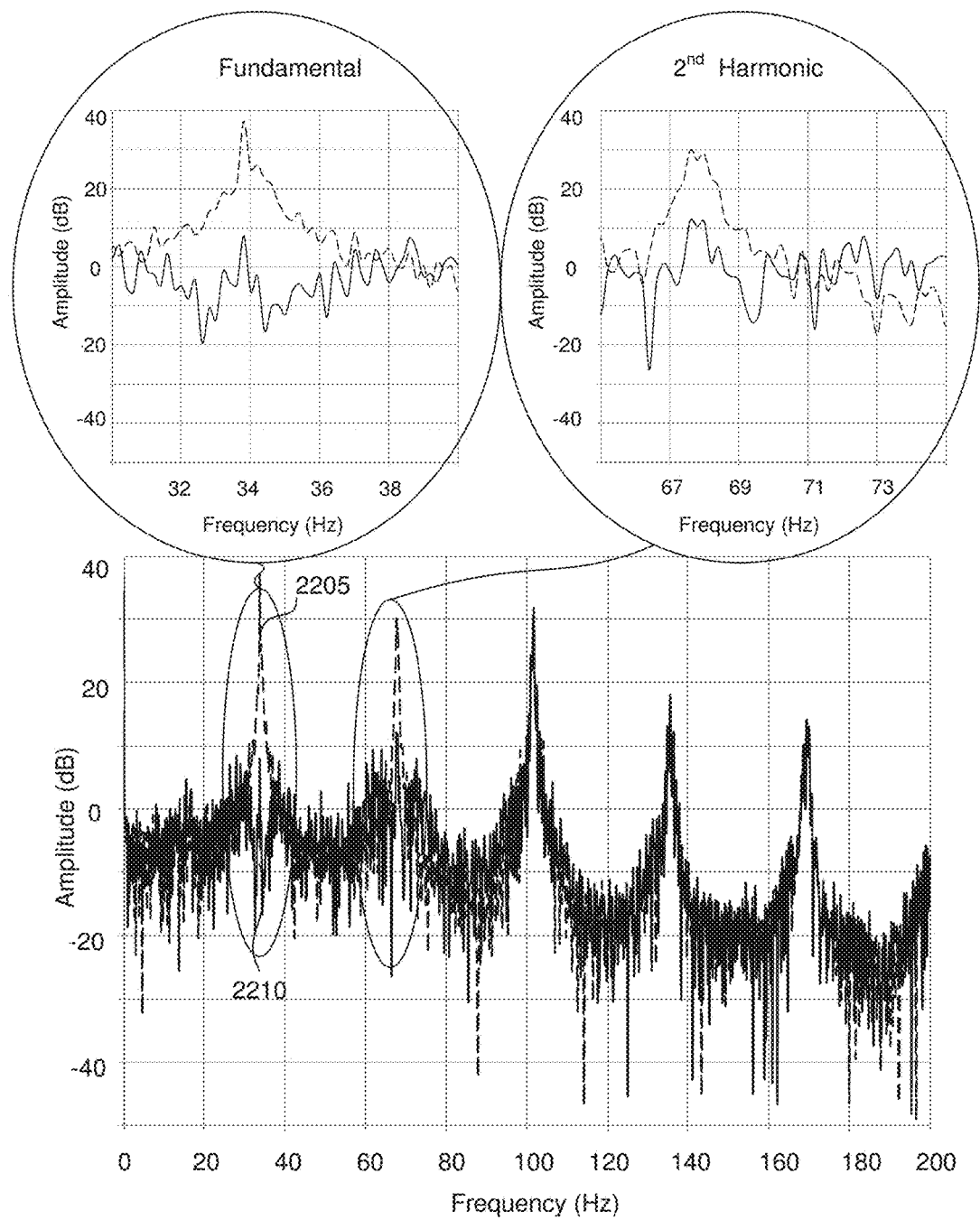
FIG. 19 shows an example of a simulation of an embodiment of the present invention.

FIG. 19 shows the frequency spectrum of the torque error from a simulation result. Curve 2205 illustrates the engine filtered crankshaft acceleration without the application of any smoothing torque. Curve 2210 illustrates the combination of the engine and the motor/generator response using an adaptive filter feed forward control method as described herein. The torque error is almost eliminated for the fundamental and $2^{nd}$ harmonic frequency as shown by the insets in FIG. 19. The $3^{rd}$ harmonic is not significantly attenuated due, at least in part, to bandwidth limitation of the motor/generator system; however, these frequency components of ~100 Hz and above generally have little impact on NVH so attenuation is not required.

Dynamic Firing Level Modulation

The previous description has focused on control methods for a torque smoothing system applicable to a skip fire controlled internal combustion engine. It should be appreciated that the control methods described herein are also applicable to engines operating with different cylinders having different outputs as described in U.S. Pat. No. 9,399,964 and U.S. patent application Ser. No. 14/705,712, which are both incorporated herein by reference in their entirety. Both these references describe engine control methods where in some cases rather than some cylinders being skipped and producing no net torque, some cylinders have an output significantly different than that of other cylinders. A high cylinder output may correspond to a stroke optimized for power and a low cylinder output may correspond to a stroke optimized for fuel economy. These high torque and low torque strokes can be arranged in varying sequences to provide the desired engine output. The valves may be controlled in a manner so that the firings with a higher torque output have a larger quantity of inducted air than firing with a lower torque output. In some cases skips may also be added to the pattern, so that any given firing opportunity may be a high level fire, a low level fire, or a skip. Collectively these types of engine control system may be referred to as dynamic firing level modulation, where the output of any firing opportunity may different significantly from the output on adjacent firing opportunities. In dynamic firing level modulation operation, a finite number of effective firing fractions, periodic patterns or sequences may be used in steady state, and each effective firing fraction, pattern or sequence has a fundamental frequency and its harmonics. The effective firing fraction may be based in part of the firing fraction and the ratio fraction, which is the fraction of low torque firings to high torque firings. It gives an indication of the fraction of the maximum available engine displacement that is being used.

For engines with dynamic firing level modulation, which may have three or more different working chamber outputs, the firing sequence length may be different than the firing fraction. Thus, instead of a single firing fraction input into the basis function generator 1740, two inputs may be required to determine the repeating firing sequence length, such as the ratio of skips to fires and the ratio of high fires to low fires.

In some embodiments, a powertrain controller for use in controlling operation of an internal combustion engine having a plurality of working chambers to deliver a desired output is described. Each working chamber has at least one intake valve that is cam-actuated and at least one exhaust valve. The powertrain includes an auxiliary torque source/sink. A firing level determining unit identifies selected low working cycles to be fired at a low torque output and selected high working cycles to be fired at a high torque output. The firing level determining unit may be arranged to make the high or low torque output determinations on a firing opportunity by firing opportunity basis during operation of the engine. An adaptive filter feed forward controller is arranged to determine a smoothing torque that is applied to a powertrain by the auxiliary torque source/sink wherein the smoothing torque is arranged to at least partially cancel out a variation in torque generated by the high/low firing sequence, thereby reducing NVH that would otherwise be generated by the firing sequence. In some cases, some firing opportunities may be skipped, in addition to having the possibility of a high or low torque output.

Other Features

A number of controllers and control elements have been described in the foregoing specification and the incorporated applications, including, for example, powertrain controllers, engine controllers, engine control units (ECU), hybrid powertrain controllers, skip fire engine control systems, firing controllers, adaptive filter feed forward controller, matched basis function controllers, firing control units, motor/generator controllers, feed forward control systems, and other control elements. The various controllers and control methods described herein may be implemented using software or firmware executed on a processing unit such as a microprocessor, using programmable logic, using application specific integrated circuits (ASICs), using discrete logic, etc. and/or using any combination of the foregoing. These elements may be implemented, grouped, and configured in various architectures in various embodiments of the present invention. For example, in some embodiments, a hybrid powertrain controller or an ECU that consist of a single processor may be configured to perform all of the described activities related to vehicle control. Alternatively, a powertrain or engine controller may include multiple processors that are co-located as part of a powertrain or engine control module or may be distributed at various locations within the vehicle. The specific functionalities performed by any one of the processors or control units may be widely varied. For example, the motor/generator controller may be integrated into an ECU or a hybrid powertrain controller or it may be a separate element located adjacent the motor/generator. In another example, components such as the firing fraction calculator, the firing determination timing module, the adaptive filter feed forward controller and other components may be implemented as functional blocks of an engine or powertrain control unit, as part of a skip fire or firing level modulation controller, as part of an NVH mitigation module, as discrete control unit components, or in other suitable manners, including any desired combination thereof.

The control methods described herein can be implemented using software or firmware executed an engine control unit, a powertrain control module, an engine control module or any other suitable processor programmed with appropriate control algorithms. Alternatively, when desired, the functionality can be implemented in the form of programmable logic or using application specific integrated circuits (ASICs) or a combination of any of the foregoing.

In an embodiment, a method for operating a hybrid vehicle having an internal combustion engine and a motor/generator connected to a common powertrain is described. The method comprises determining a requested powertrain torque output and operating the internal combustion engine in a skip fire manner A smoothing torque is applied to the powertrain with the motor/generator. The smoothing torque opposes torque variations induced by firing working chambers of the internal combustion engine and is determined by adaptive filter feed forward control. In various embodiments, the adaptive filter feed forward control may use a disturbance correlated signal, which may be based on the firing sequence. The disturbance correlated signal may have a substantially zero mean value.

In other embodiments, a hybrid vehicle comprises an electric motor/generator mechanically coupled to a powertrain. An energy storage element is electrically coupled to the motor/generator. A skip fire controlled internal combustion engine is also mechanically coupled to the powertrain and the electric motor/generator applies a smoothing torque to the powertrain opposing a torque applied by a firing working chamber of the internal combustion engine. The applied smoothing torque is determined using adaptive filter feed forward control. In some embodiments the adaptive filter feed forward control uses a disturbance correlated signal and the disturbance correlated signal may be based on the firing sequence. The disturbance correlated signal may have a substantially zero mean value. The energy storage element may be a capacitor, a battery, or a parallel combination of a battery and capacitor.

In still other embodiments, a method of controlling a hybrid vehicle having a powertrain with a powertrain controller controlling a skip fire controlled internal combustion engine and an auxiliary torque source/sink is described. The powertrain controller receives a torque request and based on the torque request determines a firing sequence that delivers the requested torque. A disturbance correlated signal may be generated based on the firing sequence. An adaptive filter may be used to filter the disturbance correlated signal. The filtered disturbance correlated signal may be inputted as a control signal to the auxiliary torque source/sink. A smoothing torque may be applied from the auxiliary torque source/sink to the powertrain so as to at least partially attenuate torque oscillations resulting from skip fire engine operation. An NVH metric may be determined based on a sensed signal. The NVH metric may be fed back to the adaptive filter so as to modify its filtering characteristics. In some embodiments, the sensed signal may be crankshaft rotation or a time derivative thereof or an accelerometer. The filter may be a digital Finite Impulse Response (FIR) filter. The digital Finite Impulse Response (FIR) filter may have weights that are modified based on the NVH metric. The NVH metric may be controlled so as to not exceed a predefined target level which would result in unacceptable NVH if exceeded.

Adaptive Control Algorithm to Determine Secondary Path Coefficients

While the above described embodiments work well, improvement to the control system may be realized by more accurately estimating the secondary path dynamics Improving the accuracy of the secondary path dynamics estimation both reduces system convergence time and reduces the residual or final output error after convergence. In particular, the effect of secondary path error is reduced as the mitigation amplitude increases, but it is not eliminated at low level mitigation amplitudes. This is problematic as low mitigation levels are most often used for optimal fuel efficiency operation of the vehicle powertrain. Thus, inaccuracies in the secondary path estimate can impact fuel efficiency. The embodiments described below improve the secondary path dynamics estimation and result in increased fuel efficiency gains when using matched basis function control.

The secondary path dynamics represent the frequency response from the input motor/generator torque command, to the output, the realized crankshaft torque. In alternative embodiments, some metric related to the crankshaft torque, such as the crankshaft speed, or an NVH metric, may be used as a feedback signal in the adaptive algorithm. The frequency response can easily be obtained if all input torques are known but this is not the case. When the system is operating, there are two inputs to generate crankshaft torque, namely engine torque and motor/generator torque, neither of which is known. Eq. 24 describes the basic control problem.

$$(\text{Engine torque}) - (\text{Motor/generator torque}) = (\text{Requested torque}) + (\text{Error}) \quad (24)$$

Equation 24 is valid for both a DC term and each of a series of harmonic frequency terms that describe the system performance Note that the desired error for the DC term is zero, i.e. the delivered torque should equal the requested torque, but for all the harmonics the desired error term is generally non-zero, since the harmonic vibration need not be completely cancelled.

Figure 20:
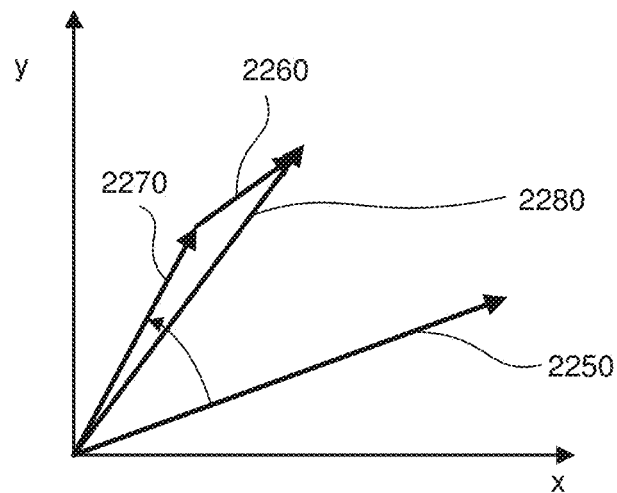
FIG. 20 is a schematic vector representation of the control problem at a single frequency.

FIG. 20 schematically displays Eq. 24 for one of the harmonic frequency terms. FIG. 20 is a vector representation with a magnitude of the various terms represented by a length of an associated vector and a phase represented by an angle off the x-axis. The known quantities are the commanded motor/generator torque 2250 and the measured error 2260. The commanded motor/generator torque 2250 is altered by the secondary path dynamics. This is illustrated graphically by the commanded motor/generator torque vector 2250 shifting to the actual motor/generator torque vector 2270. The measured error 2260 is the difference between the engine torque vector 2280 and actual motor/generator torque vector 2270. As previously described, the goal of the adaptive control algorithm is not generally to reduce the error to zero, but to reduce the error to a NVH amplitude that is acceptable. This provides an acceptable comfort level with better fuel efficiency than reducing the error to zero.

The motor/generator torque is the commanded motor/generator torque, which is known, modified by the secondary path dynamics. The error in crankshaft torque can also be measured or reliably inferred from other measurements and is thus known. Since there is only one equation relating the input and output while there are two unknowns, namely the engine torque and secondary path frequency response, the equation cannot be solved with one steady state point data. However; if data can be collected at two different steady state points with different motor/generator torque values, then equations can be solved for both the engine torque and the secondary path dynamics. Furthermore, the equation can be solved using a Recursive Least Square (RLS) method that minimize the effect of the noise, which may be present in the data. The invention described below adaptively determines the secondary path dynamics for a match basis function recursive least square (MBFRLS) control architecture. The secondary path dynamics estimation algorithm may use a RLS based algorithm.

Figure 21:
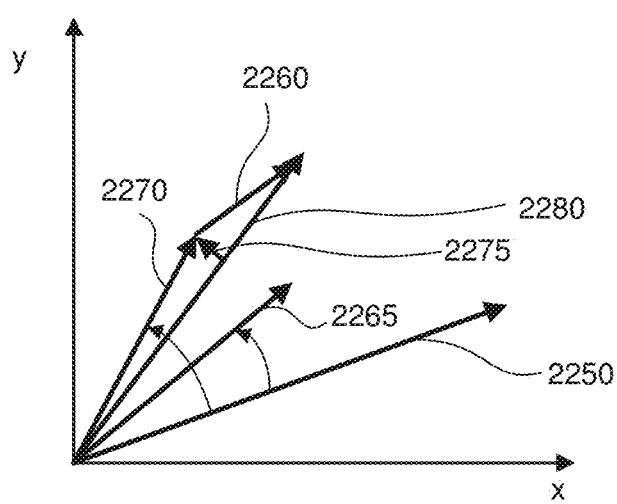
FIG. 21 is a schematic vector representation illustrating the impact of inaccurate secondary path coefficients at a single frequency.

FIG. 21 may be used to better understand operation of the control algorithm. FIG. 21 is similar to FIG. 20 with the addition of several vectors. Vector 2265 represents an estimated motor/generator torque based on the commanded motor/generator torque and an estimate of the secondary path dynamics. In this example, it is assumed that the estimated secondary path dynamics are inaccurate and thus the estimated motor/generator torque 2265 is not coincident with the actual motor/generator torque 2270. The previously described control algorithm caused the error 2260 to be parallel with the estimated motor/generator torque 2265. However, since the estimate was inaccurate and 2265 does not equal 2270, the actual motor/generator torque 2270 is not parallel to the engine torque 2280, and the error 2260 is also not parallel. When 2270 does not coincide with 2280 as in this figure, then waste vector 2275, which represents lost energy is present. Vector 2275 is proportional to wasted energy, since the applied motor/generator torque 2270 is not parallel to the engine torque 2280. In other words, actual motor/generator torque is not perfectly phased to cancel the engine created torque oscillation. The estimation algorithm described below drives the phase difference between 2265 and 2270 to zero, so that the actual motor/generator torque vector 2270 is coincident with the engine torque vector 2280. This helps to improve fuel efficiency.

In the following, a formulation of a secondary path dynamics estimation algorithm to determine the secondary path frequency response is described. A sinusoid of a single harmonic frequency can be decomposed into cos and sin components, whose magnitude ratio determines the phase and the root of the square sum determines the amplitude. With this representation, the secondary path frequency response of a sinusoid can be represented by a pair of constants to be multiplied to the cos and sin components of the sinusoid of interest. and they may be expressed as g cos θ, g sin θ where θ is the phase and g is the gain of the harmonic. In one approach to determining these variables, engine torque coefficients, $x_1$ and $x_2$ and Motor/Generator command coefficients, $w_1$ and $w_2$, for a harmonic frequency may be used.

Secondary path coefficients determined by an adaptive algorithm in a secondary path coefficient module may be used to replace the estimated secondary path coefficients. The secondary path coefficients adaptive algorithm forms a second adaptive feedback loop in the MBFRLS system. The rate of convergence of the secondary path coefficient adaptive algorithm needs to be slower than that of MBFRLS control algorithm so that the two adaptation loops operate at different time scale and both converge.

An objective function to minimize may be defined as follows, and the derivation of the optimal solution, i.e., optimal estimation of the secondary path (and engine torque) can follow a typical least squares approach.

e=observed error e*−estimated error ê

$$\text{Minimize } J = \tfrac{1}{2}(e^* - \hat{e})^T (e^* - \hat{e}) \quad (25)$$

Here, the observed error e* may be a NVH metric, such as a filtered engine speed or other measurement such as signal obtained from a seat rail accelerometer. The estimated error ê may be an estimate of the NVH metric based on the current secondary path dynamic estimate. By defining the following vectors and matrices, a least square solution can be obtained for the estimated error ê.

$$\hat{e} = [\cos n\omega T \; \sin n\omega T]\begin{bmatrix} x_1 \\ x_2 \end{bmatrix} - \quad (26)$$

$$[\cos n\omega T \; \sin n\omega T]\begin{bmatrix} g\cos\theta & -g\sin\theta \\ g\sin\theta & g\cos\theta \end{bmatrix}\begin{bmatrix} w_1 \\ w_2 \end{bmatrix} = [\cos n\omega T \; \sin n\omega T]$$

$$\begin{bmatrix} x_1 \\ x_2 \end{bmatrix} - [\cos n\omega T \; \sin n\omega T]\begin{bmatrix} w_1 & -w_2 \\ w_2 & w_1 \end{bmatrix}\begin{bmatrix} g\cos\theta \\ g\sin\theta \end{bmatrix} =$$

$$[\cos n\omega T \; \sin n\omega T \; -w_1(n)\cos n\omega T - w_2(n)\sin n\omega$$

$$T \; w_2(n)\cos n\omega T - w_1(n)\sin n\omega T]\begin{bmatrix} x_1 \\ x_2 \\ g\cos\theta \\ g\sin\theta \end{bmatrix}$$

$$\hat{e} = H'\hat{q} \quad (27)$$

$$H' = [h'^T(n) \; h'^T(n-1) \; \ldots h'^T(n-N+1)]^T$$

$$h'(n) =$$
$$[\cos n\omega T \; \sin n\omega T \; -w_1(n)\cos n\omega T \; w_2(n)\cos - w_1(n)\sin n\omega T \ldots]$$

$$\hat{q} = \begin{bmatrix} x_1 \\ x_2 \\ g\cos\theta \\ g\sin\theta \\ \vdots \end{bmatrix}$$

With a similar derivation as used in the previously described MBFRLS algorithm, a Recursive Least Squares (RLS) algorithm can be developed to obtain the following least square solution recursively.

$$\left(\frac{\partial J}{\partial \hat{q}}\right)^T = \frac{\partial J}{\partial \hat{q}} = -H'^T(e^* - \hat{e}) = -H'^T e^* + H'^T H' \hat{q} = 0, \quad (28)$$

$$\hat{q} = (H'^T H')^{-1} H'^T e^*$$

The algorithm may be implemented in an engine controller, an electric motor/generator controller, or in a separate control element.

For a solution to exist, $H'^T H'$ need to be full rank matrices, which implies that $w_1$ and $w_2$ need to vary so that the matrices rows and columns are linearly independent. Since the MBFRLS coefficients $w_1$ and $w_2$ always go through transients before settling to steady state values when the MBFRLS algorithm is enabled, linear independence of the matrices rows and columns is almost always satisfied. Since there is no weight "R" term in the objective function, the common Matrix Inversion Lemma can be used to avoid matrix inversion in solving Eq. 28. If desired, another weight can be applied to the objective function according to the expected signal to noise ratio for each harmonic as often done in a standard optimal estimation procedure.

Figure 22:
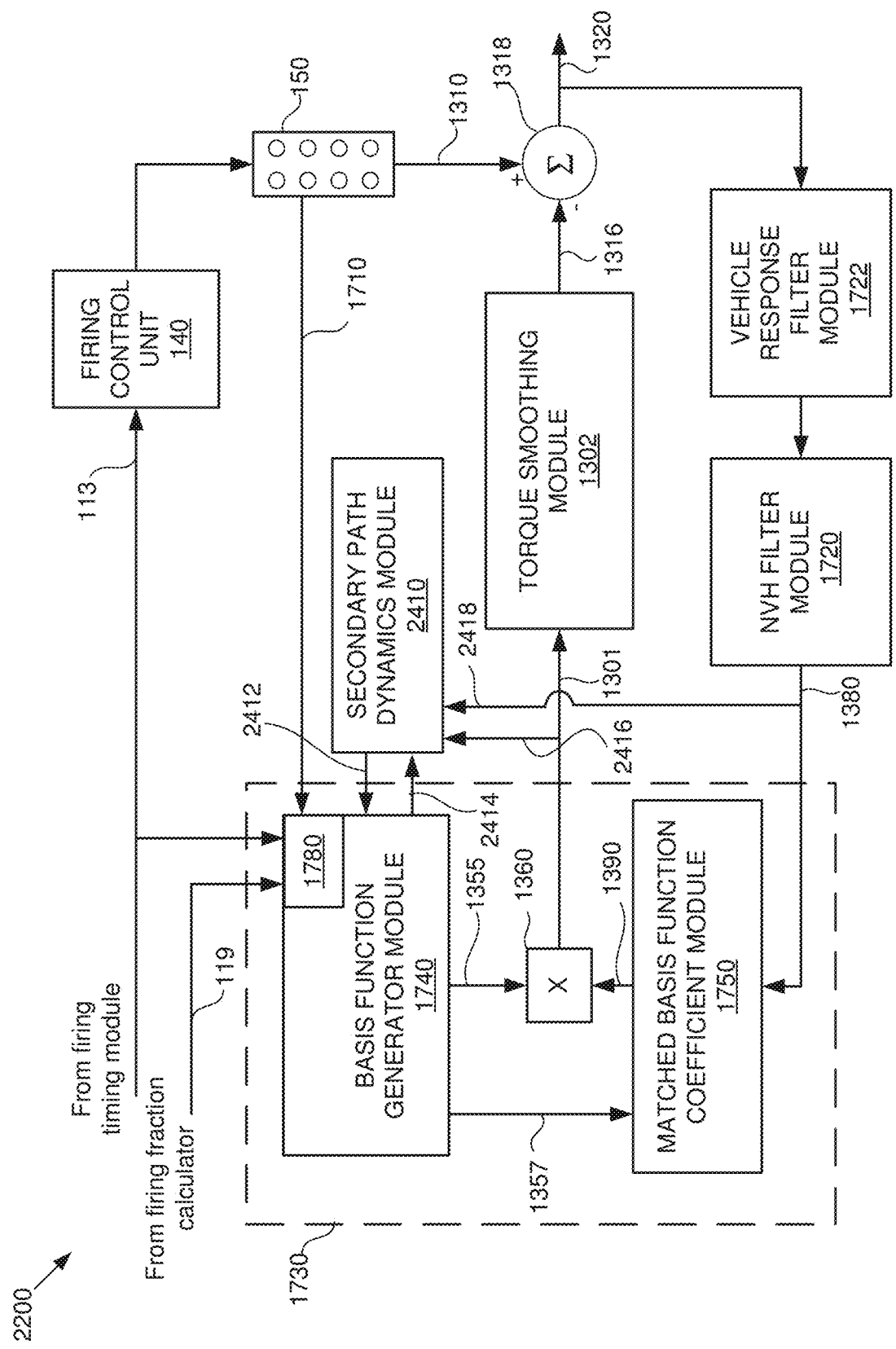
FIG. 22 is schematic diagram of a portion of a hybrid powertrain using matched basis function control and a secondary path dynamics module according to one embodiment of the present invention.

FIG. 22 schematically shows a portion of a hybrid powertrain 2200 using matched basis function control with a secondary path dynamics module to determine the frequency response of the secondary path. FIG. 22 is a schematic diagram similar to that shown in FIG. 17B with the addition of a secondary path dynamics module 2410 and various signal and control lines. Signal lines 2412 and 2414 can route signals bidirectionally between the basis function generator module 1740 and the secondary path dynamics module 2410. Control line 2416 inputs the commanded motor/generator control signal 1301, vectorially represented by 2250, into the secondary path dynamics module 2410 and control line 2418 inputs the NVH metric signal 1380, vectorially represented by 2260, into the secondary path dynamics module 2410. A secondary path dynamics estimation algorithm in the secondary path dynamics module 2410 determines the frequency response of the secondary path.

Figure 23:
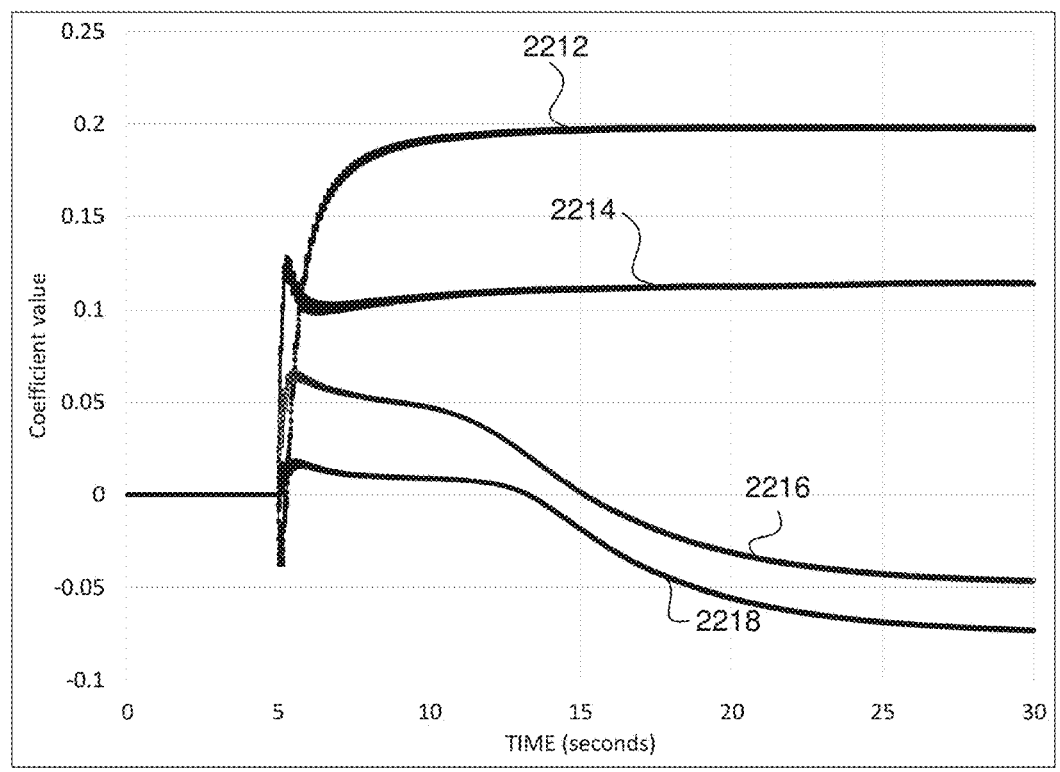
FIG. 23 shows the time evolution of the MBFRLS (matched basis function recursive least square) coefficients in a representative example.
Figure 24:
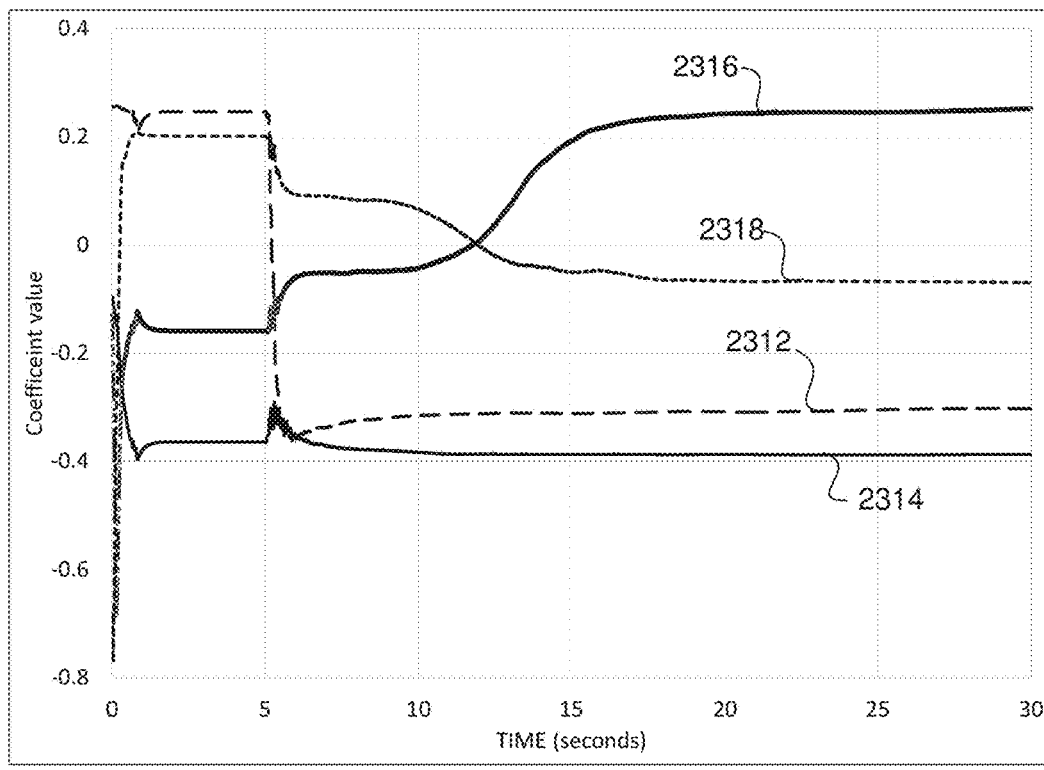
FIG. 24 shows the time evolution of the secondary path coefficients in the same representative example as shown in FIG. 23.

FIGS. 23 and 24 show the result of applying the RLS algorithm described above to hybrid powertrain control. FIG. 23 shows the time behavior of the MBFRLS coefficients for the first and second harmonic terms. In this example, the algorithm is activated at a time of five seconds. The initial estimated MBFRLS coefficients are zero and the initial secondary path coefficients are intentionally deviated from the actual coefficients to better illustrate operation of the adaptive control algorithms. The first coefficient of the first harmonic MBFRLS term $w_1$ is designated as 2212. The first coefficient 2212 has a short transient dip and then rises to a value of approximately 0.2 over the next five seconds. The second coefficient of the first harmonic MBFRLS term $w_2$ is designated as 2214 has a short transient rise and then equilibrates at a value of approximately 0.1 over the next five seconds. The first coefficient of the second harmonic MBFRLS term $w_1$ is designated as 2216 has a short transient rise and then slowly falls to equilibrate at a value of approximately −0.03 over the next fifteen seconds. The second coefficient of the second harmonic MBFRLS term $w_2$ is designated as 2218 has a short transient rise and then slowly falls to equilibrate at a value of approximately −0.07 over the next fifteen seconds.

FIG. 24 shows the time behavior of the corresponding terms for the secondary path coefficients, g cos θ, g sin θ. In this figure, the secondary path control algorithm is implemented at five seconds, the same starting point as implementation of the MBFRLS coefficient algorithm. The coefficient of the first harmonic secondary path term g cos(θ) is designated as 2312. It has an initial value at five seconds slightly above 0.2. It falls rapidly within several seconds and then rises slightly to equilibrate at a value of approximately −0.3 after about 5 seconds. The coefficient of the first harmonic secondary path term g sin(θ) is designated as 2314. It has an initial value at five seconds of about −0.36. It has a short transient period lasting several seconds where it increases slightly and then returns to a equilibrium value near that of its initial value. The coefficient of the second harmonic secondary path term g cos(θ) is designated as 2316. The second harmonic secondary path term 2316 is approximately −0.16 when the control algorithm is implemented. It rises within two seconds to a value of approximately −0.05. It stays at this level for approximately five seconds and then rises more gradually to its final value slightly above 0.2. The coefficient of the second harmonic secondary path term g sin(θ) is designated as 2318. It has an initial value of off approximately 0.2 at five seconds when the control program is implemented. It falls within two seconds to about 0.1 and then falls more gradually to reach it final value of about −0.07. All parameters have fully converged within fifteen seconds after initiation of the control program.

Although only a few embodiments of the invention have been described in detail, it should be appreciated that the invention may be implemented in many other forms without departing from the spirit or scope of the invention. For example, the drawings and the embodiments sometimes describe specific arrangements, operational steps and control mechanisms. It should be appreciated that these mechanisms and steps may be modified as appropriate to suit the needs of different applications. For example, some or all of the operations and features of the NVH reduction module are not required and instead some or all of these operations may be transferred as appropriate to other modules, such as the firing fraction calculator and/or the firing timing determination unit. In some embodiments, one or more of the described operations are reordered, replaced, modified or removed. The described engine controller and control modules may utilize computer code stored in a tangible form in a non-transitory computer readable storage medium (e.g., in the electronic control unit of a vehicle.) The computer code, when executed by one or more processors, causes the controller/engine to perform any of the functions, operations and operations described herein. The engine controller and modules may include any hardware or software suitable for performing the operations described herein.

While the invention is applicable to all forms of hybrid vehicles it is particularly applicable to micro-hybrids, which have relatively small energy storage and motor/generator capacity insufficient to provide the entire motive force to drive the vehicle. The invention is also applicable to engines having any number of cylinders. Various embodiments of the invention are particularly advantageous in compact vehicles having relatively small engines, such as 2, 3 or 4 cylinder engines, where the NVH associated with a low cylinder count, skip fire engine can be mitigated by a smoothing torque. Therefore, the present embodiments should be considered illustrative and not restrictive and the invention is not to be limited to the details given herein.

What is claimed:

1. An electric motor/generator controller for operating a motor/generator used as an auxiliary torque source/sink in a hybrid powertrain, the hybrid powertrain including an internal combustion engine that operates in a firing sequence, the motor/generator controller comprising:
a matched basis function control module arranged to generate a control signal for the electric motor/generator; and
a secondary path dynamics module arranged to determine a dynamic response of a secondary path, the secondary path being the response of the motor/generator to a motor/generator control signal, wherein the control signal of the matched basis function control module is affected by the determined dynamic response of the secondary path.

2. The electric motor/generator controller of claim 1, wherein the secondary path dynamics module includes a sine and cosine generation module and the control signal output by the matched basis function control module is composed of at least one cosine and sine function pair, each cosine and sine function pair having an associated frequency.

3. The electric motor/generator controller of claim 2, wherein the sine and cosine generation module includes an angle generation module that produces arguments for the sine and cosine generation module having a periodicity that matches a periodicity of the firing sequence.

4. The electric motor/generator controller of claim 3, wherein the periodicity of the firing sequence is a function of a denominator of a firing fraction.

5. The electric motor/generator controller of claim 1, wherein the matched basis function control module includes a matched basis function coefficient module.

6. The electric motor/generator controller of claim 5, wherein the matched basis function coefficient module uses a recursive least squares algorithm or a least mean square algorithm to determine matched basis function coefficients.

7. The electric motor/generator controller of claim 5, wherein the secondary path dynamics module includes a secondary path coefficient module.

8. The electric motor/generator controller of claim 7, wherein the secondary path coefficient module uses a recursive least squares algorithm to determine secondary path coefficients.

9. The electric motor/generator controller of claim 7, wherein the secondary path dynamics module operates at a slower time scale than the matched basis function control module.

10. A method for operating an electric motor/generator used as an auxiliary torque source/sink in a hybrid powertrain, the hybrid powertrain including an internal combustion engine that operates in a firing sequence, the method comprising:
- determining a dynamic response of a secondary path using a secondary path dynamics estimation algorithm, wherein the dynamic response of the secondary path represents a correlation between a commanded torque smoothing signal and an output smoothing torque; and
- generating a control signal for the electric motor/generator using a matched basis function control algorithm to provide an acceptable NVH metric, wherein the control signal is adjusted based on the determined dynamic response of the secondary path.

11. The method of claim 10, wherein the dynamic response of the secondary path is represented by sine and cosine functions.

12. The method of claim 11, wherein the sine and cosine functions have a periodicity that matches a periodicity of the firing sequence.

13. The method of claim 12, wherein the periodicity of the firing sequence is a function of a denominator of a firing fraction.

14. The method of claim 10, wherein the matched basis function control algorithm uses a recursive least squares algorithm or a least mean square algorithm to determine matched basis function coefficients.

15. The method of claim 10, wherein the secondary path dynamics estimation algorithm uses a recursive least squares algorithm to determine secondary path coefficients.

16. The method of claim 10, wherein the secondary path dynamics secondary path dynamics estimation algorithm operates at a slower time scale than the matched basis function control module.

17. A computer readable storage medium that includes executable computer code embodied in a tangible form and suitable for operating an internal combustion engine in a dynamic firing level modulation manner using an operational effective firing fraction that is fuel efficient and has acceptable noise, vibration and harshness (NVH) characteristics wherein the computer readable medium includes:
- executable computer code for generating an operational effective firing fraction to deliver a requested torque;
- executable computer code for generating a firing sequence used to operate the engine in a dynamic firing level modulation manner, the firing sequence being based on the operational effective firing fraction;
- executable computer code for determining matched basis function coefficients; and
- executable computer code for determining secondary path coefficients.

18. The computer readable storage medium of claim 17, wherein the executable computer code for determining secondary path coefficients operates on a slower time scale than the executable computer code for determining matched basis function coefficients.

* * * * *